United States Patent
Nakagami et al.

(10) Patent No.: US 10,356,442 B2
(45) Date of Patent: Jul. 16, 2019

(54) IMAGE PROCESSING APPARATUS AND METHOD

(71) Applicant: SONY CORPORATION, Tokyo (JP)

(72) Inventors: Ohji Nakagami, Tokyo (JP); Teruhiko Suzuki, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 15/030,809

(22) PCT Filed: Oct. 20, 2014

(86) PCT No.: PCT/JP2014/077781
§ 371 (c)(1),
(2) Date: Apr. 20, 2016

(87) PCT Pub. No.: WO2015/064402
PCT Pub. Date: May 7, 2015

(65) Prior Publication Data
US 2016/0277771 A1     Sep. 22, 2016

(30) Foreign Application Priority Data

Nov. 1, 2013    (JP) .................................. 2013-228357

(51) Int. Cl.
*H04N 19/88*    (2014.01)
*H04N 19/46*    (2014.01)
(Continued)

(52) U.S. Cl.
CPC ........... *H04N 19/88* (2014.11); *H04N 19/182* (2014.11); *H04N 19/186* (2014.11); *H04N 19/46* (2014.11); *H04N 19/70* (2014.11); *H04N 19/30* (2014.11)

(58) Field of Classification Search
CPC ......... H04N 19/88; H04N 19/46; H04N 19/70
See application file for complete search history.

(56) References Cited

U.S. PATENT DOCUMENTS

2007/0098067 A1\* 5/2007 Kim ..................... H04N 19/176
375/240.08
2008/0291295 A1\* 11/2008 Kato ..................... H04N 19/124
348/231.99

(Continued)

FOREIGN PATENT DOCUMENTS

JP        2004-128583 A    4/2004
JP        2006-094225 A    4/2006

(Continued)

OTHER PUBLICATIONS

Benjamin Bross et al, "High Efficiency Video Coding (HEVC) Text Specification Draft 10 (For FDIS & Last Call)", Joint Collaborative Team on Video Coding (JCT-VC) of ITU-T SG16 WP3 and ISO/IEC JTC1/SC29/WG11, Jan. 14-23, 2013, p. 310, Document: JCTVC-L1003_v34, 12th Meeting: Geneva, CH.

(Continued)

Primary Examiner — Jeffery A Williams
(74) Attorney, Agent, or Firm — Chip Law Group

(57) ABSTRACT

The present disclosure relates to an image processing apparatus and a method that can more easily improve encoding efficiency. A packing processing unit configured to perform packing processing of rearranging pixel data of RAW data that is image data before demosaicing processing is performed according to the degree of correlation, and an encoding unit configured to encode the RAW data subjected to the packing processing by the packing processing unit are included. The present disclosure can be applied to image processing apparatuses such as an image encoding device that encodes the RAW data and an image decoding device that decodes encoded data that is encoded RAW data.

19 Claims, 59 Drawing Sheets

(51) Int. Cl.
*H04N 19/70* (2014.01)
*H04N 19/182* (2014.01)
*H04N 19/186* (2014.01)
*H04N 19/30* (2014.01)

(56) References Cited

U.S. PATENT DOCUMENTS

| | | | | |
|---|---|---|---|---|
| 2012/0230392 A1* | 9/2012 | Zheng | ............... | H04N 19/197 375/240.02 |
| 2014/0003525 A1* | 1/2014 | Fuldseth | ............ | H04N 19/176 375/240.16 |

FOREIGN PATENT DOCUMENTS

| | | | | | |
|---|---|---|---|---|---|
| JP | 2009-303264 | A | | 12/2009 | |
| JP | 2011-015347 | A | | 1/2011 | |
| JP | 2011-029809 | A | | 2/2011 | |
| JP | 2011029809 | A | * | 2/2011 | ............ H04N 1/64 |
| JP | 2011-166219 | A | | 8/2011 | |
| WO | 2008/132791 | A | | 11/2008 | |
| WO | 2008/132791 | A1 | | 11/2008 | |
| WO | 2011/010431 | A | | 1/2011 | |
| WO | 2011/010431 | A1 | | 1/2011 | |
| WO | 2012/157443 | A1 | | 11/2012 | |

OTHER PUBLICATIONS

Decision to Dismiss the Amendment for JP Patent Application No. 2015-544929, dated Jul. 12, 2018, 13 pages of Office Action and 07 pages of English Translation.
Decision of Refusal for JP Patent Application No. 2015-544929, dated Jul. 12, 2018, 03 pages of Office Action and 02 pages of English Translation.
Office Action for JP Patent Application No. 2015-544929, dated Mar. 1, 2018, 05 pages of Office Action.
Office Action for JP Patent Application No. 2015-544929, dated May 22, 2018, 09 pages of Office Action and 05 pages of English Translation.
Office Action for JP Patent Application No. 2015-544929, dated Nov. 16, 2018, 01 pages of Office Action and 05 pages of English Translation.
Office Action for CN Patent Application No. 201480058310.7, dated Sep. 29, 2018, 06 pages of Office Action and 11 pages of English Translation.

* cited by examiner

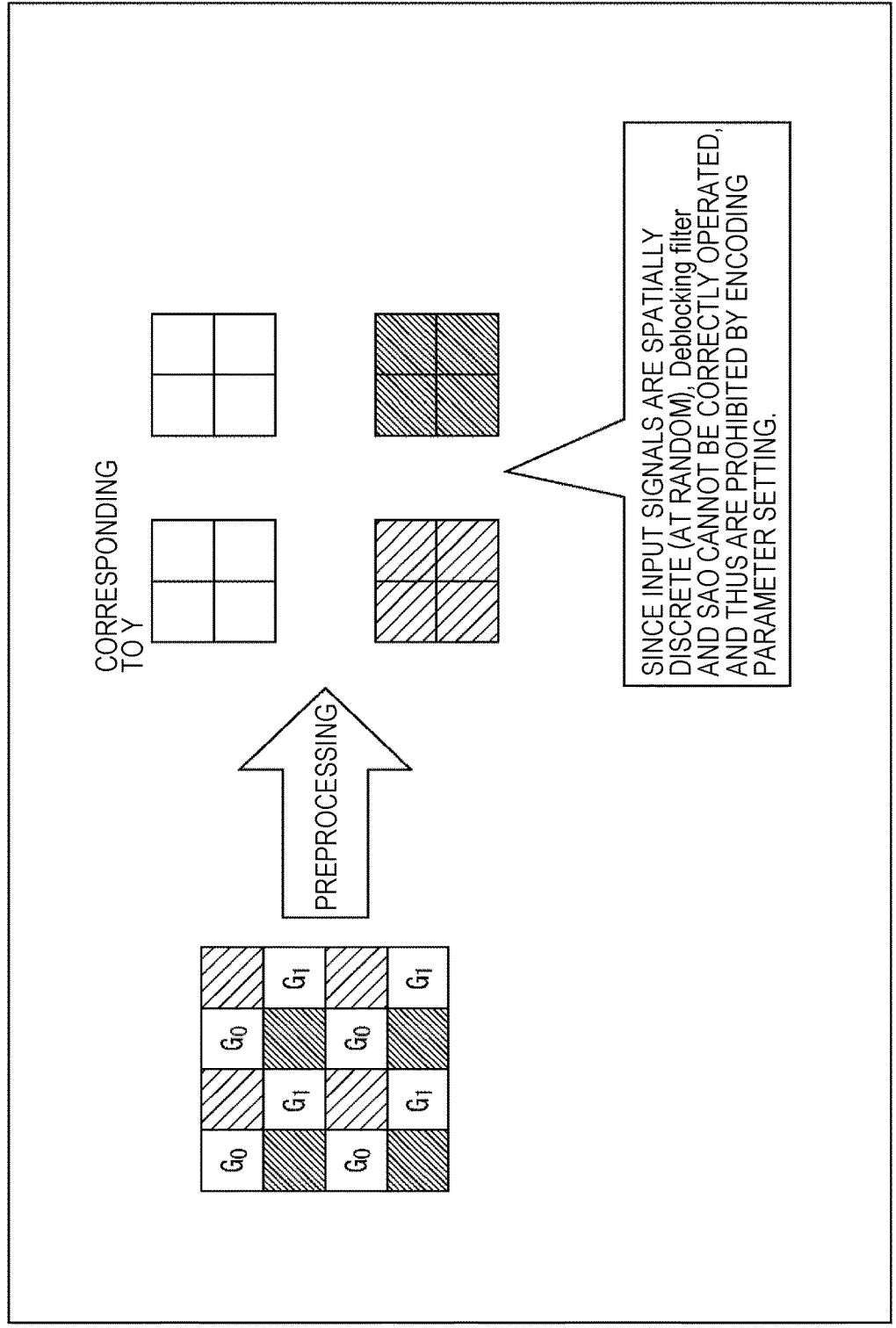

FIG. 14

| SYSTEM | RANDOM ACCESSIBILITY (SPACE) | RANDOM ACCESSIBILITY (COMPONENT) | THE NUMBER OF COMPONENTS | USE CORRELATION BETWEEN COMPONENTS FOR COMPRESSION | THUMBNAIL FUNCTION | Ver 1 DECODER HANDLES |
|---|---|---|---|---|---|---|
| COLOR PLANE SEPARATION (YUV TOGETHER) | ○ (SLICE/TILE SEPARATION IS USED) | × | 3 OK IF SEPARATION TO A PLURALITY OF PICTURES OR SLICES IS PERFORMED | △ ONLY INTRA PREDICTION DIRECTION | — | ○ |
| COLOR PLANE SEPARATION (YUV INDEPENDENT) | ○ (SLICE/TILE SEPARATION IS USED) | ○ | 3 | × | — | △ separate_colour_plane_flag=1 IS PROHIBITED |
| SPATIAL SEPARATION By Slice /Tile | ○ (SLICE/TILE SEPARATION IS USED) | ○ (SLICE/TILE SEPARATION IS USED) | ARBITRARY | × | — | △ 400 IS PROHIBITED |
| Layer SEPARATION | ○ (SLICE/TILE SEPARATION IS USED) | ○ (LAYER IS USED) | ARBITRARY (Max64) | ○ INTRA PREDICTION /MV PREDICTION | — | △ |
| Layer SEPARATION BL IS THUMBNAILED | ○ (SLICE/TILE SEPARATION IS USED) | ○ (LAYER IS USED) | ARBITRARY (Max63) | ○ INTRA PREDICTION /MV PREDICTION | ○ | △ ○ THUMBNAIL IS |

FIG. 15

| | Descriptor |
|---|---|
| profile_tier_level(maxNumSubLayersMinus1) { | |
| general_profile_space | u(2) |
| general_tier_flag | u(1) |
| general_profile_idc | u(5) |
| for(j=0; j<32; j++) | |
|   general_profile_compatibility_flag[j] | u(1) |
| general_progressive_source_flag | u(1) |
| general_interlaced_source_flag | u(1) |
| general_non_packed_constraint_flag | u(1) |
| general_frame_only_constraint_flag | u(1) |
| general_camera_sensor_image_packed_flag | u(1) |
| ... | |
| general_level_idc | u(8) |

A

--- general_camera_sensor_image_packed_flag equal to 1 specifies that there may or may not be one or more color filter array packing information SEI messages present in the CVS.
general_camera_sensor_image_packed_flag equal to 0 indicates that there are no color filter array packing information SEI messages present in the CVS.
NOTE—Decoders may ignore the value of general_camera_sensor_image_packed_flag, as there are no decoding process requirements associated with the presence or interpretation of color filter array packing information SEI messages.

| Color_Filter_Array_Packing_Information(payloadSize) { | Descriptor |
|---|---|
| CFAP_id | ue(v) |
| CFAP_type | ue(v) |
| CFAP_component_num | ue(v) |
| if(CFAP_type>0) { | |
| for(i=0;i<CFAP_component_num;i++) { | |
| CFAP_component_id[i] | ue(v) |
| CFAP_mapping_info[i] | ue(v) |
| } | |
| } | |
| CFAP_bitstream_constraint_indication_flag | u(1) |
| if(CFAP_bitstream_constraint_flag) { | |
| CFAP_no_inloop_filter_used_flag | u(1) |
| ... | |
| } | |
| } | |

FIG. 17

- CFAP_id: ID FOR DISTINGUISHING CFAP_SEIS. ARBITRARY VALUE CAN BE SET.
  - SIGNIFICANT IF A PLURALITY OF CFAP_SEIS EXISTS IN ONE BIT STREAM.
- CFAP_type: EXPRESSES TYPE OF PACKING BY FIGURE.
  - NEW PACKING TYPE, IF ANY, CAN BE ADDED TO TABLE.
- CFAP_component_num: THE NUMBER OF COMPONENTS OF INPUT. VALUE IS 1 OR MORE.
  - FOR EXAMPLE, THERE ARE RGB THREE COLORS IN THE CASE OF Bayer filters, AND THUS CFAP_component_num=3 IS SET.
  - FOR EXAMPLE, WHEN G IS SEPARATED INTO G0 AND G1 BY SPATIAL PHASES EVEN WITH Bayer filters, COMPONENTS ARE TREATED AS RG0G1B FOUR COMPONENTS, AND CFAP_component_num=4 IS SET.
- CFAP_component_id[i]: IDENTIFIER WHEN DISTINGUISHING INPUT COMPONENT BY NUMBER. ARBITRARY VALUE CAN BE SET.
  - ANY VALUE CAN BE SET SUCH AS G BEING 0 AND R BEING 1 AS LONG AS PERSON WHO USES VALUES CAN UNDERSTAND.
- CFAP_mapping_info[i]: USED TO ASSOCIATE COMPONENT AND ENCODING INFORMATION. USED IN COMBINATION WITH CFAP_type.
  - SAME VALUES HAVE DIFFERENT MEANINGS ACCORDING TO VALUE OF CFAP_type.
- CFAP_bitstream_constraint_indication_flag: WHEN VALUE IS 1, VALUE INDICATES ENCODER HAS PERFORMED SOME SORT OF BIT STREAM CONSTRAINT, AND SPECIFIC ADDITIONAL INFORMATION IS TRANSMITTED. WHEN VALUE IS 0, VALUE INDICATES THERE IS NO BIT STREAM CONSTRAINT.
- CFAP_no_inloop_filter_used_flag: WHEN VALUE IS 1, VALUE INDICATES In-loop FILTER (Deblocking FILTER, SAO, OR THE LIKE) IS NOT USED IN BIT STREAM. WHEN VALUE IS 0, THERE IS NO SUCH CONSTRAINT. VALUE IS 0 WHEN NOT TRANSMITTED.

FIG. 18

| Value | Interpretation |
|---|---|
| 0 | PERFORM PACKING TO COLOR PLANES |
| 1 | PERFORM ENCODING IN YUV400 AND PACKING TO SLICES |
| 2 | PERFORM ENCODING IN YUV400 AND PACKING TO TILES |
| 3 | PERFORM PACKING TO LAYERS |

FIG. 22

| Syntax position | Syntax name | Value |
|---|---|---|
| NAL unit header | nal_unit_type | FROM 16 TO 23, BOTH INCLUSIVE (REGIONS ALLOCATED TO IRAP) NORMALLY, 20 (IDR_N_LP) |
| Video Parameter Set | vps_max_layers_minus1 | 0 |
| Sequence Parameter Set | chroma_format_idc | 1 (4:2:0) or 2 (4:2:2) or 3 (4:4:4) DEPENDING ON RATIOS OF THE NUMBER OF PIXELS OF COMPONENTS OF SENSOR. FOR EXAMPLE, IN THE CASE OF Bayer, THE NUMBER OF PIXELS OF G IS TWICE AS MANY AS R AND B. THEREFORE, 11 (4:2:0) IS SET. |
| | separate_colour_plane_flag | 0 (PERFORM ENCODING COMMON IN YC) |
| | pic_width_in_luma_samples | THE NUMBER OF HORIZONTAL PIXELS OF "G" COMPONENT |
| | pic_height_in_luma_samples | THE NUMBER OF VERTICAL PIXELS OF "G" COMPONENT |
| | bit_depth_luma_minus8 | BIT DEPTH OF "G" COMPONENT − 8 |
| | bit_depth_chroma_minus8 | BIT DEPTH OF "B" or "R" COMPONENT − 8 |
| | num_short_term_ref_pic_sets long_term_ref_pics_present_flag num_long_term_ref_pics_sps sps_temporal_mvp_enabled_flag | 0 (WHEN NO TIME REFERENCE IS USED) |
| Slice segment header | slice_type | 2 (I_SLICE) (WHEN NO TIME REFERENCE IS USED) |
| ADDITIONAL INFORMATION (SEI etc.) | | PACKING INFORMATION TO YUV SPACE |

FIG. 23

| Syntax position | Syntax name | Value |
|---|---|---|
| Sequence Parameter Set | chroma_format_idc | 3 (4:4:4) ONLY 4:4:4 CAN ENCODE YC INDEPENDENTLY. WHEN RATIOS OF THE NUMBER OF PIXELS OF COMPONENTS OF SENSOR ARE NOT 4:4:4, RATIOS ARE MADE TO SAME RATIOS BY PACKING OF PREPROCESSING OR THE LIKE. |
| | separate_colour_plane_flag | 1 |
| | pic_width_in_luma_samples | THE NUMBER OF HORIZONTAL PIXELS PER ONE COMPONENT |
| | pic_height_in_luma_samples | THE NUMBER OF VERTICAL PIXELS PER ONE COMPONENT |
| | bit_depth_luma_minus8 | BIT DEPTH OF COMPONENT 1 - 8 |
| | bit_depth_chroma_minus8 | BIT DEPTH OF COMPONENTS 2 AND 3 - 8 |
| Slice segment header | colour_plane_id | 0, 1, 2 (CORRESPONDING TO COMPONENT NUMBER) |

FIG. 24

| Syntax position | Syntax name | Value |
|---|---|---|
| Picture Parameter Set | tiles_enabled_flag | 1 (WHEN TILE IS USED) |
| | num_tile_columns_minus1 | THE NUMBER OF DIVISION AS NEEDED - 1 |
| | num_tile_rows_minus1 | THE NUMBER OF DIVISION AS NEEDED - 1 |
| Slice header | | DIVIDE AS NEEDED |
| | | |
| | | |
| | | |
| | | |
| | | |

FIG. 25

| Syntax position | Syntax name | Value |
|---|---|---|
| Sequence Parameter Set | chroma_format_idc | 0 (4:0:0) |
| | separate_colour_plane_flag | 0 |
| | pic_width_in_luma_samples | THE NUMBER OF HORIZONTAL PIXELS WHEN ALL COMPONENTS ARE EXPANDED ON ONE PLANE |
| | pic_height_in_luma_samples | THE NUMBER OF VERTICAL PIXELS WHEN ALL COMPONENTS ARE EXPANDED ON ONE PLANE |
| | bit_depth_luma_minus8 | BIT DEPTH PER COMPONENT − 8 |
| | bit_depth_chroma_minus8 | 0 (IGNORED) |
| Picture Parameter Set | tiles_enabled_flag | 1 (WHEN TILE IS USED) |
| ADDITIONAL INFORMATION (SEI etc.) | | PACKING INFORMATION TO Y SPACE INFORMATION ASSOCIATING NAL OR Slice/Tile AND COMPONENT |

FIG. 26

| Syntax position | Syntax name | Value |
|---|---|---|
| NAL Unit header | nuh_layer_id | 0, 1, 2, ... THE NUMBER OF COMPONENTS – 1 |
| Video Parameter Set | vps_max_layers_minus1 | THE NUMBER OF COMPONENTS – 1 |
| Sequence Parameter Set (TRANSMITTABLE FOR EACH Layer) | chroma_format_idc | 0 (4:0:0) |
| | separate_colour_plane_flag | 0 |
| | pic_width_in_luma_samples | THE NUMBER OF HORIZONTAL PIXELS OF COMPONENT (INDEPENDENTLY SETTABLE FOR EACH Layer) |
| | pic_height_in_luma_samples | THE NUMBER OF VERTICAL PIXELS OF COMPONENT (INDEPENDENTLY SETTABLE FOR EACH Layer) |
| | bit_depth_luma_minus8 | BIT DEPTH OF COMPONENT – 8 (INDEPENDENTLY SETTABLE FOR EACH Layer) |
| | bit_depth_chroma_minus8 | 0 (IGNORED) |
| | num_short_term_ref_pic_sets long_term_ref_pics_present_flag num_long_term_ref_pics_sps sps_temporal_mvp_enabled_flag | 0 (WHEN NO TIME REFERENCE IS USED) |
| Slice segment header | slice_type | 2 (I_SLICE) (WHEN NO TIME REFERENCE IS USED) |
| ADDITIONAL INFORMATION (SEI etc.) | | PACKING INFORMATION TO Layer |

FIG. 27

| Syntax position | Syntax name | Value |
|---|---|---|
| Video Parameter Set | vps_max_layers_minus1 | 1 (THUMBNAIL) + THE NUMBER OF COMPONENTS − 1 |
| NAL Unit header | nuh_layer_id | 0 |
| | | ENCODING INFORMATION OF THUMBNAIL |
| | nuh_layer_id | 1, 2, 3, ... THE NUMBER OF COMPONENTS − 1 |
| | | ENCODING INFORMATION OF Raw |
| | | |
| | | |
| | | |

FIG. 28

| Syntax position | Syntax name | Value |
|---|---|---|
| Sequence parameter set | sample_adaptive_offset_enabled_flag | 0 |
| Picture parameter set | deblocking_filter_control_present_flag | 1 |
| | pps_deblocking_filter_disabled_flag | 1 |

IMAGE PROCESSING APPARATUS AND METHOD

CROSS REFERENCE TO RELATED APPLICATIONS

This application is a U.S. National Phase of International Patent Application No. PCT/JP2014/077781 filed on Oct. 20, 2014, which claims priority benefit of Japanese Patent Application No. JP 2013-228357 filed in the Japan Patent Office on Nov. 1, 2013. Each of the above-referenced applications is hereby incorporated herein by reference in its entirety.

TECHNICAL FIELD

The present disclosure relates to an image processing apparatus and a method, and especially relates to an image processing apparatus and a method that easily improve encoding efficiency.

BACKGROUND ART

In recent years, demands for compression of RAW data that is image data generated in image sensors or the like, and before demosaicing processing or the like is performed have been increasing.

As a system of encoding the image data, there is MPEG-4 Part10 (Advanced Video Coding, hereinafter, written as AVC). In recent years, with a view to improving encoding efficiency, standardization of an encoding system called high efficiency video coding (HEVC) has been in progress by a joint collaboration team—video coding (JCTVC) that is a joint standardization organization of International Telecommunication Union Telecommunication Standardization Sector (ITU-T) and International Organization for Standardization/International Electrotechnical Commission (ISO/IEC) (for example, see Non-Patent Document 1).

CITATION LIST

Non-Patent Document

Non-Patent Document 1: Benjamin Bross, Woo-Jin Han, Jens-Rainer Ohm, Gary J. Sullivan, Ye-Kui Wang, Thomas Wiegand, "High Efficiency Video Coding (HEVC) text specification draft 10 (for FDIS & Last Call)", JCTVC-L1003_version 34, 2013-03-19

SUMMARY OF THE INVENTION

Problems to be Solved by the Invention

However, pixels in low correlation are adjacent in the RAW data. Therefore, it is difficult for an image encoding system like HEVC to efficiently perform encoding.

The present disclosure has been made in view of the foregoing, and enables the encoding efficiency to be easily improved in encoding RAW data.

Solution to Problems

An image processing apparatus of one aspect of the present technology is an image processing apparatus including a packing processing unit configured to perform packing processing of rearranging pixel data of RAW data that is image data before demosaicing processing is performed according to the degree of correlation, and an encoding unit configured to encode the RAW data subjected to the packing processing by the packing processing unit.

The packing processing unit can include a separating unit that separates the pixel data of the RAW data on a data by data basis, the data having high correlation, an rearrangement unit that rearranges pixel data groups separated on a data by data basis, the data having high correlation, by the separating unit, and a generation unit that generates packing information related to the packing processing.

The separating unit can separate the pixel data on a pixel by pixel basis, the pixel being allocated the same type of filter.

The separating unit can separate the pixel data on a pixel by pixel basis, the pixel being allocated a color filter of the same color.

The rearrangement unit can rearrange the pixel data groups as components of a predetermined color space, and the encoding unit can encode the components together or dependently of each other.

The encoding unit can encode the components on a partial region by a partial region basis of an image of the RAW data.

The rearrangement unit can rearrange the pixel data groups as mutually different partial regions of one or a plurality of images.

The rearrangement unit can rearrange the pixel data groups as data of mutually different hierarchies of hierarchized image data.

The rearrangement unit can rearrange the image data subjected to the demosaicing processing to a part of hierarchies.

An image processing method of one aspect of the present technology is an image processing method including performing packing processing of rearranging pixel data of RAW data that is image data before demosaicing processing is performed according to the degree of correlation, and encoding the RAW data subjected to the packing processing.

An image processing apparatus of another aspect of the present technology is an image processing apparatus including a decoding unit configured to decode encoded data that is encoded RAW data that is image data before demosaicing processing is performed, and an unpacking processing unit configured to perform unpacking processing of returning pixel data to an arrangement before packing processing is performed, for the RAW data subjected to the packing processing of rearranging the pixel data according to the degree of correlation, the RAW data being obtained by decoding by the decoding unit.

The unpacking processing unit can include a parsing unit that parses packing information related to the packing processing, a separating unit that separates the pixel data of the RAW data subjected to the packing processing, based on the packing information parsed by the parsing unit, and a rearrangement unit that rearranges the pixel data separated on a data by data basis, the data having high correlation, by the separating unit, to be returned to an arrangement before the packing processing is performed, based on the packing information parsed by the parsing unit.

The separating unit can separate the pixel data rearranged on a pixel by pixel basis, the pixel being allocated the same type of filter by the packing processing, and the rearrangement unit can rearrange the pixel data according to an array of the filter.

The separating unit can separate the pixel data rearranged on a pixel by pixel basis, the pixel being allocated a color filter of the same color by the packing processing, and the rearrangement unit can rearrange the pixel data according to an array of the color filter.

The separating unit can separate the pixel data rearranged into components of a predetermined color space on a data by data basis, the data having high correlation.

The decoding unit can decode the encoded data that is encoded components on a partial region by partial region basis of an image of the RAW data, on the partial region by partial region basis.

The separating unit can separate the pixel data rearranged in mutually different partial regions of one or a plurality of images, on a data by data basis, the data having high correlation.

The separating unit can separate the pixel data rearranged in mutually different hierarchies of hierarchized image data on a data by data basis, the data having high correlation.

The separating unit can separate the pixel data rearranged in other hierarchies except a part of hierarchies, the image data subjected to the demosaicing processing being arranged in the part.

An image processing method of another aspect of the present technology is an image processing method including decoding encoded data that is encoded RAW data that is image data before demosaicing processing is performed, and performing unpacking processing of returning the pixel data to an arrangement before packing processing is performed, for the RAW data subjected to the packing processing of rearranging the pixel data according to the degree of correlation, the RAW data being obtained by decoding.

In one aspect of the present technology, packing processing of rearranging pixel data of RAW data that is image data before demosaicing processing is performed according to the degree of correlation is performed, and the RAW data subjected to the packing processing is encoded.

In another aspect of the present technology, encoded data that is encoded RAW data that is image data before demosaicing processing is performed is decoded, and unpacking processing of returning pixel data to an arrangement before packing processing is performed, for the RAW data subjected to the packing processing of rearranging the pixel data according to the degree of correlation, the RAW data being obtained by decoding is performed.

Effects of the Invention

According to the present disclosure, an image can be encoded/decoded. Especially, the encoding efficiency can be more easily improved.

BRIEF DESCRIPTION OF DRAWINGS

FIG. 13 is a diagram for describing an example of packing processing.
FIG. 14 is a diagram for describing an example of characteristics of packing processing.
FIGS. 15A and 15B are diagrams illustrating an example of syntax and semantics.
FIG. 16 is a diagram illustrating an example of syntax of CFAP SEI.
FIG. 17 is a diagram illustrating an example of semantics of CFAP SEI.
FIG. 18 is a diagram illustrating an example of CFAP_type.
FIG. 22 is a diagram illustrating an example of setting various syntax elements.
FIG. 23 is a diagram illustrating an example of setting various syntax elements.
FIG. 24 is a diagram illustrating an example of setting various syntax elements.
FIG. 25 is a diagram illustrating an example of setting various syntax elements.
FIG. 26 is a diagram illustrating an example of setting various syntax elements.
FIG. 27 is a diagram illustrating an example of setting various syntax elements.
FIG. 28 is a diagram illustrating an example of setting various syntax elements.

MODE FOR CARRYING OUT THE INVENTION

Figure 1:
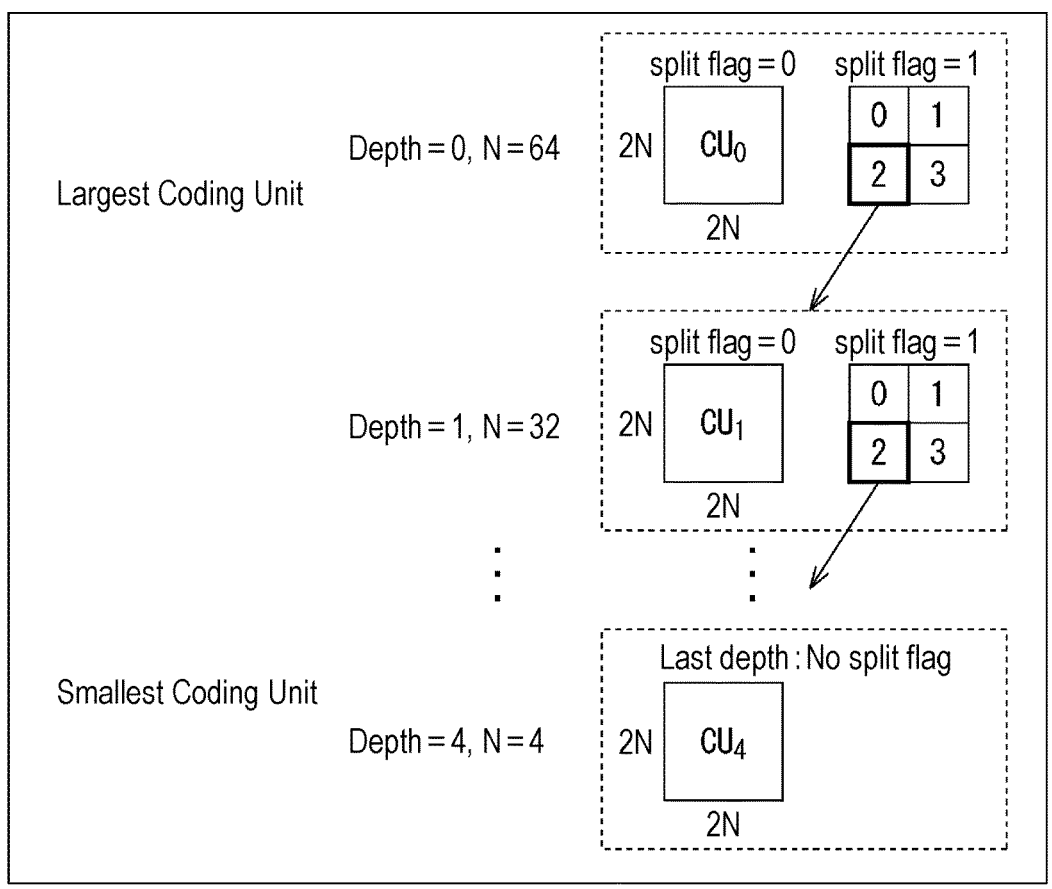
FIG. 1 is a diagram for describing a configuration example of a coding unit.

Hereinafter, embodiments for implementing the present disclosure (hereinafter, referred to as embodiments) will be described. Note that the description will be given according to the following order.

1. First Embodiment (Packing and Transmission of Packing Information)

2. Second Embodiment (Image Encoding Device)

3. Third Embodiment (Image Decoding Device)

4. Fourth Embodiment (Multi-view Image Encoding/Multi-view Image Decoding Device)

5. Fifth Embodiment (Computer)

6. Sixth Embodiment (Application Example)

7. Seventh Embodiment (Set Unit Module Processor)

1. First Embodiment

<Flow of Standardization of Image Encoding>

In recent years, devices that digitally handle image information with a view to highly efficient transmission and accumulation of the information, and compress and encode images by employing an encoding system that performs compression by orthogonal transform such as discrete cosine transform and motion compensation, using redundancy inherent to the image information, have been spreading. An example of this encoding system includes Moving Picture Experts Group (MPEG).

Especially, MPEG2 (ISO/IEC 13818-2) is defined as a general-purpose image encoding system, and is applicable to both interlaced scanned images and progressive scanned images, and to standard-resolution images and high-definition images. For example, currently, MPEG2 is used in a wide range of applications for professionals and general consumers. By use of the MPEG2 compression system, a code amount (bit rate) of 4 to 8 Mbps is assigned to an interlaced image having a standard resolution of 720×480 pixels, and a code amount (bit rate) of 18 to 22 Mbps is assigned to an interlaced image having a high resolution of 1920×1088 pixels, for example. Accordingly, high compression rates and favorable image quality can be realized.

MPEG2 is designed mainly for high-quality image encoding adapted to broadcasting, but is not compatible with a lower code amount (lower bit rates) than MPEG1 or encoding systems with higher compression rates. With the popularization of mobile terminals, the demand for such encoding systems is expected to increase in the future, and to meet the demands, the MPEG4 encoding system has been standardized. As for image encoding systems, the ISO/IEC 14496-2 standard was approved as an international standard in December 1998.

Further, a standard called H.26L (International Telecommunication Union Telecommunication Standardization Sector (ITU-T) Q6/16 Video Coding Expert Group (VCEG)), which is originally intended for encoding images for video conferences, is currently being set. Compared with the conventional encoding systems such as MPEG2 and MPEG4, H.26L requires a larger amount of calculation in encoding and decoding, but is known to achieve higher encoding efficiency. Further, as a part of the MPEG4 activity, Joint Model of Enhanced-Compression Video Coding is now being established as a standard for achieving higher encoding efficiency by incorporating functions unsupported by H.26L into the functions based on H.26L.

On the standardization schedule, the standard was approved as an international standard under the name of H.264 and MPEG-4 Part 10 (Advanced Video Coding, hereinafter referred to as AVC) in March 2003.

Further, as an extension of H. 264/AVC, FRExt (Fidelity Range Extension) involving encoding tools required for professional use, such as RGB, 4:2:2, and 4:4:4, and 8×8 DCT and quantization matrixes defined by MPEG-2, was set as a standard in February 2005. This is an encoding method that enables excellent representation of even film noise contained in movie films by using H. 264/AVC, and is now used in a wide range of applications such as Blu-Ray discs (trademark).

However, there is an increasing demand for encoding at a higher compression rate to compress images having about 4000×2000 pixels, which is four times higher than the high-definition image resolution, or distribute high-definition images in circumstances of limited transmission capacities like the Internet. Therefore, studies related to improvement in encoding efficiency are still continued by VCEG under ITU-T.

Therefore, currently, with a view to further improvement of the encoding efficiency from AVC, standardization of an encoding system called High Efficiency Video Coding (HEVC) has been in progress by Joint Collaboration Team—Video Coding (JCTVC) that is a joint standardization group of ITU-T and International Organization for Standardization/International Electrotechnical Commission (ISO/IEC). As for the HEVC standard, Committee draft in a draft version specification was issued on January 2013 (for example, see Non-Patent Document 1).

<Encoding System>

Hereinafter, the present technology will be described using an application to image encoding/decoding of High Efficiency Video Coding (HEVC) system, as an example.

<Coding Unit>

In an advanced video coding (AVC) system, a hierarchical structure made of macroblocks and sub macroblocks is defined. However, a macroblock of 16×16 pixels is not optimal for a large frame such as an Ultra High Definition (UHD: 4000×2000 pixels) frame, which is to be encoded by a next-generation encoding method.

In contrast, in the HEVC system, as illustrated in FIG. 1, coding unit (CU) is defined.

CU is also called Coding Tree Block (CTB), and is a partial region of an image in units of picture, which serves a role similar to the macroblocks in the AVC system. While the size of the latter is fixed to 16×16 pixels, the size of the former is not fixed to a certain size, and is specified in image compressed information in each sequence.

For example, in a sequence parameter set (Sequence Parameter Set (SPS)) contained in encoded data to be output, the maximum size (Largest Coding unit (LCU)) and the minimum size (Smallest Coding Unit (SCU)) of the CU are defined.

In each LCU, split–flag=1 is set within a range not smaller than the SCU size, so that each LCU can be divided into CUs of a smaller size. In the example of FIG. 1, the size of the LCU is 128, and the maximum hierarchical depth is 5. When the value of split_flag is "1", a CU of 2N×2N in size is divided into CUs of N×N in size, which is one lower hierarchy.

Further, the CU is further divided into Prediction Units (PUs) that are processing-unit regions (partial regions of an image in units of picture) for intra or inter prediction, or is divided into Transform Units (TUs) that are processing-unit regions (partial regions of an image in units of picture) for orthogonal transform. At present, 16×16 and 32×32 orthogonal transform, as well as 4×4 and 8×8 orthogonal transform, can be used in the HEVC system.

In a case of an encoding system where the CU is defined and various types of processing are performed in units of CU in the manner like the HEVC system, the macroblock in the AVC system can be considered to correspond to the LCU, and the block (sub-block) can be considered to correspond to the CU. Further, a motion compensation block in the AVC system can be considered to correspond to the PU. However, the CU has a hierarchical structure. Therefore, the size of the LCU on the highest hierarchy is typically as large as 128×128 pixels, which is larger than the size of the macroblock in the AVC system, for example.

Therefore, hereinafter, the LCU contains the macroblock in the AVC system, and the CU contains the block (sub block) in the AVC system. That is, "block" used in the description below indicates an arbitrary partial region in a picture, and the size, shape, characteristics, and the like thereof are not limited. That is, the "block" contains arbitrary regions (processing unit) such as TU, PU, SCU, CU, LCU, sub block, macroblock, and slice. Apparently, partial regions (processing unit) other than the above regions are also contained. When the size, the processing unit, or the like needs to be defined, description will be appropriately given.

Further, in the present specification, a Coding Tree Unit (CTU) is a unit containing a Coding Tree Block (CTB) of the LCU (the maximum number of CUs), and a parameter of when processing is performed at an LCU base (level). Further, the coding unit (CU) that configures the CTU is a unit containing the Coding Block (CB), and a parameter of when processing is performed at a CU base (level).

<Mode Selection>

By the way, to achieve higher encoding efficiency in the AVC and HEVC encoding systems, selection of an appropriate prediction mode is important.

An example of such a selection system includes a method mounted in H.264/MPEG-4 AVC reference software, called Joint Model (JM) (available at http://iphome.hhi.de/suehring/tml/index.htm).

In JM, the two mode determination methods including High Complexity Mode and Low Complexity Mode, described below, can be selected. By either of the methods, a cost function value as to each prediction mode Mode is calculated, and the prediction mode that minimizes the cost function value is selected as the optimum mode for the block or macroblock.

A cost function in High Complexity Mode is expressed by the following equation (1).

[Mathematical Formula 1]

$$\text{Cost}(\text{Mode} \in \Omega)) = D + \lambda * R \quad (1)$$

Here, $\Omega$ represents a universal set of candidate modes for encoding the block or macroblock, and D represents the difference energy between a decoded image and an input image when encoding is performed in the prediction mode. $\lambda$ represents the Lagrange's undetermined multiplier provided as a quantization parameter function. R represents a total bit rate in a case where encoding is performed in the mode, including an orthogonal transform coefficient.

That is, to perform encoding in High Complexity Mode, a provisional encoding processing needs to be performed once in all the candidate modes to calculate the above parameters D and R. Therefore, a larger amount of calculation is required.

A cost function in Low Complexity Mode is expressed by the following equation (2).

[Mathematical Formula 2]

$$\text{Cost}(\text{Mode} \in \Omega)) = D + \text{QP2Quant}(\text{QP}) * \text{HeaderBit} \quad (2)$$

Here, D differs from that in High Complexity Mode, and represents difference energy between a predicted image and an input image. QP2Quant (QP) represents a function of a quantization parameter QP, and HeaderBit represents a code amount related to information that excludes the orthogonal transform coefficient and belongs to Header, such as a motion vector and the mode.

That is, in Low Complexity Mode, prediction processing needs to be performed for each of the candidate modes, but a decoded image is not required. Therefore, there is no need to perform encoding processing. Accordingly, the amount of calculation can be smaller than that in High Complexity Mode.

<Hierarchy Encoding>

Figure 2:
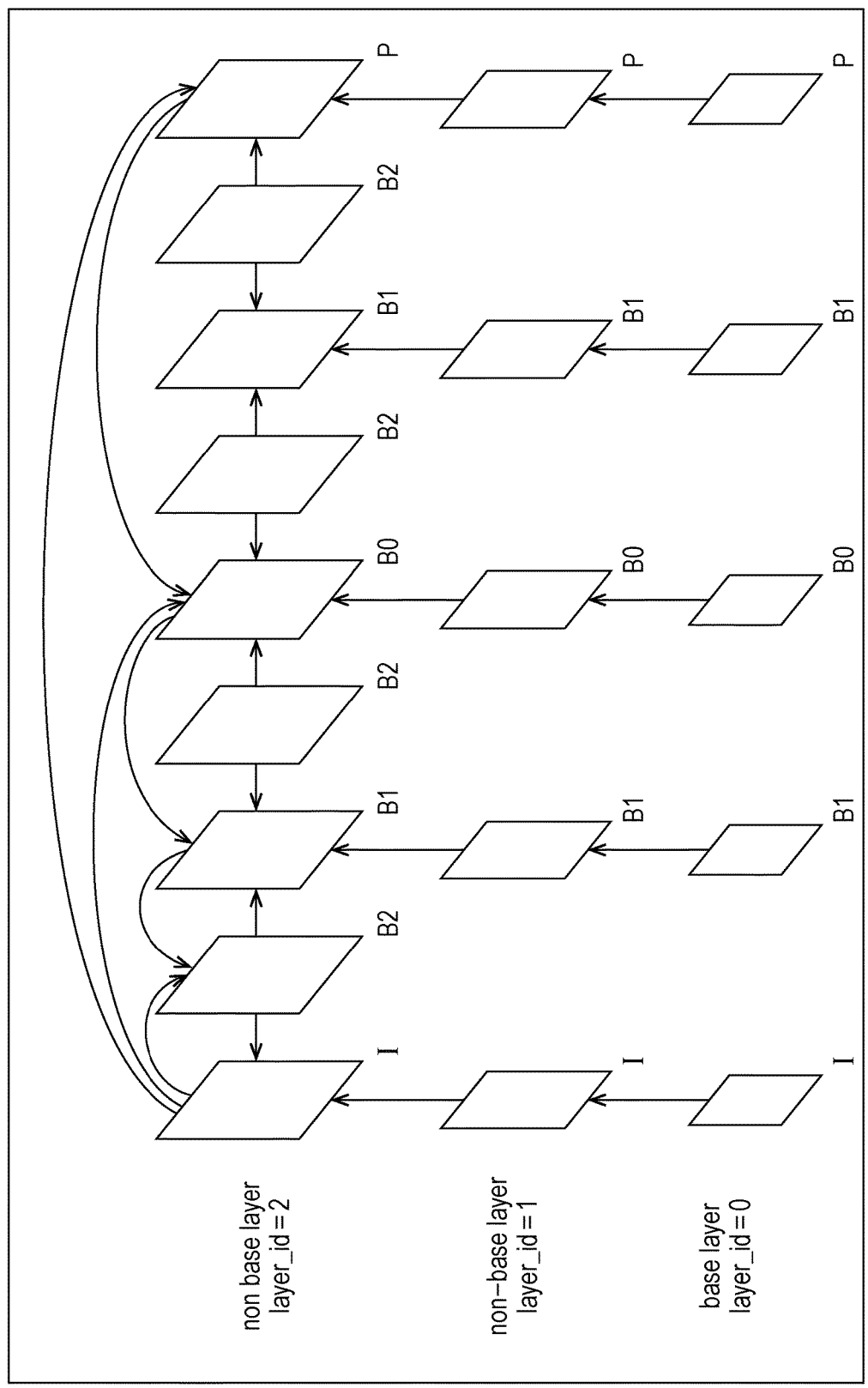
FIG. 2 is a diagram illustrating an example of a hierarchical image encoding system.

By the way, conventional image encoding systems like MPEG2 and AVC have a scalability function. Scalable encoding (hierarchical encoding) is a system that makes an image into a plurality of layers (hierarchies), and performs encoding on a layer by layer basis. FIG. 2 is a diagram illustrating an example of a hierarchical image encoding system.

As illustrated in FIG. 2, in the hierarchization of an image, one image is divided into a plurality of hierarchies (layers) based on a predetermined parameter having the scalability function. That is, the hierarchized image (hierarchical image) includes images in a plurality of hierarchies (layers) with the predetermined parameters having mutually different values. The plurality of layers of the hierarchical image is made of a base layer for which encoding/decoding is performed using only the image of the own layer without using images of other layers, and a non-base layer (also called enhancement layer) for which encoding/decoding is performed using images of other layers. The non-base layer may use an image of the base layer, or may use an image of another non-base layer.

Typically, the non-base layer is configured from data (difference data) of a difference image between the own image and an image of another layer so as to decrease the redundancy. For example, when one image is divided into two hierarchies of the base layer and the non-base layer (also called enhancement layer), a lower-quality image than the original image can be obtained with data of the base layer only, and the original image (that is, a high-quality image) can be obtained by compositing the data of the base layer and data of the non-base layer.

By hierarchizing images as described above, images with a variety of qualities can be easily obtained according to the situation. Image compression information according to capabilities of terminals and networks can be transmitted from a server without performing transcode processing. For example, for a terminal with a low processing capacity, such as a mobile phone, the image compression information of the base layer only is transmitted, and a moving image with a low spatial temporal resolution or with low image quality is reproduced. For a terminal with a high processing capability, such as a television or a personal computer, the image compression information of the enhancement layer is transmitted in addition to that of the base layer, and a moving image with a high spatial temporal resolution or with high image quality is reproduced.

<Scalable Parameter>

Figure 3:
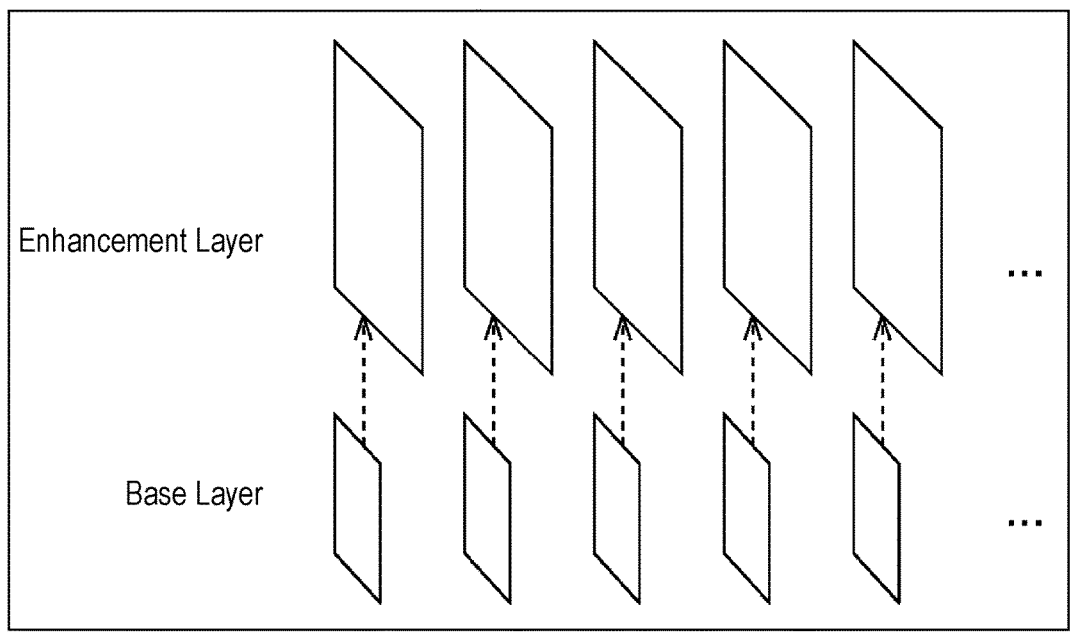
FIG. 3 is a diagram for describing an example of spatial scalable encoding.

In such hierarchical image encoding/hierarchical image decoding (scalable encoding/scalable decoding), the parameter having a scalability function is arbitrary. For example, a spatial resolution as illustrated in FIG. 3 may be used as the parameter (spatial scalability). In the case of the spatial scalability, the resolution of an image differs in each layer. That is, as illustrated in FIG. 3, each picture is hierarchized into two hierarchies of the base layer with a spatially lower resolution than the original image, and the enhancement layer with which the original image (original spatial resolution) can be obtained by being composited with the image of the base layer. Apparently, the number of hierarchies is an example, and an image can be hierarchized into an arbitrary number of hierarchies.

Figure 4:
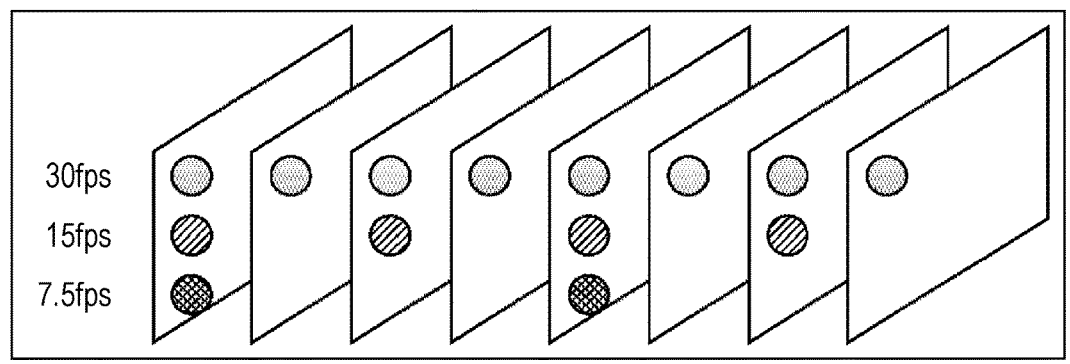
FIG. 4 is a diagram for describing an example of temporal scalable encoding.

Further, as the parameter having scalability, for example, a temporal resolution as illustrated in FIG. 4 may be applied (temporal scalability). In the case of the temporal scalability, the frame rate differs in each layer. That is, in this case, as illustrated in FIG. 4, an image is hierarchized into layers with mutually different frame rates. A layer with a high frame rate is added to a layer with a lower frame rate, so that a moving image with a higher frame rate can be obtained, and all the layers are added, so that the original moving image (original frame rate) can be obtained. The number of hierarchies is an example, and an image can be hierarchized into an arbitrary number of hierarchies.

Figure 5:
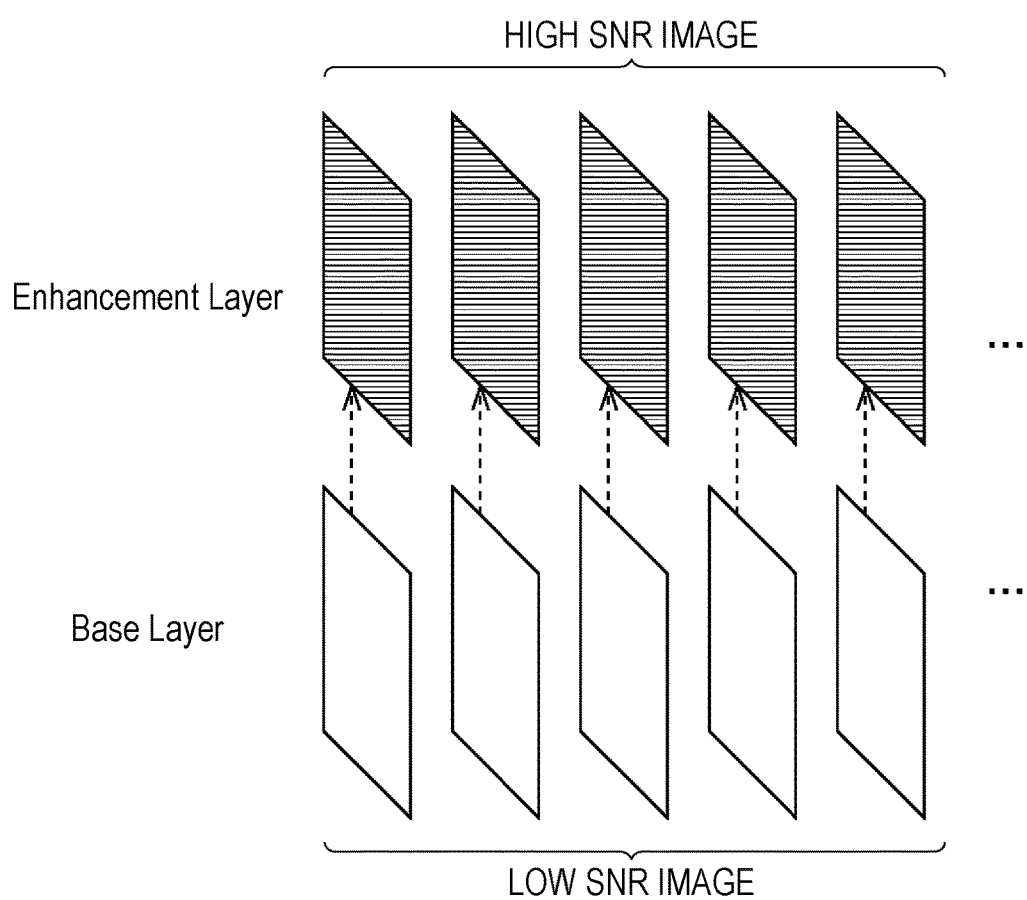
FIG. 5 is a diagram for describing an example of scalable encoding of a signal/noise ratio.

Further, as the parameter having scalability, for example, a signal to noise ratio (SNR) as illustrated in FIG. 5 may be applied (SNR scalability). In the case of the SNR scalability, the SN ratio differs in each layer. That is, in this case, as illustrated in FIG. 5, each picture is hierarchized into two hierarchies of the base layer with a lower SNR than the original image, and the enhancement layer with which the original image (original SNR) can be obtained by being composited with the image of the base layer. That is, in the base layer image compression information, information related to an image with a low PSNR is transmitted, and the enhancement layer image compression information is added thereto, so that a high PSNR image can be reconfigured. Apparently, the number of hierarchies is an example, and an image can be hierarchized into an arbitrary number of hierarchies.

The parameter having scalability may be another one. For example, there is bit-depth scalability in which the base layer is made of an 8-bit image, and the enhancement layer is added thereto, so that 10-bit image can be obtained.

Further, there is chroma scalability in which the base layer is made of a component image in the 4:2:0 format, and the enhancement layer is added thereto, so that a component image in the 4:2:2 format can be obtained.

<RAW Data>

By the way, in recent years, RAW data that is image data before demosaicing processing is performed has become used.

In single-plate type charge coupled device (CCD) image sensors or complementary metal oxide semiconductor (CMOS) image sensors employed in many digital cameras, each pixel has single color information. Therefore, typically, "demosaicing" (de-mosaic) processing of gathering insufficient color information from peripheral pixels of each pixel to supplement the color information, and creating a full-color image is performed at the time of capturing. Further, in many digital cameras, image processing of automatically retouching tones of the color and brightness is performed in parallel to the demosaicing, and a completed image is stored in a general purpose image format such as Joint Photographic Experts Group (JPEG) or Tagged Image File Format (TIFF).

However, accuracy of the demosaicing and the automatic retouching may exert substantial influence on the image quality of the completed image. Further, after the processing (also called development processing), white balance (color temperature) and the like are fixed. Therefore, modification cannot be easily performed. Further, the JPEG format used for final storage is typically lossy compression, and thinning of the color information in a horizontal direction is also performed. Therefore, in principle, the image quality may be deteriorated, compared with the original data. Further, the color depth of the format has typically only 8 bits for each color (24 bits as a total). Therefore, there is no choice but to substantially discard information received from the image sensor with 12-bit accuracy, and exposure (light and dark, and luminance of the image) adjustment after capturing may become difficult.

As described above, raw data before demosaicing, that is, the RAW data has been used with a view to suppressing deterioration of the image quality, maintaining the degree of freedom in adjustment of various parameters related to the image quality, and the like. For example, a function to store the RAW data obtained by imaging, and allow a user or the like to freely perform image processing for the RAW data later has been mounted in digital cameras and the like.

However, the RAW data is large in data size, and has disadvantages in storage and transmission, compared with JPEG data and the like. Especially, in recent years, the data size is going on increasing due to an increase in the number of pixels, and handling (storage, transmission, and the like) of the RAW data becomes more difficult.

<Encoding of RAW Data>

Therefore, demands for compression of the RAW data have been increasing, and higher compression methods have been desired. The above-described HEVC can highly efficiently encode the image data. However, since the RAW data is data obtained from the image sensor or the like, color (band) of information included in each pixel data depends on an array of filters of the image sensor or the like arranged in the each pixel.

Typically, the filters are arrayed such that the entire pixel region can become uniform. Therefore, when filters of a plurality of colors (a plurality of bands) are arranged, the filters of mutually different colors (bands) are arrayed adjacent to each other. As a result, in the RAW data obtained from such an image sensor or the like, pixels having low correlation are adjacent.

The image encoding system like HEVC compresses the information amount using the correlation in a spatial direction or a temporal direction of the image. Therefore, even if the image encoding system is simply applied to encoding of the RAW data where pixels having low correlation are adjacent, the encoding cannot be easily efficiently performed.

<Packing Processing>

Therefore, packing processing of rearranging each pixel data of the RAW data that is image data before demosaicing processing is performed is performed at an encoding side according to the degree of correlation, and the RAW data subjected to the packing processing is encoded. That is, in encoding RAW image data, the packing processing of rearranging the pixel data of the RAW data is performed according to the degree of correlation as processing before the encoding (preprocessing).

By performing the packing processing before encoding, an image in which highly correlated pixels are gathered can be encoded. Therefore, the RAW data can be highly efficiently encoded, similarly to a case of normal image data after demosaicing processing, by a method similar to a normal method of encoding the image data after demosaicing processing (without requiring special processing for RAW data). That is, the encoding efficiency can be more easily improved.

The packing processing may separate the pixel data of the RAW data on a data by data basis, the data having high correlation, rearrange pixel data groups separated on a data by data basis, the data having high correlation, and generate the packing information related to the packing processing for unpacking processing that is inverse processing to the packing processing, for example.

In doing so, the pixel data of the RAW data can be rearranged according to the degree of correlation, and the original RAW data can be easily restored using the packing information.

<Separation>

The method of separating the pixel data of the RAW data on a data by data basis, the data having high correlation, is arbitrary. For example, the correlation of the pixel data may be examined, and the pixel data may be separated based on an examination result. Further, for example, information provided in advance may be used. For example, the pixel data may be separated on a pixel by pixel basis, to which the same type of filters are allocated. For example, when color filters are allocated, the pixel data may be separated on a pixel by pixel basis, to which filters of the same color are allocated. For example, when RGB color filters are allocated, the pixel data may be separated into three groups (pixel data groups) of the pixel data of pixels to which the red (R) filter is allocated, the pixel data of pixels to which the green (G) filter is allocated, and the pixel data of pixels to which the blue (B) filter is allocated.

Apparently, the colors of the color filters and the number of colors are arbitrary. Further, the filters may include filters of other than visible light, such as infrared filters. For example, a white pixel (W) that is a pixel to which a filter that allows all bands to transmit is allocated (or a pixel to which no filter is allocated) may be included. Further, for example, a pixel for detecting depth data (Depth) may be included. Further, for example, filters made of RGB and infrared filters may be allocated. In this case, for example, the pixel data may be separated into four groups (pixel data groups) of the pixel data of pixels to which the red (R) filter is allocated, the pixel data of pixels to which the green (G) filter is allocated, the pixel data of pixels to which the blue (B) filter is allocated, and the pixel data of pixels to which the infrared filter is allocated.

Further, in the case of using the information provided in advance, separation may be performed based on information other than filters. For example, a part or all of the pixels may be separated based on the information other than filters.

As described above, by use of the information of the allocated filters, examination of correlation among the pixel data becomes unnecessary. Therefore, separation of the pixel data can be more easily performed.

<Rearrangement>

The method of rearranging the pixel data groups separated on a data by data basis, the data having high correlation, is arbitrary.

Figure 6:
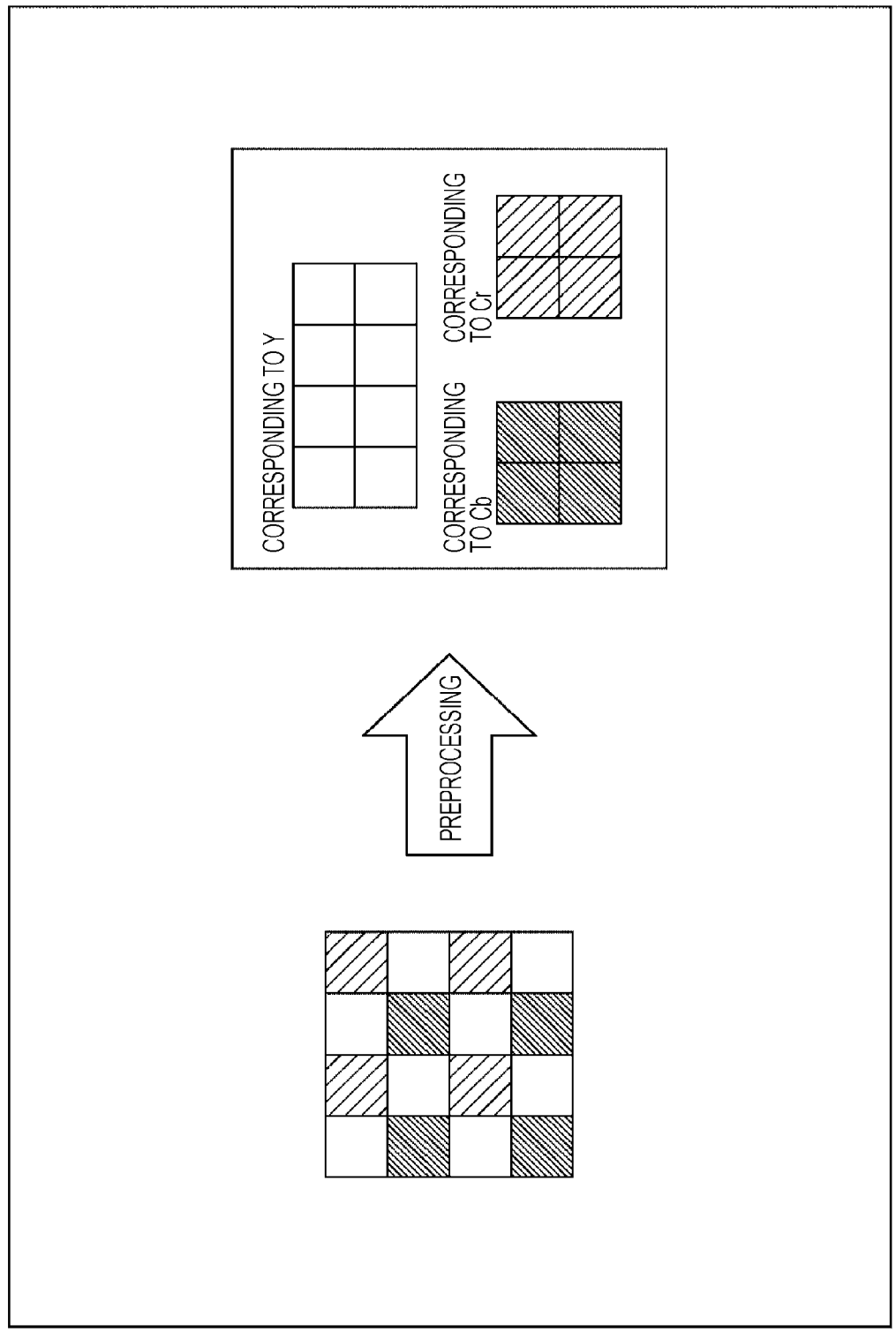
FIG. 6 is a diagram for describing an example of packing processing.

For example, as illustrated in FIG. 6, the pixel data groups may be rearranged as components of a predetermined color space. In the case of FIG. 6, as illustrated in the left drawing, the RGB color filters in a Bayer array are allocated to the RAW data. The packing processing is performed for the RAW data as the preprocessing of encoding, and the RAW data is separated into pixel data groups made of respective color pixels, as illustrated in the right drawing. Then, the pixel data groups are rearranged as respective components (color planes) of an YCbCr color space. To be specific, the green (G) pixel data group illustrated by the white squares is associated with luminance (Y) of a YCbCr component signal, the blue (B) pixel data group illustrated by the squares with slant lines from upper right to lower left is associated with chrominance (Cb) of an YCbCr component signal, and the red (R) pixel data group illustrated by the squares with diagonal lines from lower right to upper left is associated with chrominance (Cr) of an YCbCr component signal. Note that the color space where the pixel data groups are arranged is arbitrary, and another color space such as a YUV, other than YCbCr may be employed.

As described above, the RAW data separated into color planes is encoded in a predetermined color format such as 4:2:0, 4:2:2, or 4:4:4. In which color format the RAW data is encoded depends on ratios of the number of pixels of the color planes. For example, in the case of FIG. 6, since the color filters are in the Bayer array, the number of pixels of the green (G) pixel data group is twice as many as the red (R) pixel data group and the blue (B) pixel data group. Therefore, the color format is 4:2:0.

Note that the color planes (components) may be encoded independently of each other, or the color planes may be commonly encoded (encoded together).

Figure 7:
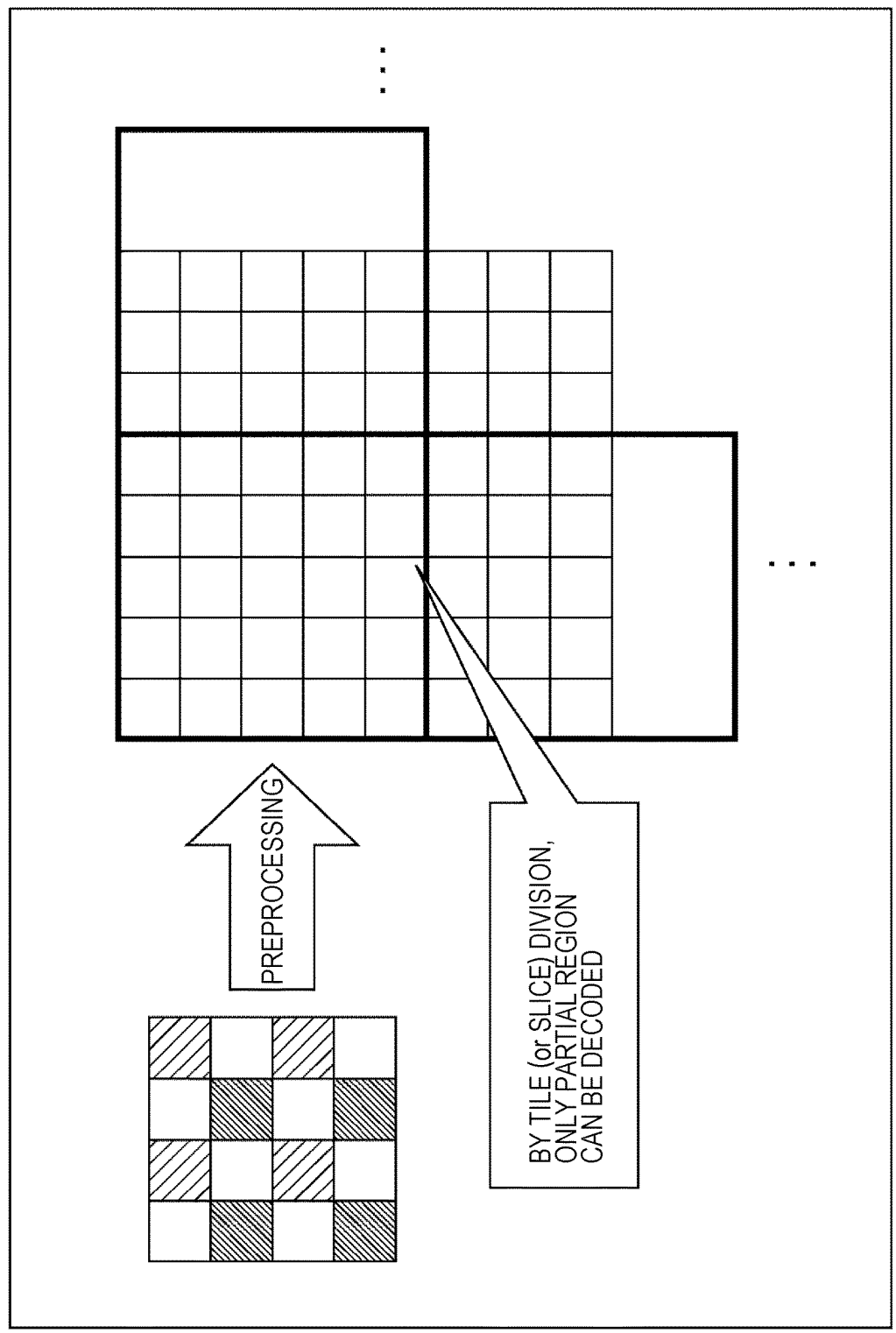
FIG. 7 is a diagram for describing an example of packing processing.

Further, the above encoding may be performed for each partial region of the image of the RAW data, like the example of FIG. 7. In the case of FIG. 7, the pixel data groups in which the RAW data to which the RGB color filters in the Bayer array are allocated, similarly to the case of FIG. 6, is separated and rearranged on a color by color basis by the packing processing, are encoded for each predetermined partial region, such as a tile or a slice. In doing so, decoding can be performed for the each partial region (the tile or slice).

Figure 8:
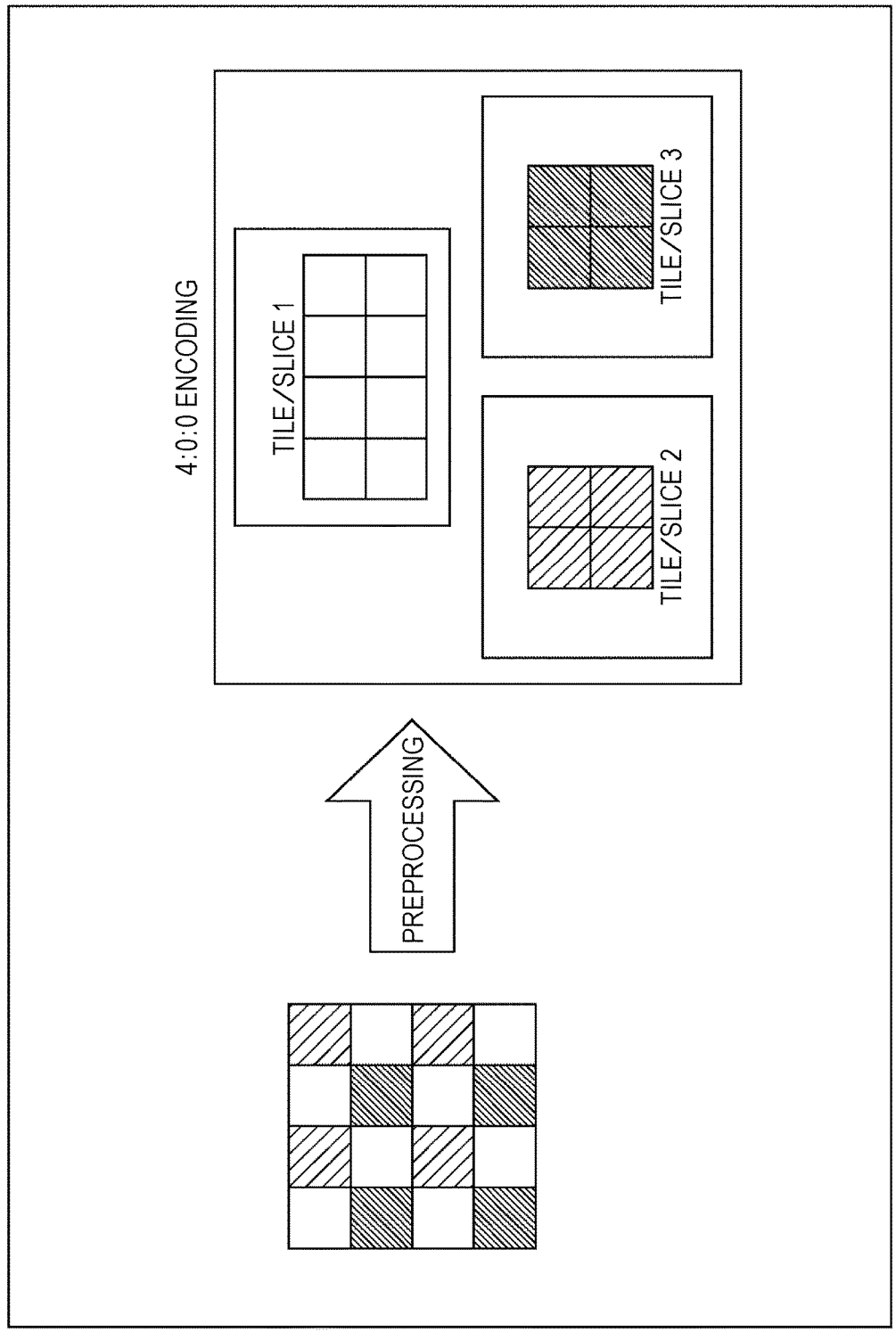
FIG. 8 is a diagram for describing an example of packing processing.

Further, for example, as illustrated in FIG. 8, the pixel data groups may be rearranged as mutually different partial regions of one image. In the case of FIG. 8, the RAW data to which the RGB color filters in the Bayer array are allocated, similarly to the case of FIG. 6, is spatially separated and rearranged by the packing processing. For example, the separated pixel data groups are rearranged in mutually different partial regions (for example, tiles or slices) of one image.

In this case, the RAW data is encoded as one image of one component (for example, only luminance (Y)). That is, all the pixel data groups are regarded as the luminance component, and the RAW data is encoded in the 4:0:0 format. Further, at that time, the RAW data is encoded for each partial region (the tile or the slice) used for separating the pixel data groups as described above.

Figure 9:
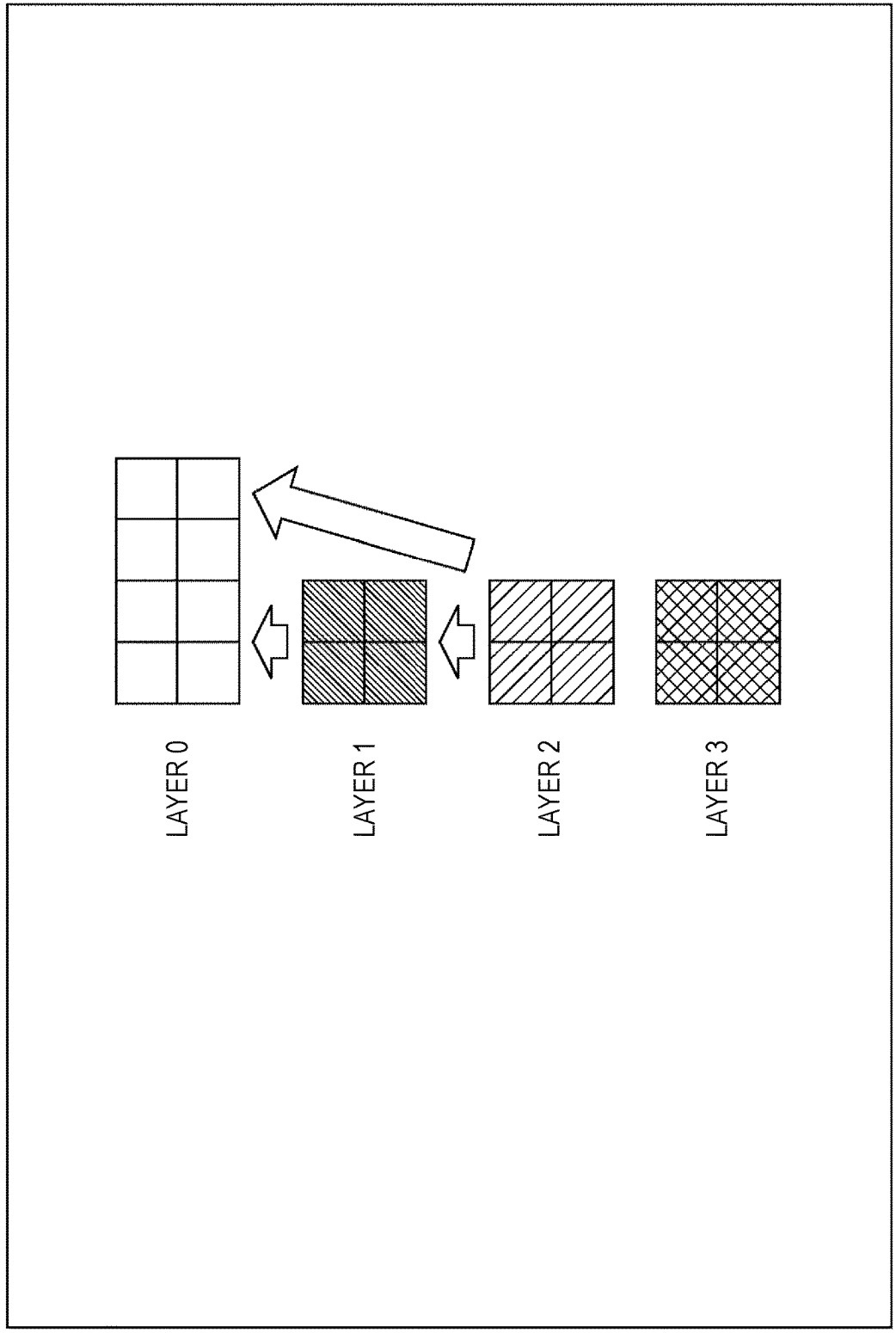
FIG. 9 is a diagram for describing an example of packing processing.

Further, for example, as illustrated in FIG. 9, the pixel data groups may be rearranged as data of mutually different hierarchies (layers) of hierarchized image data. In the case of FIG. 9, the RAW data is spatially separated and rearranged on a data by data basis, the data having high correlation, by the packing processing, similarly to the case of FIG. 6. For example, the separated pixel data groups are rearranged in mutually different hierarchies (layer 0 to layer 3) of one image.

The data of the hierarchies (layers) may be encoded independently of each other, or may be commonly encoded (encoded together). For example, when there is correlation among the hierarchies (pixel data groups), encoding is performed using inter-layer prediction, so that the encoding efficiency can be improved. Further, for example, when there is no correlation among the hierarchies (pixel data groups), like depth information, the data of the hierarchies (layers) is encoded independently of each other, so that decoding can be performed on a hierarchy (layer) by hierarchy (layer) basis.

Figure 10:
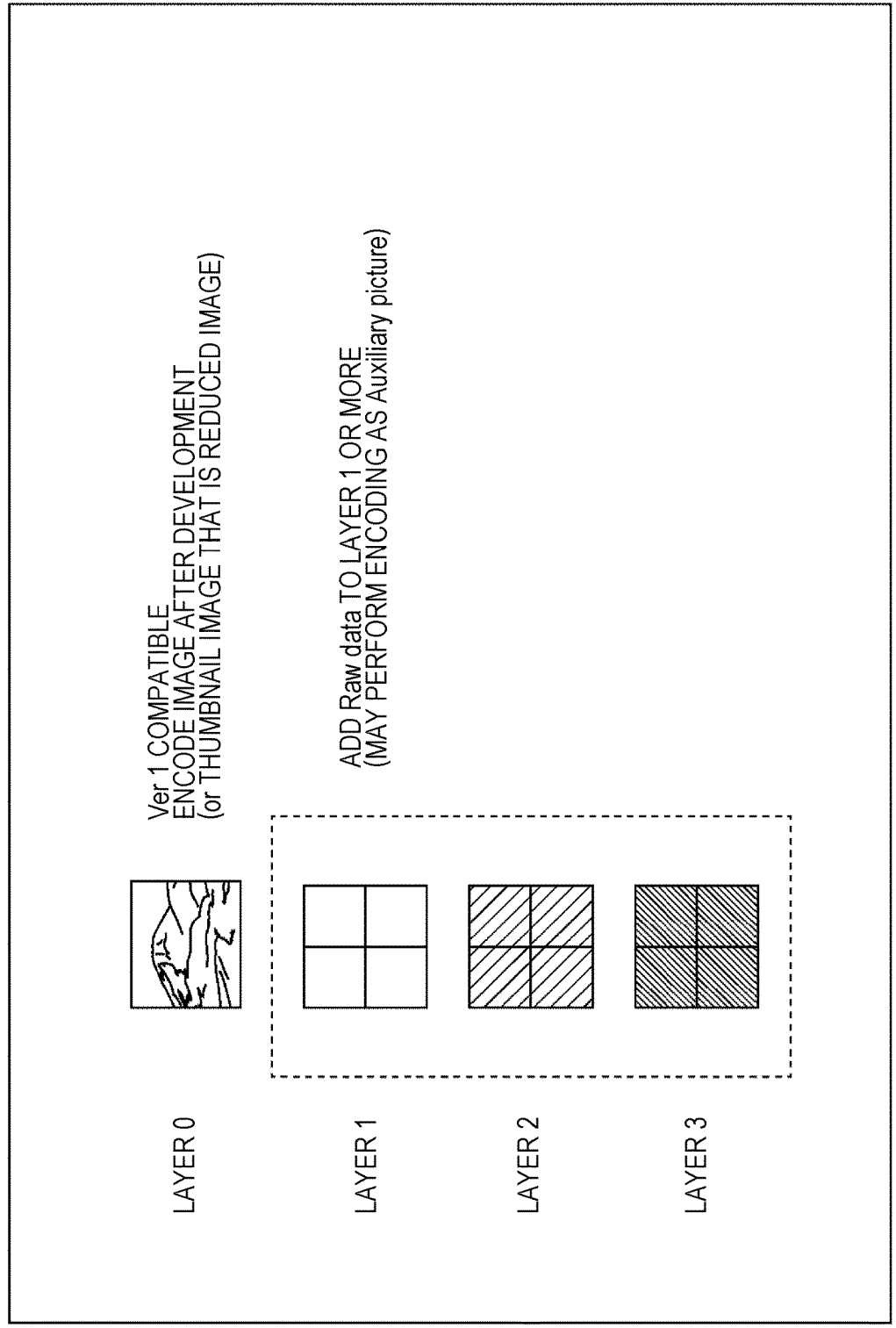
FIG. 10 is a diagram for describing an example of packing processing.

Further, for example, as illustrated in FIG. 10, the image data subjected to the demosaicing processing may be rearranged in a part of hierarchies. In other words, the image data subjected to the demosaicing processing may be arranged in a part of the hierarchies. In the case of FIG. 10, the RAW data to which the RGB color filters in the Bayer array are allocated, similarly to the case of FIG. 6, is separated on a color by color basis by the packing processing, and the pixel data groups of the respective colors are spatially separated and rearranged. For example, the separated pixel data groups are rearranged in mutually different hierarchies (layer 1 to layer 3) of one image. Then, in a predetermined hierarchy (layer 0), the image data that is developed RAW data (subjected to the demosaicing processing and the image processing such as retouching of tones of color and brightness) (or data of a thumbnail image (thumbnail image data) that is a reduced image of the image data) is arranged.

Similarly to the case of FIG. 9, the data of the hierarchies (layers) may be encoded independently of each other, or may be commonly encoded (encoded together).

Figure 11:
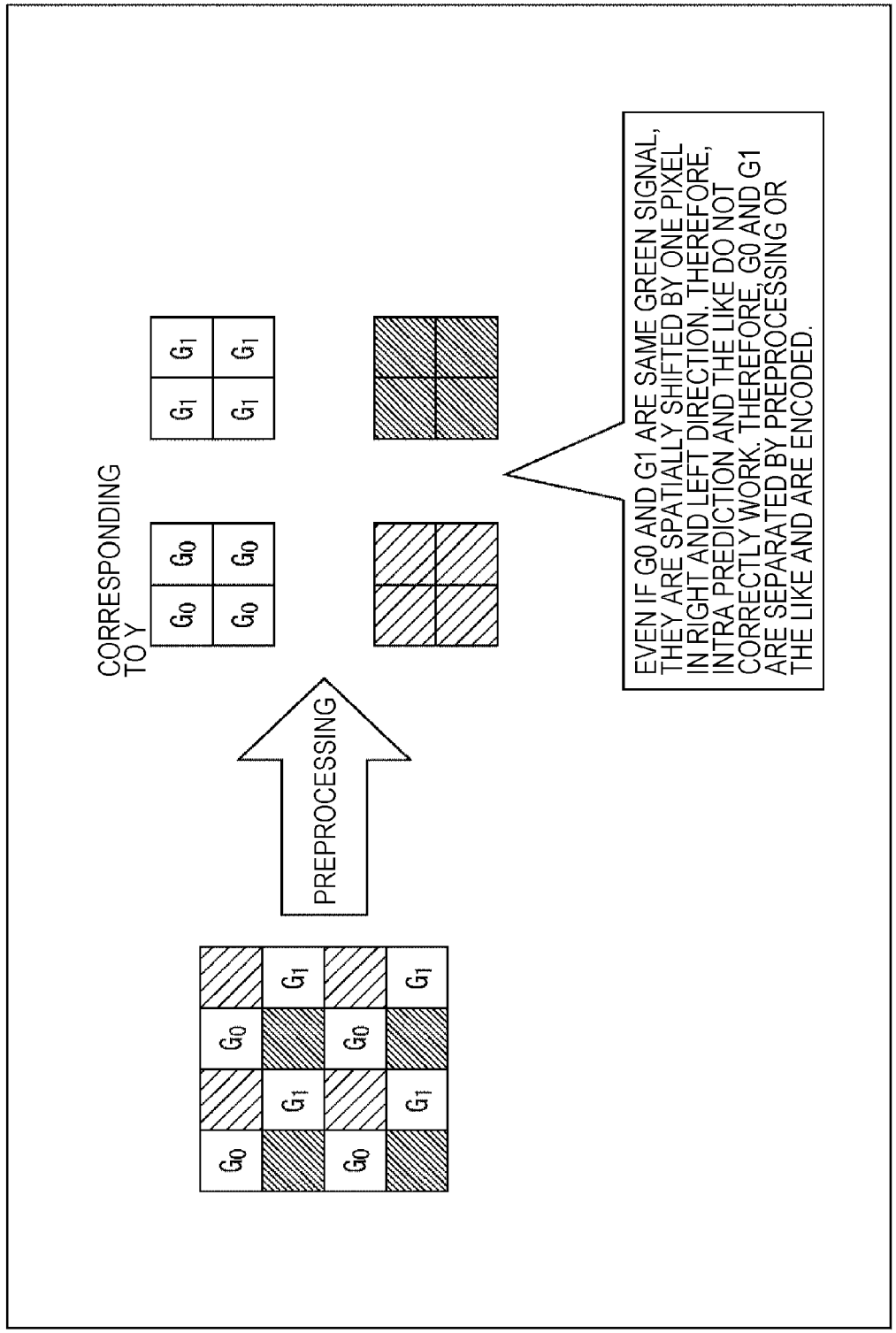
FIG. 11 is a diagram for describing an example of packing processing.

Further, for example, as illustrated in FIG. 11, the pixel data groups may be rearranged as mutually different partial regions of a plurality of images. In the case of FIG. 11, the RAW data to which the RGB color filters in the Bayer array are allocated, similarly to the case of FIG. 6, is subjected to the packing processing. At this time, as illustrated in FIG. 11, even the pixels to which the same green (G) filter is allocated, such as a green ($G_0$) pixel and a green ($G_1$) pixel, are in mutually different phases (spatially shifted by one pixel in the right and left direction). Therefore, intra prediction and the like may not be correctly performed. Therefore, in the case of FIG. 11, the green ($G_0$) pixel and the green ($G_1$) pixel are separated into mutually different pixel data groups, and rearranged.

In the example of FIG. 11, the green ($G_0$) pixel data group and the green ($G_1$) pixel data group are rearranged in mutually different images (frames). For example, the green ($G_0$) pixel data group is rearranged to a frame 0, and the green ($G_1$) pixel data group is rearranged to a frame 1.

Note that the red (R) pixel data group and the blue (B) pixel data group may be respectively rearranged to any frame (the frame 0 or the frame 1). At this time, the red (R) pixel data group and the blue (B) pixel data group may be rearranged to partial regions (tiles or slices) different from the green ($G_0$) pixel data group and the green ($G_1$) pixel data group, or may be rearranged to hierarchies (layers) different from the green ($G_0$) pixel data group and the green ($G_1$) pixel data group.

As described above, the pixel data groups rearranged in a plurality of images (frames) are encoded on an image (frame) by image (frame) basis.

Note that the green ($G_0$) pixel data group and the green ($G_1$) pixel data group may be rearranged in mutually different partial regions (tiles or slices) of the same image, as described by reference to FIG. 8. In this case, the four pixel data groups of the green ($G_0$) pixel data group, the green ($G_1$) pixel data group, the red (R) pixel data group, and the blue (B) pixel data group are rearranged in mutually different partial regions (tiles or slices). Encoding of this case is similarly performed to the case described by reference to FIG. 8.

Further, the green ($G_0$) pixel data group and the green ($G_1$) pixel data group may be rearranged in mutually different hierarchies (layers) of the same image, as described by reference to FIGS. 9 and 10. In this case, the four pixel data groups of the green ($G_0$) pixel data group, the green ($G_1$) pixel data group, the red (R) pixel data group, and the blue (B) pixel data group are rearranged in mutually different hierarchies (layers). Encoding of this case is similarly performed to the case described by reference to FIGS. 9 and 10.

Figure 12:
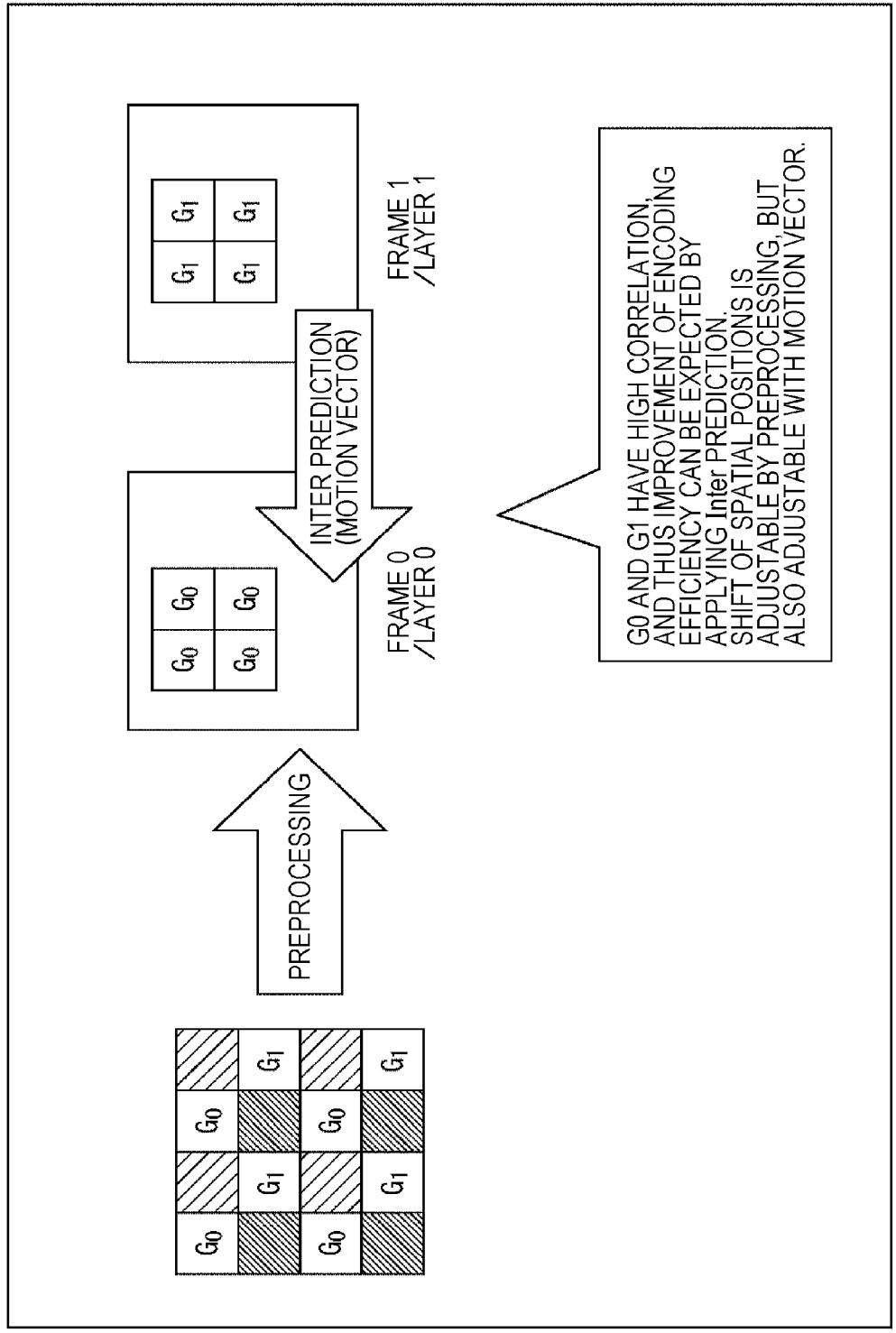
FIG. 12 is a diagram for describing an example of packing processing.

Note that the green ($G_0$) pixel and the green ($G_1$) pixel have high correlation. Therefore, when the green ($G_0$) pixel data group and the green ($G_1$) pixel data group are rearranged in mutually different images (frames or layers), as illustrated in the example of FIG. 11, inter prediction is applied to these pixel data (frames or layers), as illustrated in the example of FIG. 12, and the encoding efficiency can be improved. Note that, as described above, the green (G₀) pixel and the green (G₁) pixel are in mutually different spatial positions (the positions are shifted). This shift may be adjusted as preprocessing, or may be adjusted using a motion vector in the inter prediction.

Further, the positions of the pixels of the pixel data groups separated as described above are typically discrete (at random). Therefore, processing of deblocking filter, sample adaptive offset (SAO), and the like in encoding may not be correctly operated. Therefore, in the encoding, it may be controlled to prohibit (not to execute) in-loop filter processing of performing the above-described processing. For example, when the above-described packing processing is performed in the preprocessing, a value of a syntax element related to the in-loop filter processing may be set to a value for not executing the in-loop filter processing in the parameter set.

<Characteristics of Packing Processing>

Characteristics of the packing method are illustrated in FIG. 14. For example, when the components (pixel data groups) are rearranged to be separated into the color planes, and the color planes are encoded together, the parameters become common, and thus the decoding cannot be performed independently of the components. Further, in this case, the number of handlable components is limited to three or less unless the plurality of pictures or slices is rearranged. In the case of this method, a decoder in the specification of version 1 of the HEVC standard can handle decoding. Further, when the color planes are encoded independently of each other, the number of handlable components is limited to three or less.

In the case of a method of performing encoding in the 4:0:0 format, using the partial regions of tiles or slices, an arbitrary number of components can be handled. In the case of a method of rearranging a plurality of hierarchies (layers), an arbitrary number of components can be handled as long as the number is the limited number of hierarchies or less (64 hierarchies or less, for example). Further, by performing inter-layer prediction in the encoding, the encoding efficiency can be improved using correlation among the components. Whether the encoding efficiency is improved by performing the inter-layer prediction depends on various conditions such as the degree of correlation among the components, and the like. For example, when the correlation with another component is low, like the depth data, independent encoding may be desired.

Further, for example, by arranging an image (or a thumbnail image of the image) after the development processing on the base layer, the decoder in the specification of version 1 of the HEVC standard can decode the image (or the thumbnail image of the image) after the development processing.

As the preprocessing of the encoding, the above packing processing is performed, whereby the encoding efficiency can be more easily improved in the encoding of the RAW data.

Note that the content of the packing processing may be any content, and are not limited to the above-described content as long as the packing processing rearranges the pixel data of the RAW data that is the image data before the demosaicing processing is performed, according to the degree of correlation.

<Providing of Packing Information>

If the encoded data obtained by encoding the RAW data after the packing processing is performed is decoded, the RAW data after the packing processing can be obtained. That is, to restore the original RAW data, unpacking processing that is inverse processing to the packing processing needs to be further performed after the decoding processing.

To perform the unpacking processing for the executed packing processing by a correct method, the packing information that is information related to the packing processing, and generated in the packing processing is desirably provided to the decoding side. Of course, the providing of the packing information may be omitted, and the packing processing and the unpacking processing may be performed by a predetermined method. However, the processing method is limited. Therefore, specifications of the encoding side and the decoding side are limited, and versatility of the system is decreased. By transferring the packing information as described above, a decrease in the degree of freedom in the content of the packing processing (unpacking processing) can be suppressed, and a decrease in versatility of the system can be suppressed. That is, encoded data encoded by encoders in a wider variety of specifications can be correctly decoded by decoders in a wider variety of specifications.

The method of providing the packing information is arbitrary. For example, the packing information can be provided as data different from the bit stream of the encoded data.

Further, the packing information can be provided being included in the bit stream of the encoded data. For example, at the encoding side, additional information including the packing information related to the packing processing of rearranging the pixel data of the RAW data that is the image data before the demosaicing processing is performed according to the degree of correlation may be set, the RAW data subjected to the packing processing may be encoded, and a bit stream that includes the obtained encoded data and the set additional information may be generated.

In doing so, it is not necessary to provide a method of providing the packing information separately from the bit stream. Therefore, transfer of the packing information becomes easier. Further, the information can be put together in one bit stream, and thus management of the transferred data becomes easy. That is, the decoding side can more easily acquire the packing information (can grasp the content of the packing processing), and the encoded data can be correctly decoded (including the unpacking processing). That is, the encoding efficiency can be more easily improved in the encoding of the RAW data.

<Addition of Packing Information>

The method of including the packing information into the bit stream desirably conforms to the encoding method. In doing so, the bit stream can be decoded by a decoder in a specification conforming to the encoding method, and the unpacking processing can be performed. That is, the bit stream can be more easily and correctly decoded (including the unpacking processing). That is, the encoding efficiency can be more easily improved in the encoding of the RAW data.

For example, the parameter set may be set according to the packing processing for the RAW data. For example, a flag (general_camera_sensor_image_packed_flag) that indicates whether the content of the bit stream is the RAW data may be set in a video parameter set (VPS), a sequence parameter set (SPS), or the like.

FIG. 15A illustrates an example of syntax thereof. Further, FIG. 15B illustrates an example of semantics thereof. The general_camera_sensor_image_packed_flag is flag information that indicates whether the content of the bit stream is encoded data of data (that is, RAW data) of a camera sensor image (RAW image).

Then, as the additional information including the packing information, supplemental enhancement information (SEI) may be provided. For example, as the additional information including the packing information, Color filter array packing information SEI (CFAP SEI) may be set.

In that case, for example, existence of the CFAP SEI may be indicated when a value of the general_camera_sensor_image_packed_flag is "1", and non-existence of the CFAP SEI may be indicated when the value of the general_camera_sensor_image_packed_flag is "0". Note that when a decoder cannot process the CFAP SEI, the decoder may just ignore the value of the general_camera_sensor_image_packed_flag.

FIG. 16 illustrates an example of syntax of the CFAP SEI. FIG. 17 illustrates an example of semantics. As illustrated in FIG. 16, in the CFAP SEI, syntax elements such as CFAP_id, CFAP_type, CFAP_component_num, CFAP_component_id[i], CFAP_mapping_info[i], CFAP_bitstream_constraint_indication_flag, and CFAP_no_inloop_filter_used_flag are set.

As illustrated in FIG. 17, CFAP_id is an ID for distinguishing CFAP_SEIs. An arbitrary value can be set. CFAP_id is significant when a plurality of CFAP_SEIs is set to one bit stream. CFAP_type is information that indicates a type of the packing processing (a method of rearranging the pixel data in the packing processing). Examples of values of CFAP_type are illustrated in FIG. 18. In the case of FIG. 18, CFAP_type=0 indicates a method of separating the components into the color planes, like the example of FIG. 6. Further, CFAP_type=1 indicates a method of rearranging the components into the slices, and performing encoding in the YUV400 format, like the example of FIG. 8. Further, CFAP_type=2 indicates a method of rearranging the components into the tiles, and performing encoding in the YUV400 format, like the example of FIG. 8. Further, CFAP_type=3 indicates a method of rearranging the components into the layers, like the example of FIG. 9.

Note that the value of CFAP_type is arbitrary. For each packing method, a value other than the examples illustrated in FIG. 18 may be allocated. For example, a value other than numerical figures may be allocated. Further, a value may be allocated to CFAP_type about a packing method other than the packing methods illustrated in FIG. 18. Note that table information for allocating the packing method to the value of CFAP_type illustrated in FIG. 18 may be defined as an encoding standard in advance, or may be transmitted to the decoding side, by being included in the CFAP SEI, the parameter set, or the like. In that case, an arbitrary packing type can be added to the table.

CFAP_component_num is information that indicates the number of components of the RAW data subjected to the packing processing. A value of 1 or more is set to CFAP_component_num. For example, in the case of the color filters (Bayer filters) in the Bayer array, there are RGB three colors, and thus the value of CFAP_component_num is set to "3". Further, for example, in the case of the color filters (Bayer filters) in the Bayer array, and the green (G) is divided into the green ($G_0$) and the green ($G_1$) according to the spatial phases, the components are handled as $RG_0G_1B$ four components, and thus the value of CFAP_component_num is set to "4".

CFAP_component_id[i] is identification information of the components of the RAW data subjected to the packing processing. An arbitrary value can be set to the value thereof as long as the value can identify the components.

CFAP_mapping_info[i] is information that indicates the configuration of the RAW data subjected to the packing processing. This value is used in combination with CFAP_type. Details will be given below.

CFAP_bitstream_constraint_indication_flag is information that indicates whether an encoder performs any sort of bit stream constraint in encoding. When the value is "1", the value indicates that the encoder has performed any sort of bit stream constraint, and specific additional information has been transmitted. Further, when the value is "0", the value indicates that there is no bit stream constraint.

CFAP_no_inloop_filter_used_flag is information that indicates whether the encoder uses the in-loop filter in encoding. When the value is "1", the value indicates that an in-loop filter (for example, a deblocking filter or SAO) is not used in the bit stream. Further, when the value is "0", the value indicates that there is no such constraint. When this CFAP_no_inloop_filter_used_flag is not transmitted, the decoding side considers that the value thereof is "0".

Note that the packing information defined in the CFAP SEI may be any information as long as the information is related to the packing processing, and is not limited to the example of the above-described syntax elements.

<Setting Example of CFAP SEI>

Figure 19:
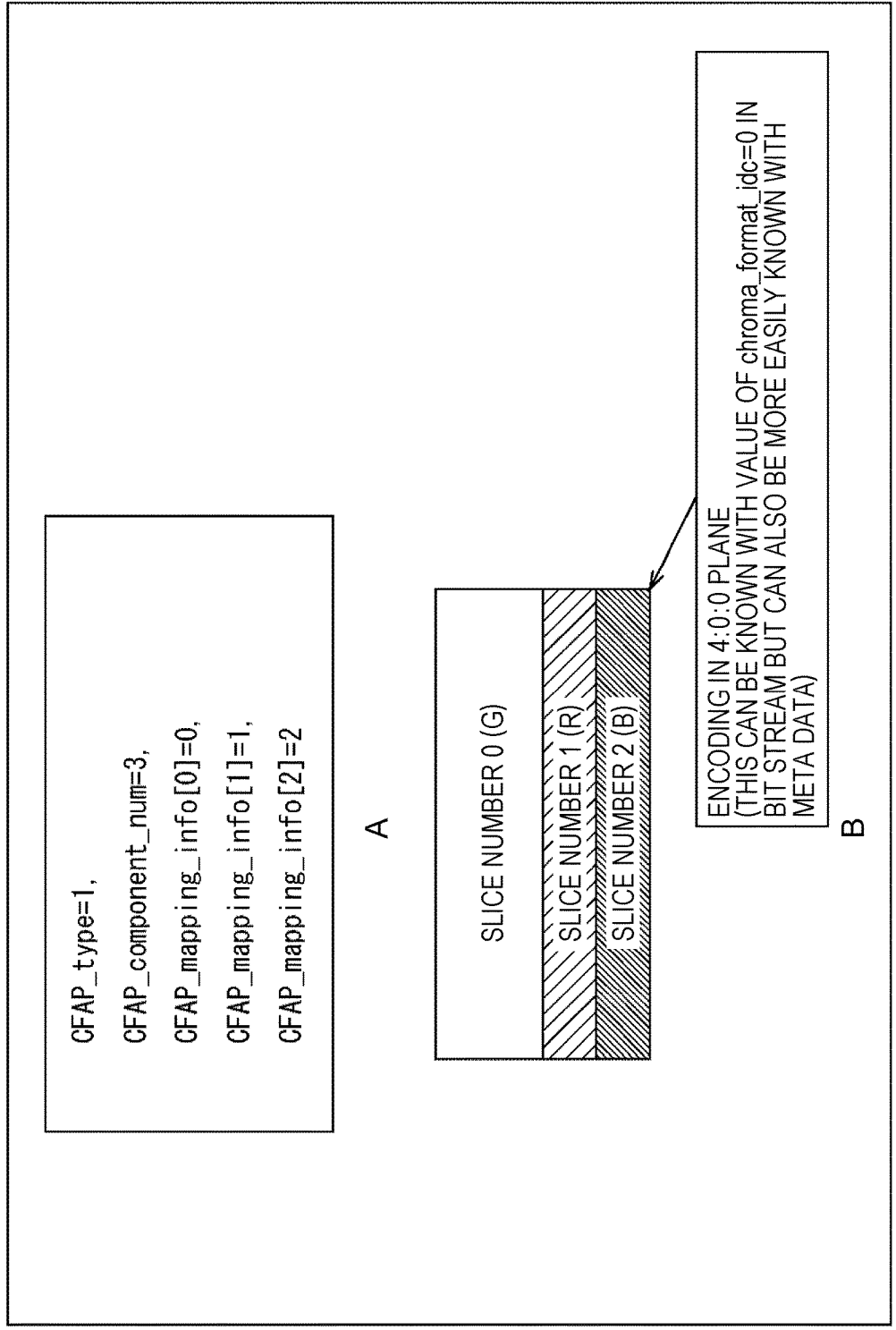
FIGS. 19A and 19B are diagrams illustrating a setting example of CFAP SEI.

FIGS. 19A and 19B are diagrams illustrating a setting example of the CFAP SEI. In the example of FIGS. 19A and 19B, as illustrated in FIG. 19A, the value of CFAP_type is set to "1", the value of CFAP_component_num is set to "3", the value of CFAP_mapping_info[0] is set to "0", the value of CFAP_mapping_info[1] is set to "1", and the value of CFAP_mapping_info[2] is set to "2". In this case, as illustrated in FIG. 19B, the components are divided by slice division. Then, the component (G, for example) of the component number 0 is stored in the slice of the slice number 0, the component (R, for example) of the component number 1 is stored in the slice of the slice number 1, and the component (B, for example) of the component number 2 is stored in the slice of the slice number 2. Then, the encoding is performed in the 4:0:0 format. This can also be grasped from the value of chroma_format_idc being set to "0" in the bit stream. However, this can be more easily grasped by reference to the value ("1") of CFAP_type in meta data (CFAP SEI).

Figure 20:
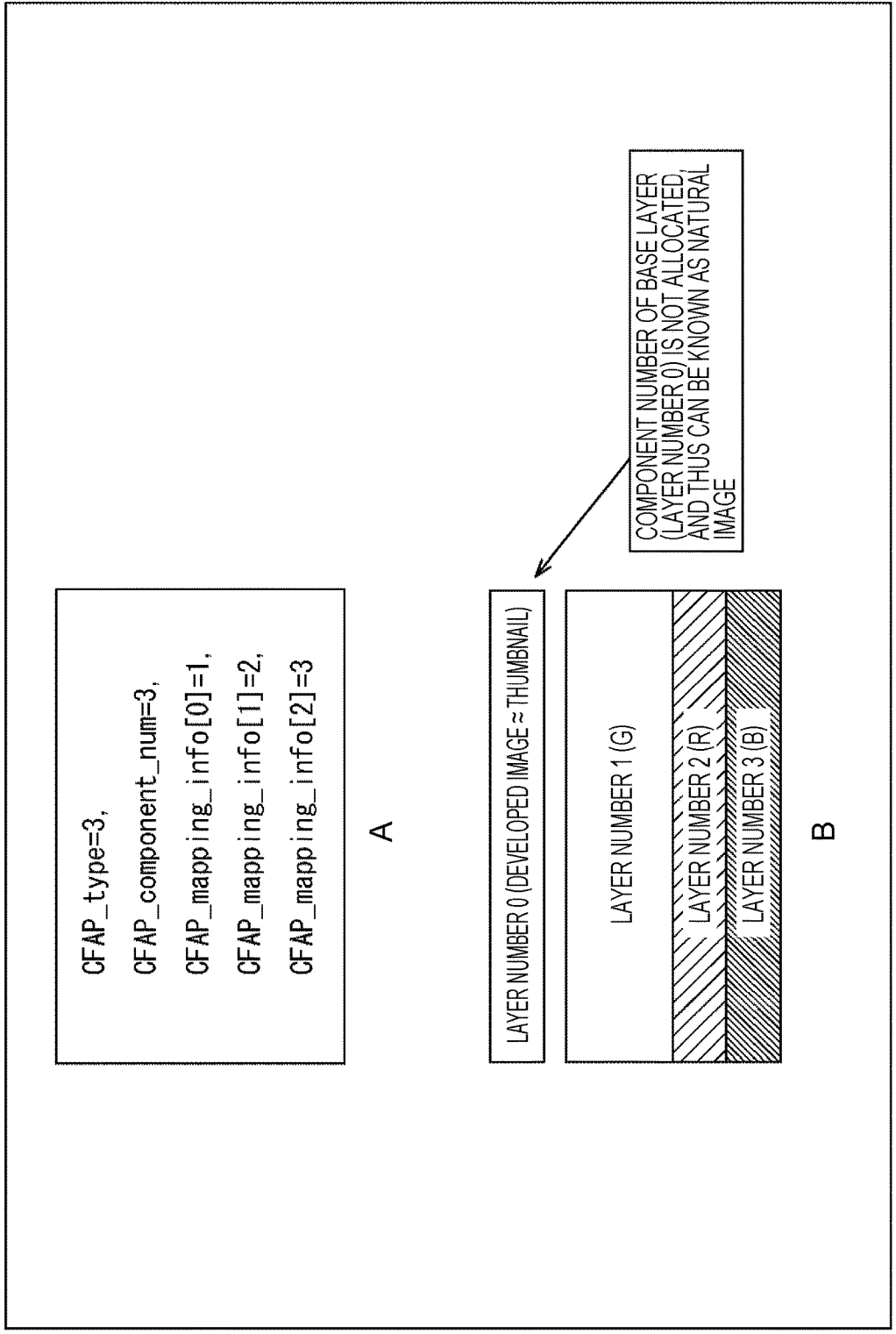
FIGS. 20A and 20B are diagrams illustrating a setting example of CFAP SEI.

FIGS. 20A and 20B are diagrams illustrating another setting example of the CFAP SEI. In the example of FIGS. 20A and 20B, as illustrated in FIG. 20A, the value of CFAP_type is set to "3", the value of CFAP_component_num is set to "3", the value of CFAP_mapping_info[0] is set to "1", the value of CFAP_mapping_info[1] is set to "2", and the value of CFAP_mapping_info[2] is set to "3". In this case, as illustrated in FIG. 20B, the components are divided into layers. Then, the component (G, for example) of the component number 0 is stored in the layer of the layer number 1, the component (R, for example) of the component number 1 is stored in the layer of the layer number 2, and the component (B, for example) of the component number 2 is stored in the layer of the layer number 3. Note that no component number is allocated to the layer of the layer number 0. This indicates that a normal YUV image (after the development processing) is stored in the layer of the layer number 0.

Figure 21:
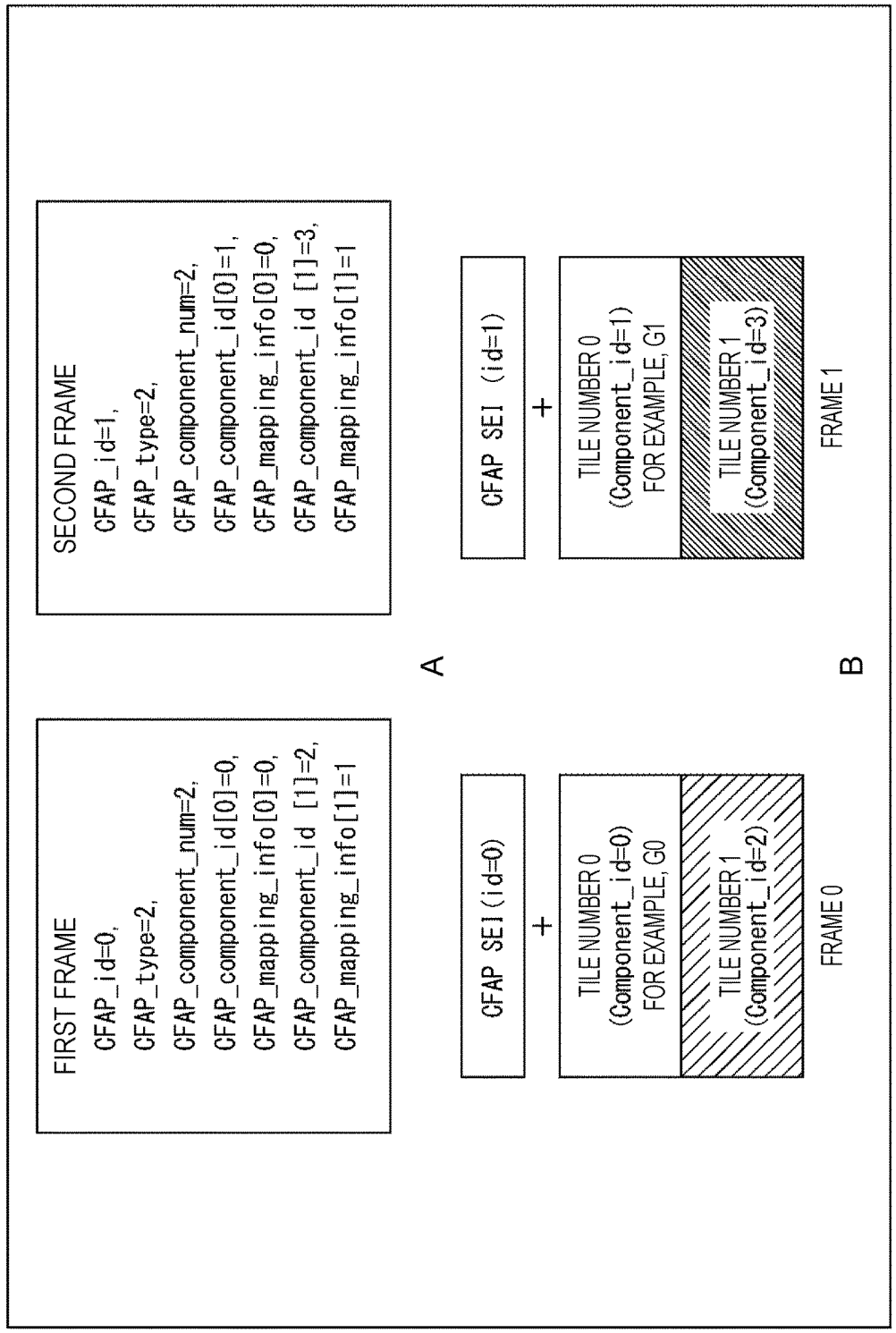
FIGS. 21A and 21B are diagrams illustrating a setting example of CFAP SEI.

FIGS. 21A and 21B are diagrams illustrating still another setting example of the CFAP SEI. In the example of FIGS. 21A and 21B, the components are rearranged into two frames. Therefore, two CFAP_SEIs are set. As illustrated in FIG. 21A, in CFAP SEI related to the first frame, the value of CFAP_id is set to "0", the value of CFAP_type is set to "2", the value of CFAP_component_num is set to "2", the value of CFAP_component_id[0] is set to "0", the value of CFAP_mapping_info[0] is set to "0", the value of CFAP_component_id[1] is set to "2", and the value of CFAP_mapping_info[1] is set to "1".

Further, in the CFAP SEI related to the second frame, the value of CFAP_id is set to "1", the value of CFAP_type is set to "2", the value of CFAP_component_num is set to "2", the value of CFAP_component_id[0] is set to "1", the value of CFAP_mapping_info[0] is set to "0", the value of CFAP_component_id[1] is set to "3", and the value of CFAP_mapping_info[1] is set to "1".

In this case, as illustrated in FIG. 21B, the component ($G_0$, for example) of the component number 0 is stored in the tile of the tile number 0 of the fame of the frame number 0, and the component (R, for example) of the component number 2 is stored in the tile of the tile number 1. Further, the component ($G_1$, for example) of the component number 1 is stored in the tile of the tile number 0 of the frame of the frame number 1, and the component (B, for example) of the component number 3 is stored in the tile of the tile number 1.

By setting the values of the syntax elements of CFAP_SEI, various packing methods can be expressed. That is, the decoding side can more easily and correctly perform the unpacking processing by reference to CFAP_SEI.

<Parameter Set>

Further, various syntax elements of various parameter sets can be appropriately set according to the content of the above-described various types of packing processing.

FIG. 22 illustrates a setting example of various syntax elements in a case of separating the components into the color planes, and commonly encoding YC (the example of FIG. 6). Further, FIG. 23 illustrates a setting example of various syntax elements in a case of separating the components into the color planes, and independently encoding YC (the example of FIG. 6). Note that FIG. 23 illustrates only sections having different setting from the example illustrated in FIG. 22. Further, FIG. 24 illustrates a setting example of various syntax elements in a case of separating the components into the color planes, and performing encoding for each partial region, such as a slice or a tile (the example of FIG. 7). Note that FIG. 24 illustrates only sections having different setting from the example illustrated in FIG. 22. As illustrated in FIG. 24, setting of a part of the syntax elements is changed in the picture parameter set, and slice headers are provided by the number of the partial regions, whereby encoding/decoding of each such partial region can be easily handled.

FIG. 25 illustrates a setting example of various syntax elements in a case of separating the components into the partial regions such as slices or tiles of the luminance (Y), and performing encoding in the 4:0:0 format (the example of FIG. 8). Note that FIG. 25 illustrates only sections having different setting from the example illustrated in FIG. 22. Further, FIG. 26 illustrates a setting example of various syntax elements in a case of separating the components into the hierarchies (layers) (the example of FIG. 9). Note that FIG. 26 illustrates only sections having different setting from the example illustrated in FIG. 22. Further, FIG. 27 illustrates a setting example of various syntax elements in a case of separating the components into hierarchies (layers), and storing the thumbnail images subjected to the development processing, in the base layer (the example of FIG. 10). Note that FIG. 27 illustrates only sections having different setting from the examples illustrated in FIGS. 22 and 26.

FIG. 28 illustrates a setting example of various syntax elements in a case of prohibiting the in-loop filter (the example of FIG. 13).

The values of the various syntax elements of the various parameter sets are appropriately set according to the content of the packing processing, as described above, so that the encoder can appropriately encode the RAW data subjected to the packing processing. Further, the decoder can more easily and correctly decode the encoded data by reference to the parameter sets. That is, the encoding efficiency can be more easily improved in the encoding of the RAW data.

<Unpacking Processing>

Further, to correspond to the processing of the encoding side, the decoding side decodes the encoded data that is the encoded RAW data that is the image data before the demosaicing processing is performed, and performs the unpacking processing of returning the pixel data of the RAW data, which is obtained by the decoding and subjected to the packing processing of rearranging the pixel data according to the degree of correlation, to the arrangement before the packing processing is performed.

Further, in the unpacking processing, the packing information related to the packing processing may be parsed, the pixel data of the RAW data subjected to the packing processing may be separated based on the parsed packing information, and the pixel data separated on a data by data basis, the data having high correlation, may be rearranged to be returned to the arrangement before the packing processing is performed, based on the parsed packing information.

At that time, the pixel data rearranged on a pixel by pixel basis, to which the same type of filter is allocated by the packing processing, may be separated, and the pixel data may be rearranged according to the array of the filters. Further, the pixel data arranged on a pixel by pixel basis, to which the color filter of the same color is allocated by the packing processing, may be separated, and the pixel data may be rearranged according to the array of the color filters. Further, the pixel data rearranged to the components of a predetermined color space on a data by data basis, the data having high correlation, may be separated. Further, the pixel data rearranged in mutually different partial regions of one or a plurality of images on a data by data basis, the data having high correlation, may be separated. Further, the pixel data rearranged in mutually different hierarchies of the hierarchized image data on a data by data basis, the data having high correlation, may be separated. Further, the pixel data rearranged in other hierarchies, except a part of the hierarchies where the image data subjected to the demosaicing processing is arranged, may be separated.

Further, the encoded data that is encoded components for each partial region of the image of the RAW data may be decoded for each partial region in decoding.

In doing as described above, the encoded data of the RAW data subjected to the packing processing to gather the pixels having high correlation can be correctly decoded and be subjected to the unpacking processing, by a similar method to the normal case of decoding the encoded data that is the encoded image data after the demosaicing processing (without requiring special processing for RAW data). That is, decoding (including the unpacking processing) can be easily and correctly performed by the method corresponding to the encoding method associated with the packing processing. That is, the encoding efficiency can be more easily improved.

<Use of Packing Information>

Further, to correspond to the processing of the encoding side, the decoding side decodes the encoded data included in the bit stream and being the encoded RAW data that is the image data before the demosaicing processing is performed, and may extract the packing information from the additional information included in the bit stream, the packing information being information related to the packing processing, and being to be used in the unpacking processing of returning the pixel data of the RAW data subjected to the packing processing and obtained by decoding the encoded data to the arrangement before the packing processing is performed.

As the packing information, the information that indicates the method of rearranging the pixel data in the packing processing may be extracted. Further, the information that indicates the number of components of the RAW data subjected to the packing processing may be extracted. Further, the identification information of the components of the RAW data subjected to the packing processing may be extracted. Further, the information that indicates the configuration of the RAW data subjected to the packing processing may be extracted. Further, the information that indicates whether the bit stream constraint has been performed in the generation of the encoded data may be extracted. Further, the information that indicates whether the in-loop filter is used in the generation of the encoded data may be extracted.

Note that the packing information may be extracted from the supplemental enhancement information (SEI) included in the bit stream. Further, the unpacking processing may be performed for the RAW data subjected to the packing processing, which has been obtained by decoding the encoded data, using the extracted packing information.

The packing information is extracted from the bit stream, and is used in the unpacking processing, as described above, whereby the decoder can more easily and appropriately decode the encoded data that is the encoded RAW data subjected to the packing processing, and can perform the unpacking processing. That is, the encoding efficiency can be more easily improved in the encoding of the RAW data.

2. Second Embodiment

<Image Encoding Device>

Figure 29:
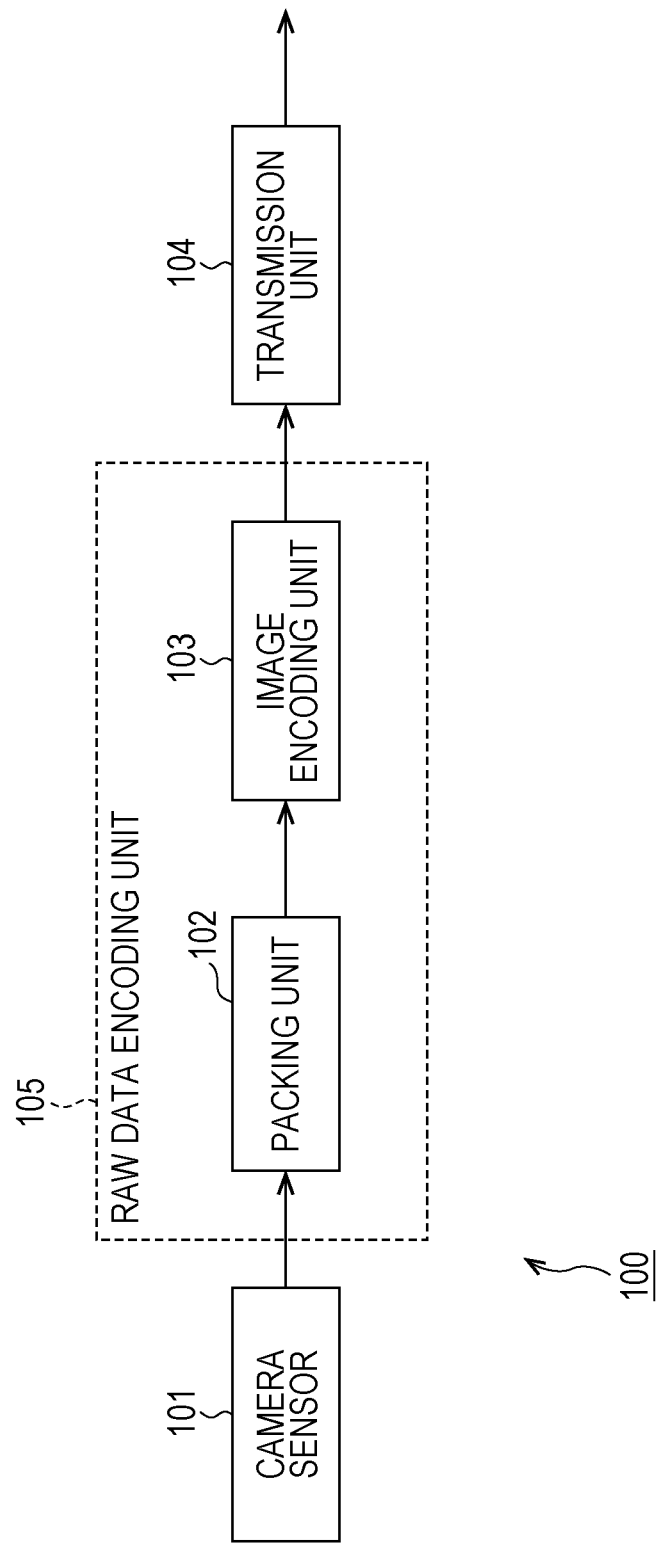
FIG. 29 is a block diagram illustrating a principal configuration example of an image encoding device.

Next, a device and a method thereof that realize the present technology as described above will be described. FIG. 29 is a diagram illustrating an image encoding device that is one form of an image processing apparatus to which the present technology is applied. An image encoding device 100 illustrated in FIG. 29 is a device that more easily and highly efficiently encodes RAW data that is image data before demosaicing processing is performed. As illustrated in FIG. 29, the image encoding device 100 includes a camera sensor 101, a packing unit 102, an image encoding unit 103, and a transmission unit 104.

The camera sensor 101 images an object to generate RAW data by photoelectrically converting light from the object incident on a pixel region, and supplies the RAW data to the packing unit 102. Note that any processing unit other than the camera sensor 101 may be employed as long as the processing unit can obtain the RAW data and supply the RAW data to the packing unit 102. For example, an input unit or the like that acquires the RAW data from an outside may be provided in place of the camera sensor 101.

The packing unit 102 performs packing processing of rearranging pixel data according to the degree of correlation, for the supplied RAW data, as described in the first embodiment. Further, the packing unit 102 generates packing information related to the packing processing. The packing unit 102 supplies the RAW data and the packing information subjected to the packing processing to the image encoding unit 103.

The image encoding unit 103 encodes the supplied RAW data after the packing processing, by a basically similar method to a case of encoding image data after demosaicing processing, as described in the first embodiment. Further, the image encoding unit 103 sets a parameter set based on the obtained packing information and generates additional information. The image encoding unit 103 generates a bit stream that includes obtained encoded data and the additional information including the packing information. The image encoding unit 103 supplies the obtained bit stream to the transmission unit 104.

The transmission unit 104 transmits the supplied bit stream to a decoding side through a recording medium, a transmission line, and the like. That is, the transmission unit 104 records the bit stream in the recording medium and transmits the bit stream to the transmission line such as a network.

Note that the packing unit 102 and the image encoding unit 103 may be configured as one processing unit (RAW data encoding unit 105). That is, for example, this RAW data encoding unit 105 (the packing unit 102 and the image encoding unit 103) may be configured as one image processing apparatus.

<Packing Unit>

Figure 30:
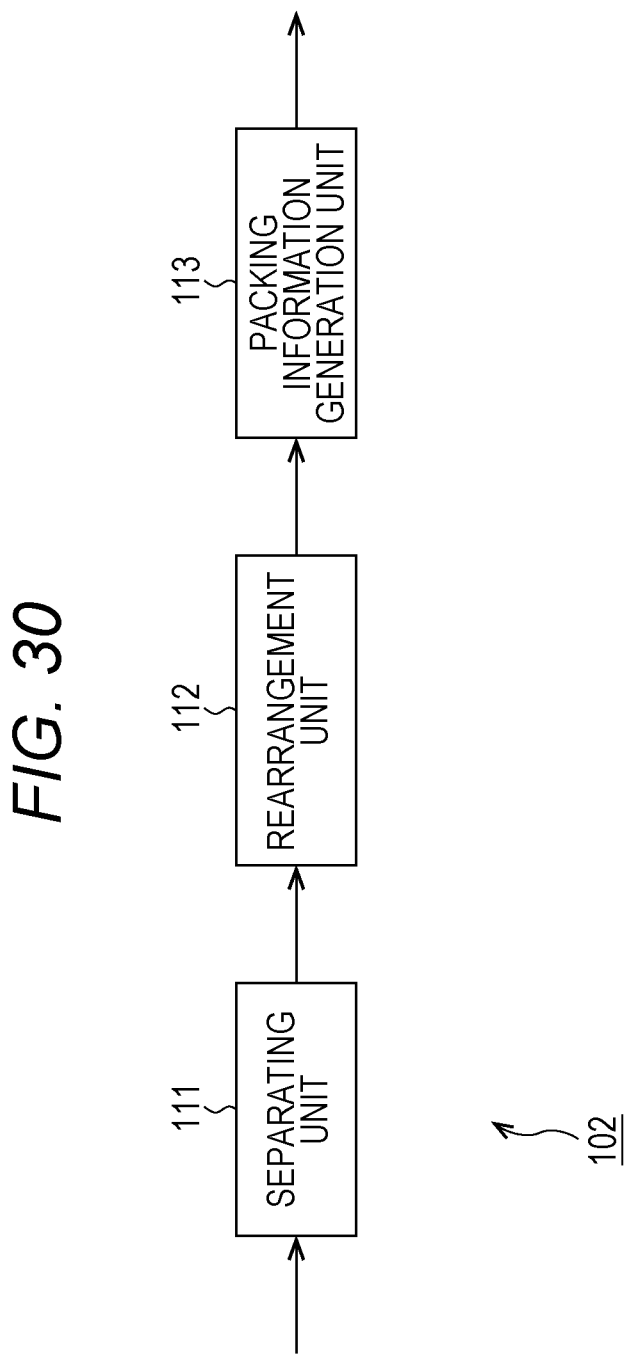
FIG. 30 is a block diagram illustrating a principal configuration example of a packing unit.

FIG. 30 is a block diagram illustrating a principal configuration example of the packing unit 102 of FIG. 29. As illustrated in FIG. 30, the packing unit 102 includes a separating unit 111, a rearrangement unit 112, and a packing information generation unit 113.

The separating unit 111 separates pixel data of the supplied RAW data on a data by data basis, the data having high correlation, by a method as described in the first embodiment, for example. The separating unit 111 supplies pixel data groups separated on a data by data basis, the data having high correlation, to the rearrangement unit 112.

The rearrangement unit 112 rearranges the supplied pixel data groups by a method as described in the first embodiment, for example. The rearrangement unit 112 supplies the RAW data with rearranged pixel data groups to the packing information generation unit 113.

The packing information generation unit 113 generates the packing information related to the packing processing performed for the supplied RAW data, as described in the first embodiment, for example. The packing information generation unit 113 supplies the supplied RAW data after the packing processing and the generated packing information to the image encoding unit 103 (FIG. 29).

<Image Encoding Unit>

Figure 31:
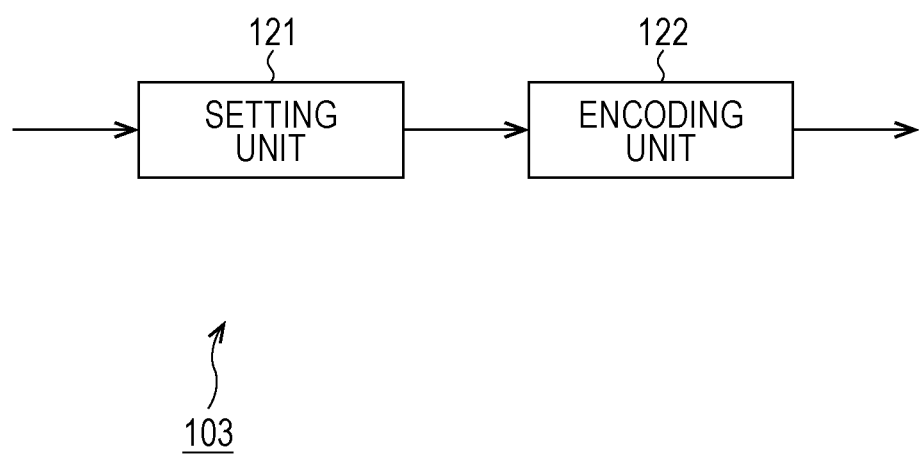
FIG. 31 is a block diagram illustrating a principal configuration example of an image encoding unit.

FIG. 31 is a block diagram illustrating a principal configuration example of the image encoding unit 103 of FIG. 29. As illustrated in FIG. 31, the image encoding unit 103 includes a setting unit 121 and an encoding unit 122.

The setting unit 121 sets the parameter set and the additional information (for example, CFAP_SEI) that are to be added to the encoded data of the supplied RAW data after the packing processing based on the supplied packing information. The setting unit 121 supplies the set parameter set and additional information (for example, CFAP_SEI) to the encoding unit 122 together with the supplied packing information and the RAW data after the packing processing.

The encoding unit 122 encodes the supplied RAW data after the packing processing by a basically similar method to a case of encoding image data after development processing based on the supplied parameter set and additional information (for example, CFAP_SEI). The encoding unit 122 generates the bit stream (also called encoded stream) that includes the encoded data obtained by the encoding, the supplied parameter set and additional information, and the like, and supplies the bit stream to the transmission unit 104 (FIG. 29).

<Encoding Unit>

Figure 32:
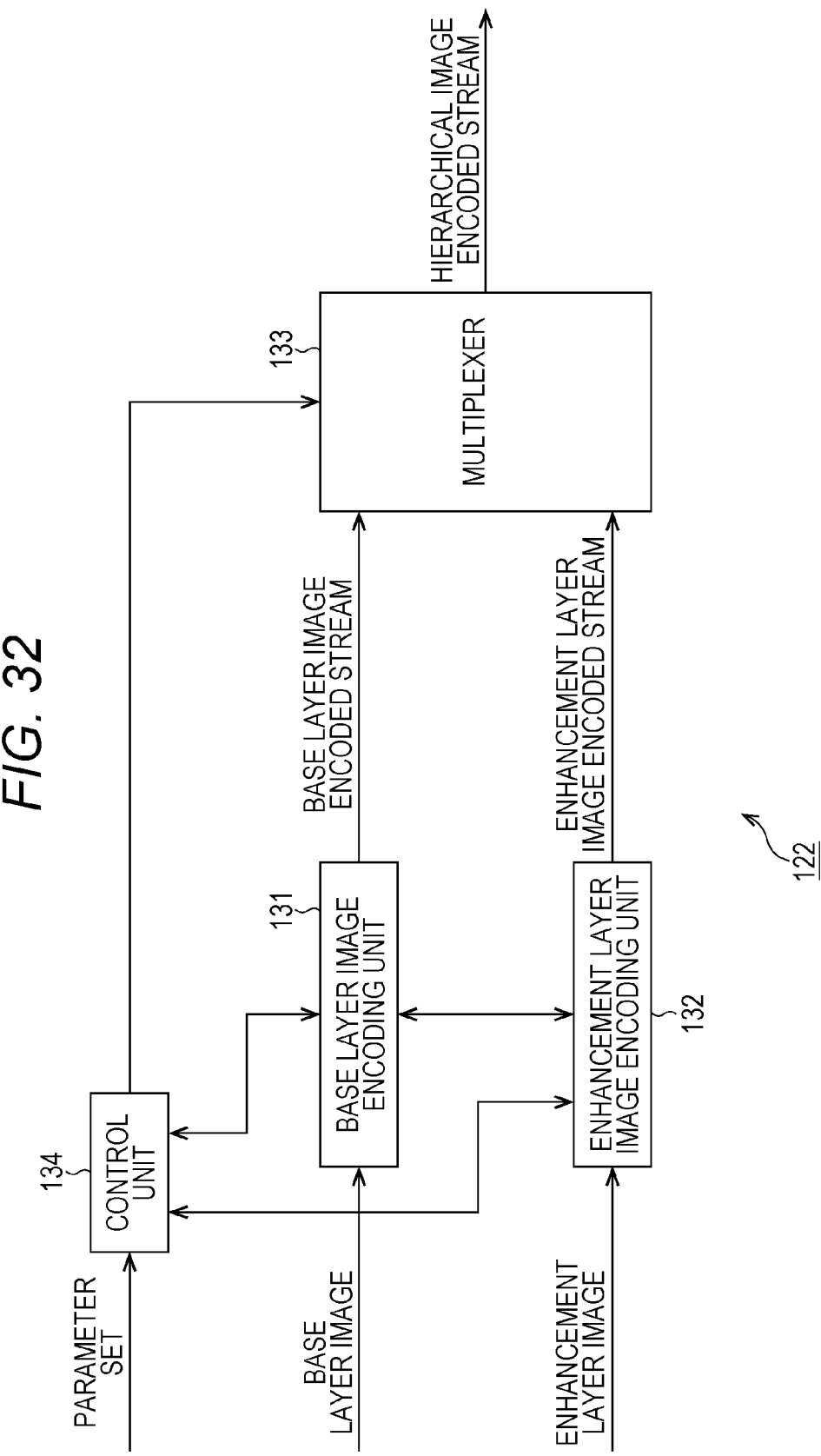
FIG. 32 is a block diagram illustrating a principal configuration example of an encoding unit.

FIG. 32 is a block diagram illustrating a principal configuration example of the encoding unit 122 of FIG. 31. The encoding method of the encoding unit 122 is arbitrary. For example, the encoding unit 122 performs hierarchical image encoding (scalable encoding) for the RAW data after the packing processing. In FIG. 32, a case in which the RAW data after the packing processing is made of two hierarchies of a base layer and an enhancement layer, and the encoding unit 122 performs the hierarchical image encoding (scalable encoding) for the RAW data will be described. As illustrated in FIG. 32, the encoding unit 122 includes a base layer image encoding unit 131, an enhancement layer image encoding unit 132, a multiplexer 133, and a control unit 134.

Data (also called base layer image) of the base layer of the RAW data after the packing processing is supplied to the base layer image encoding unit 131. The base layer image encoding unit 131 encodes the data of the base layer to generate a base layer image encoded stream that is a bit stream including the encoded data.

Data (also called enhancement layer image) of the enhancement layer of the RAW data after the packing processing is supplied to the enhancement layer image encoding unit 132. The enhancement layer image encoding unit 132 encodes the data of the enhancement layer to generate an enhancement layer image encoded stream that is a bit stream including the encoded data.

The multiplexer 133 multiplexes the base layer image encoded stream generated in the base layer image encoding unit 131 and the enhancement layer image encoded stream generated in the enhancement layer image encoding unit 132 to generate a hierarchical image encoded stream that is a bit stream including encoded data of respective hierarchies of the RAW data. Further, the multiplexer 133 stores the parameter set and additional information (for example, CFAP SEI) supplied from the control unit 134 to the hierarchical image encoded stream. The multiplexer 133 transmits the generated hierarchical image encoded stream to the transmission unit 104 (FIG. 29).

The control unit 134 controls encoding of the respective layers by controlling the base layer image encoding unit 131 and the enhancement layer image encoding unit 132 based on the parameter set and the additional information (for example, CFAP_SEI) supplied from the setting unit 121 (FIG. 31). Further, the control unit 134 supplies the parameter set and the additional information (for example, CFAP_SEI) to the multiplexer 133.

<Base Layer Image Encoding Unit>

Figure 33:
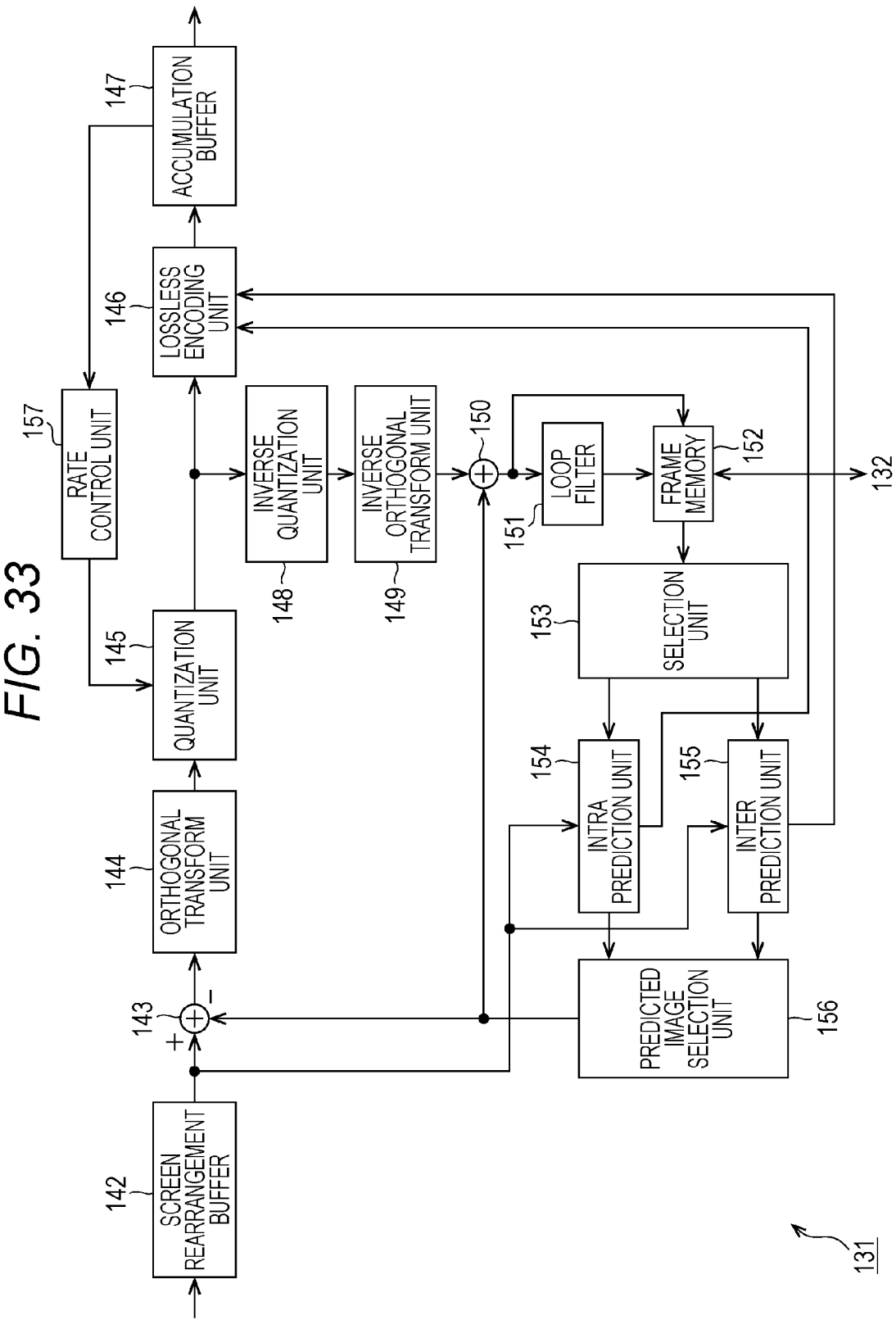
FIG. 33 is a block diagram illustrating a principal configuration example of a base layer image encoding unit.

FIG. 33 is a block diagram illustrating a principal configuration example of the base layer image encoding unit 131 of FIG. 32. As illustrated in FIG. 33, the base layer image encoding unit 131 includes a screen rearrangement buffer 142, a calculation unit 143, an orthogonal transform unit 144, a quantization unit 145, a lossless encoding unit 146, an accumulation buffer 147, an inverse quantization unit 148, and an inverse orthogonal transform unit 149. Further, the base layer image encoding unit 131 includes a calculation unit 150, a loop filter 151, a frame memory 152, a selection unit 153, an intra prediction unit 154, an inter prediction unit 155, a predicted image selection unit 156, and a rate control unit 157. The processing units (the screen rearrangement buffer 142 to the rate control unit 157) of the base layer image encoding unit 131 are controlled by the control unit 134 (FIG. 32) and operated.

The screen rearrangement buffer 142 stores frames of image data (base layer image information) of input digital data in an order of display. Further, the screen rearrangement buffer 142 rearranges the image with the stored frames in the order of display into frames in an order for encoding according to group of picture (GOP), and supplies the image with the frames in the rearranged order to the calculation unit 143. Further, the screen rearrangement buffer 142 also supplies the image with the frames in the rearranged order to the intra prediction unit 154 and the inter prediction unit 155.

The calculation unit 143 subtracts a predicted image supplied from the intra prediction unit 154 or the inter prediction unit 155 through the predicted image selection unit 156 from the image read from the screen rearrangement buffer 142. For example, in a case of an image for which intra encoding is performed, the calculation unit 143 subtracts the predicted image supplied from the intra prediction unit 154 from the image read from the screen rearrangement buffer 142. Further, for example, in a case of an image for which inter encoding is performed, the calculation unit 143 subtracts the predicted image supplied from the inter prediction unit 155 from the image read from the screen rearrangement buffer 142. The calculation unit 143 outputs a subtraction result (difference information) to the orthogonal transform unit 144.

The orthogonal transform unit 144 applies orthogonal transform such as discrete cosine transform or Karhunen-Loeve transform to difference information supplied from the calculation unit 143. The orthogonal transform unit 144 supplies a transform coefficient thereof to the quantization unit 145.

The quantization unit 145 quantizes the transform coefficient supplied from the orthogonal transform unit 144. The quantization unit 145 sets a quantization parameter based on information related to a target value of a code amount supplied from the rate control unit 157, and performs quantization thereof. The quantization unit 145 supplies the quantized transform coefficient to the lossless encoding unit 146.

The lossless encoding unit 146 encodes the transform coefficient quantized in the quantization unit 145 in an arbitrary encoding system. Coefficient data is quantized under control of the rate control unit 157. Therefore, this code amount becomes the target value (or approximate the target value) set by the rate control unit 157.

Further, the lossless encoding unit 146 acquires information that indicates a mode of intra prediction, and the like from the intra prediction unit 154, and acquires information that indicates a mode of inter prediction, difference motion vector information, and the like from the inter prediction unit 155. Further, the lossless encoding unit 146 appropriately generates a network abstraction layer (NAL) unit of the base layer, which includes a sequence parameter set (SPS), a picture parameter set (PPS), and the like, and encodes the NAL unit in an arbitrary method.

The lossless encoding unit 146 supplies these various types of information to the accumulation buffer 147 together with encoded data that is encoded quantized transform coefficient supplied from the quantization unit 145, and accumulates the information therein.

Examples of an encoding system of the lossless encoding unit 146 include variable-length encoding and arithmetic encoding. An example of the variable-length encoding includes context-adaptive variable length coding (CAVLC)

determined in the H. 264/AVC system. An example of the arithmetic encoding includes context-adaptive binary arithmetic coding (CABAC).

The accumulation buffer 147 temporarily stores the encoded data and the like supplied from the lossless encoding unit 146. The accumulation buffer 147 outputs the stored data to the multiplexer 133 (FIG. 32) as the bit stream (also called base layer image encoded stream) that includes the encoded data of the base layer and the like, at predetermined timing. That is, the accumulation buffer 147 is also a transmission unit that transmits the base layer image encoded stream.

Further, the transform coefficient quantized in the quantization unit 145 is also supplied to the inverse quantization unit 148. The inverse quantization unit 148 inversely quantizes the quantized transform coefficient by a method corresponding to the quantization by the quantization unit 145. The inverse quantization unit 148 supplies the obtained transform coefficient to the inverse orthogonal transform unit 149.

The inverse orthogonal transform unit 149 inversely orthogonally transforms the transform coefficient supplied from the inverse quantization unit 148 by a method corresponding to the orthogonal transform processing by the orthogonal transform unit 144. An inversely orthogonally transformed output (restored difference information) is supplied to the calculation unit 150.

The calculation unit 150 adds the predicted image from the intra prediction unit 154 or the inter prediction unit 155 through predicted image selection unit 156 to restored difference information that is the inverse orthogonal transform result supplied from the inverse orthogonal transform unit 149 to obtain a locally decoded image (decoded image). The decoded image is supplied to the loop filter 151 or the frame memory 152.

The loop filter 151 includes a deblocking filter, an adaptive loop filter, and the like, and appropriately performs filter processing for a reconfigured image supplied from the calculation unit 150. For example, the loop filter 151 removes block distortion of the reconfigured image by performing deblocking filter processing for the reconfigured image. Further, for example, the loop filter 151 performs image quality improvement by performing loop filter processing using a Wiener filter for a deblocking filter processing result (the reconfigured image from which the block distortion has been removed). The loop filter 151 supplies a filter processing result (hereinafter, called decoded image) to the frame memory 152.

Note that the loop filter 151 may further perform another arbitrary filter processing for the reconfigured image. Further, the loop filter 151 can supply information such as a filter coefficient used in the filter processing to the lossless encoding unit 146 and cause the lossless encoding unit 146 to encode the information, as needed.

The frame memory 152 stores the supplied decoded image, and supplies the stored decoded image to the selection unit 153 as a reference image at predetermined timing.

To be specific, the frame memory 152 stores the reconfigured image supplied from the calculation unit 150, and the decoded image supplied from the loop filter 151. The frame memory 152 supplies the stored reconfigured image to the intra prediction unit 154 through the selection unit 153 at predetermined timing or based on a request from an outside such as the intra prediction unit 154 or the like. Further, the frame memory 152 supplies the stored decoded image to the inter prediction unit 155 through the selection unit 153 at predetermined timing or based on a request from an outside such as the inter prediction unit 155 or the like.

The selection unit 153 selects a supply destination of the reference image supplied from the frame memory 152. For example, in the case of intra prediction, the selection unit 153 supplies the reference image supplied from the frame memory 152 to the intra prediction unit 154. Further, for example, in the case of inter prediction, the selection unit 153 supplies the reference image supplied from the frame memory 152 to the inter prediction unit 155.

The intra prediction unit 154 performs prediction processing about a current picture that is an image of a current frame to generate a predicted image. The intra prediction unit 154 performs the prediction processing on a predetermined block by block basis (in units of block). That is, the intra prediction unit 154 generates a predicted image of a current block that is an object to be processed, of the current picture. At that time, the intra prediction unit 154 performs the prediction processing (in-screen prediction (also called intra prediction)) using the reconfigured image supplied from the frame memory 152 through the selection unit 153 as the reference image. That is, the intra prediction unit 154 generates the predicted image using a peripheral pixel value of the current block included in the reconfigured image. The peripheral pixel value used for the intra prediction is a pixel value of a pixel of the current picture, the pixel having been processed in the past. As the intra prediction (that is, a way of generating the predicted image), a plurality of methods (also called intra prediction modes) is prepared in advance as candidates. The intra prediction unit 154 performs the intra prediction in the plurality of intra prediction modes prepared in advance.

The intra prediction unit 154 generates the predicted image in all the intra prediction modes as the candidates, evaluates cost function values of the respective predicted images using the input image supplied from the screen rearrangement buffer 142, and selects an optimum mode. When having selected the optimum intra prediction mode, the intra prediction unit 154 supplies the predicted image generated in the optimum mode to the predicted image selection unit 156.

Further, as described above, the intra prediction unit 154 appropriately supplies intra prediction mode information indicating the employed intra prediction mode, and the like to the lossless encoding unit 146, and causes the lossless encoding unit 146 to encode the information.

The inter prediction unit 155 performs prediction processing about the current picture to generate a predicted image. The inter prediction unit 155 performs the prediction processing on a predetermined block by block basis (in units of block). That is, the inter prediction unit 155 generates a predicted image of a current block that is an object to be processed, of the current picture. At that time, the inter prediction unit 155 performs the prediction processing using image data of the input image supplied from the screen rearrangement buffer 142 and image data of a decoded image supplied from the frame memory 152 as the reference image. This decoded image is an image of a frame processed prior to the current picture (another picture that is not the current picture). That is, the inter prediction unit 155 performs prediction processing of generating a predicted image using the image of another picture (inter-screen prediction (also called inter prediction)).

This inter prediction is made of motion prediction and motion compensation. To be specific, the inter prediction unit 155 performs the motion prediction about the current block using the input image and the reference image, and detects a motion vector. The inter prediction unit 155 then performs the motion compensation processing according to the detected motion vector using the reference image, and generates a predicted image (inter predicted image information) of the current block. As this inter prediction (that is, a way of generating the predicted image), a plurality of methods (also called inter prediction modes) is prepared in advance as candidates. The inter prediction unit 155 performs the inter prediction in the plurality of inter prediction modes prepared in advance.

The inter prediction unit 155 generates the predicted image in all the inter prediction modes as the candidates. The inter prediction unit 155 evaluates cost function values of the respective predicted images using the input image supplied from the screen rearrangement buffer 142, the information of the generated difference motion vector, and the like, and selects an optimum mode. When having selected the optimum inter prediction mode, the inter prediction unit 155 supplies the predicted image generated in the optimum mode to the predicted image selection unit 156.

The inter prediction unit 155 supplies information indicating the employed inter prediction mode, information necessary to perform processing in the inter prediction mode in decoding the encoded data, and the like to the lossless encoding unit 146, and causes the lossless encoding unit 146 to perform encoding. As the necessary information, for example, the information of the generated difference motion vector, and a flag that indicates an index of the prediction motion vector as the prediction motion vector information.

The predicted image selection unit 156 selects a supply source of the predicted image to be supplied to the calculation unit 143 and the calculation unit 150. For example, in the case of intra encoding, the predicted image selection unit 156 selects the intra prediction unit 154 as the supply source of the predicted image, and supplies the predicted image supplied from the intra prediction unit 154 to the calculation unit 143 and the calculation unit 150. Further, for example, in the case of inter encoding, the predicted image selection unit 156 selects the inter prediction unit 155 as the supply source of the predicted image, and supplies the predicted image supplied from the inter prediction unit 155 to the calculation unit 143 and the calculation unit 150.

The rate control unit 157 controls a rate of a quantization operation of the quantization unit 145 so as not to generate overflow or underflow based on the code amount of the encoded data accumulated in the accumulation buffer 147.

Further, the frame memory 152 supplies the information of the stored base layer decoded image and the like to the enhancement layer image encoding unit 132 (FIG. 32), as needed. Note that the frame memory 152 may acquire and store the information such as the enhancement layer decoded image and the like supplied from the enhancement layer image encoding unit 132. This information is supplied to the intraprediction unit 154 or the inter prediction unit 155 through the selection unit 153 as the reference image and the like, as needed.

<Enhancement Layer Image Encoding Unit>

Figure 34:
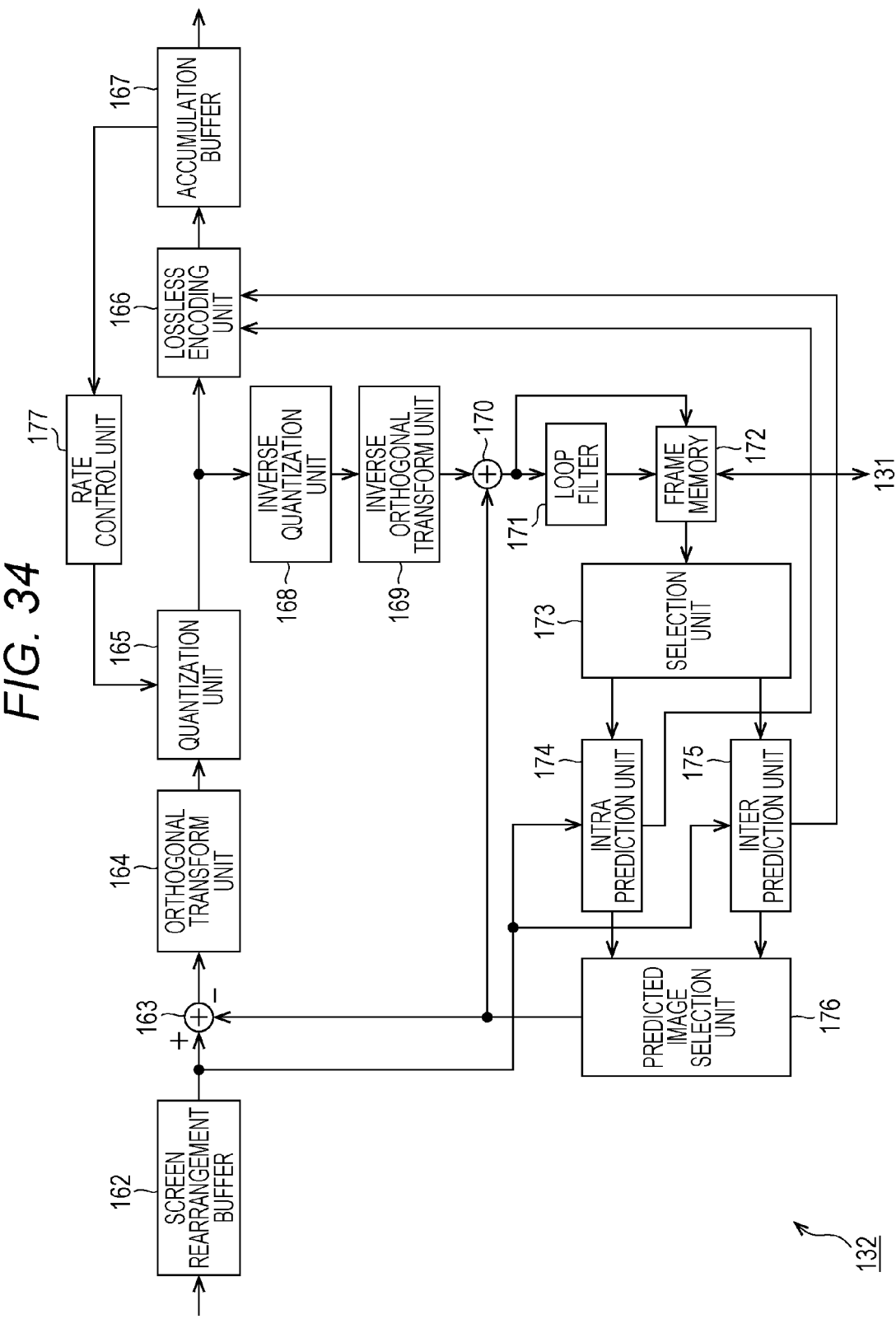
FIG. 34 is a block diagram illustrating a principal configuration example of an enhancement layer image encoding unit.

FIG. 34 is a block diagram illustrating a principal configuration example of the enhancement layer image encoding unit 132 of FIG. 32. As illustrated in FIG. 34, the enhancement layer image encoding unit 132 has a configuration basically similar to the base layer image encoding unit 131 of FIG. 33.

That is, as illustrated in FIG. 34, the enhancement layer image encoding unit 132 includes a screen rearrangement buffer 162, a calculation unit 163, an orthogonal transform unit 164, a quantization unit 165, a lossless encoding unit 166, an accumulation buffer 167, an inverse quantization unit 168, and an inverse orthogonal transform unit 169. Further, the enhancement layer image encoding unit 132 includes a calculation unit 170, a loop filter 171, a frame memory 172, a selection unit 173, an intra prediction unit 174, an inter prediction unit 175, a predicted image selection unit 176, and a rate control unit 177.

The screen rearrangement buffer 162 to the rate control unit 177 correspond to the screen rearrangement buffer 142 to the rate control unit 157 of FIG. 33, and perform similar processing to the corresponding processing units. Note that the units of the enhancement layer image encoding unit 132 perform the processing about encoding of enhancement layer image information instead of the base layer. Therefore, the description of the screen rearrangement buffer 142 to the rate control unit 157 of FIG. 33 can be applied as description of the processing of the screen rearrangement buffer 162 to the rate control unit 177. In that case, data to be processed needs to be data of the enhancement layer, instead of the data of the base layer. Further, processing units of an input source and an output destination of the data need to be appropriately replaced with and read as corresponding processing units in the screen rearrangement buffer 162 to the rate control unit 177.

Further, the frame memory 172 acquires and stores the information such as the base layer decoded image and the like supplied from the base layer image encoding unit 131. This information is supplied to the intra prediction unit 174 or the inter prediction unit 175 through the selection unit 173 as the reference image and the like, as needed. Note that the frame memory 172 may supply the stored enhancement layer decoded image to the base layer image encoding unit 131 (FIG. 32), as needed.

With the above configuration, the image encoding device 100 can more easily improve the encoding efficiency.

<Flow of RAW Image Encoding Processing>

Next, a flow of each processing executed by the image encoding device 100 will be described. First, an example of a flow of RAW image encoding processing will be described by reference to the flowchart of FIG. 35.

In step S101, when the RAW image encoding processing is started, the camera sensor 101 (FIG. 29) of the image encoding device 100 acquires the RAW data by imaging an object or the like. In step S102, the packing unit 102 packs the RAW data acquired in step S101, as described in the first embodiment. Details of packing processing will be described below.

In step S103, the image encoding unit 103 encodes the packed RAW data by the processing of step S102. In step S104, the transmission unit 104 transmits a bit stream (encoded stream) including encoded data and packing information of the packed RAW data generated by the processing of step S103 to the decoding side through an arbitrary recording medium and a transmission medium.

When the processing of step S104 is terminated, the RAW image encoding processing is terminated.

<Flow of Packing Processing>

Next, an example of a flow of the packing processing executed in step S102 (FIG. 35) will be described with reference to the flowchart of FIG. 36.

In step S111, when the packing processing is started, the separating unit 111 separates pixel data of the RAW image based on the correlation, as described in the first embodiment. In step S112, the rearrangement unit 112 rearranges the separated pixel data groups, as described in the first embodiment. In step S113, the packing information generation unit 113 generates the packing information described in the first embodiment about the above packing processing. When the processing of step S113 is terminated, the packing processing is terminated and the processing is returned to FIG. 35.

<Flow of Image Encoding Processing>

Next, an example of a flow of the image encoding processing executed in step S103 (FIG. 35) will be described with reference to the flowchart of FIG. 37.

When the image encoding processing is started, the setting unit 121 (FIG. 31) sets the various parameter sets, the CFAP SEI, and the like, as described in the first embodiment, based on the packing information generated in step S113.

In step S122, the encoding unit 122 encodes the packed image data, as described in the first embodiment, using the parameter sets and the like set in step S121. Details of the encoding will be described below.

Figure 35:
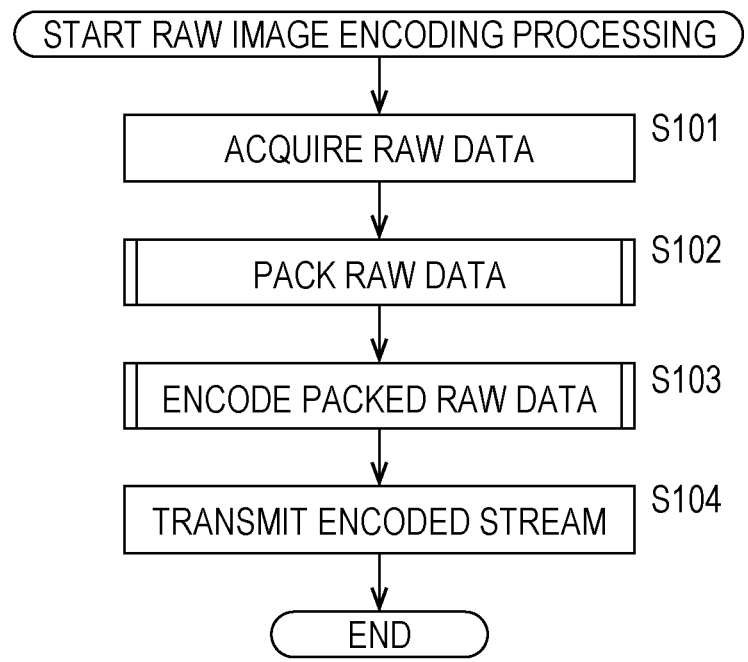
FIG. 35 is a flowchart for describing an example of a flow of RAW image encoding processing.
Figure 36:
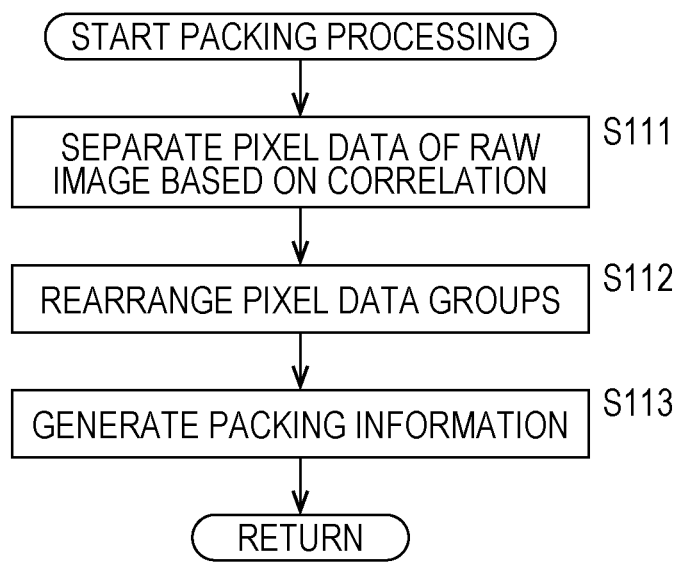
FIG. 36 is a flowchart for describing an example of a flow of packing processing.

When the processing of step S122 is terminated, the image encoding processing is terminated, and the processing is returned to FIG. 35.

<Flow of Encoding Processing>

Next, an example of a flow of the encoding processing executed in step S122 (FIG. 37) will be described with reference to the flowchart of FIG. 38.

In step S131, when the encoding processing is started, the control unit 134 controls the units from the base layer image encoding unit 131 to the multiplexer 133 based on the parameter sets and the like.

In step S132, the base layer image encoding unit 131 encodes the base layer of the packed RAW data. In step S133, the enhancement layer image encoding unit 132 encodes the enhancement layer of the packed RAW data.

In step S134, the multiplexer 133 multiplexes the base layer image encoded stream generated in step S132, and the enhancement layer image encoded stream generated in step S133 (that is, the bit streams of the respective layers), and generates the hierarchical image encoded stream of one system. Note that the multiplexer 133 includes the additional information such as various parameter sets and CFAP SEI, as needed in the hierarchical image encoded stream. The multiplexer 133 outputs and transmits the hierarchical image encoded stream to the decoding side.

Figure 37:
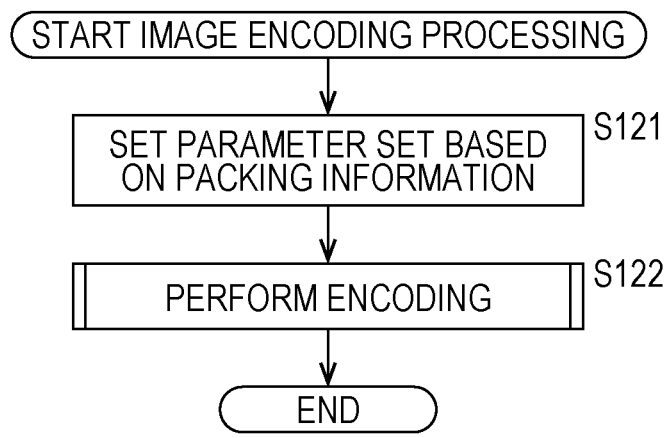
FIG. 37 is a flowchart for describing an example of a flow of image encoding processing.

When the processing of step S134 is terminated, the encoding processing is terminated, and the processing is returned to FIG. 37. The encoding unit 122 repeatedly executes such encoding processing for each picture. Note that processing that is not necessary to perform on a picture by picture basis is appropriately omitted.

<Flow of Base Layer Encoding Processing>

Next, an example of a flow of base layer encoding processing executed by the base layer image encoding unit 131 in step S132 of FIG. 38 will be described by reference to the flowchart of FIG. 39.

In step S141, when the base layer encoding processing is started, the screen rearrangement buffer 142 of the base layer image encoding unit 131 stores images of frames (pictures) of an input moving image in an order of display, and performs rearrangement from the order of display of the pictures to an order of encoding.

In step S142, the intra prediction unit 154 performs intra prediction processing in the intra prediction mode.

In step S143, the inter prediction unit 155 performs inter prediction processing of performing motion prediction, motion compensation, and the like in the inter prediction mode.

In step S144, the predicted image selection unit 156 selects a predicted image based on the cost function value and the like. That is, the predicted image selection unit 156 selects either the predicted image generated by the intra prediction of step S142 or the predicted image generated by the inter prediction of step S143.

In step S145, the calculation unit 143 calculates a difference between the input image in a frame order rearranged by the processing of step S141, and the predicted image selected by the processing of step S144. That is, the calculation unit 143 generates image data of a difference image between the input image and the predicted image. The image data of the difference image obtained as described above is decreased in a data amount, compared with original image data. Therefore, the data amount can be compressed, compared with a case of encoding the image as it is.

In step S146, the orthogonal transform unit 144 orthogonally transforms the image data of the difference image generated by the processing of step S145.

In step S147, the quantization unit 145 quantizes an orthogonal transform coefficient obtained by the processing of step S146, using the quantization parameter calculated by the rate control unit 157.

In step S148, the inverse quantization unit 148 inversely quantizes the coefficient quantized and generated by the processing of step S147 (the coefficient may be also referred to as quantized coefficient) with a characteristic corresponding to a characteristic of the quantization unit 145.

In step S149, the inverse orthogonal transform unit 149 inversely orthogonally transforms the orthogonal transform coefficient obtained by the processing of step S148.

In step S150, the calculation unit 150 generates image data of a reconfigured image by adding the predicted image selected by the processing of step S144 to the difference image restored by the processing of step S149.

In step S151, the loop filter 151 performs the loop filter processing for the image data of the reconfigured image generated by the processing of step S150. Accordingly, block distortion and the like of the reconfigured image are removed.

In step S152, the frame memory 152 stores data of the decoded image (base layer decoded image) obtained by the processing of step S151 and the reconfigured image obtained by the processing of step S150.

In step S153, the lossless encoding unit 146 encodes the quantized coefficient obtained by the processing of step S147. That is, lossless encoding such as variable-length encoding and arithmetic encoding is performed for the data corresponding to the difference image.

Further, at this time the lossless encoding unit 146 encodes information related to the prediction mode of the predicted image selected by the processing of step S144, and adds the encoded information to the encoded data obtained by encoding the difference image. That is, the lossless encoding unit 146 also encodes optimum intra prediction mode information supplied from the intra prediction unit 154, or information according to the optimum inter prediction mode supplied from the inter prediction unit 155, and adds the encoded information to the encoded data.

In step S154, the accumulation buffer 147 accumulates the encoded data and the like obtained by the processing of step S153. The encoded data and the like accumulated in the accumulation buffer 147 are appropriately read as abase layer image encoded stream, and the base layer image encoded stream is supplied to the multiplexer 133 and is multiplexed with the enhancement layer image encoded stream, and is then transmitted to the decoding side through a transmission path and a recording medium.

In step S155, the rate control unit 157 controls the rate of the quantization operation of the quantization unit 145 so as not to generate overflow or underflow, based on a code amount (a generated code amount) of the encoded data and the like accumulated in the accumulation buffer 147 by the processing of step S154. Further, the rate control unit 157 supplies information related to the quantization parameter to the quantization unit 145.

In step S156, the frame memory 152 supplies information of the base layer including the base layer decoded image and the like to enhancement layer encoding processing.

Figure 38:
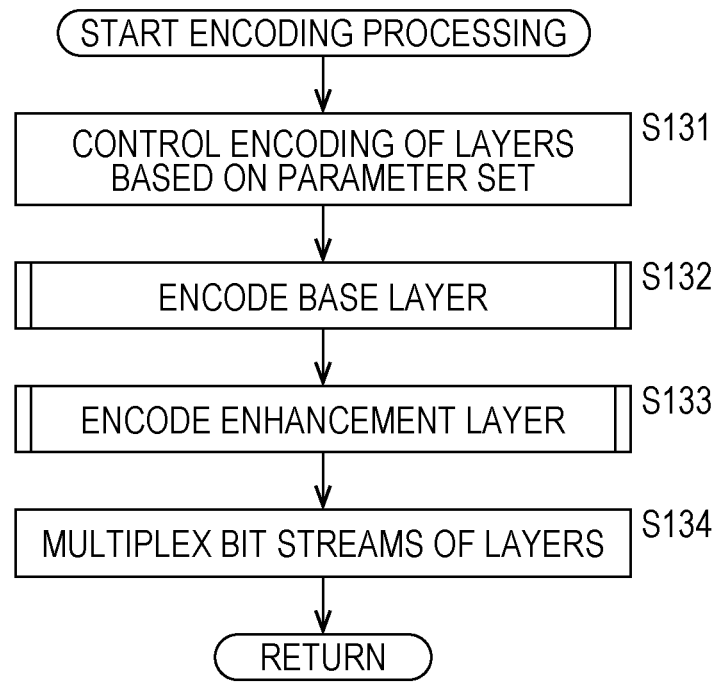
FIG. 38 is a flowchart for describing an example of a flow of encoding processing.

When the processing of step S156 is terminated, the base layer encoding processing is terminated and the processing is returned to FIG. 38.

<Flow of Enhancement Layer Encoding Processing>

Figure 40:
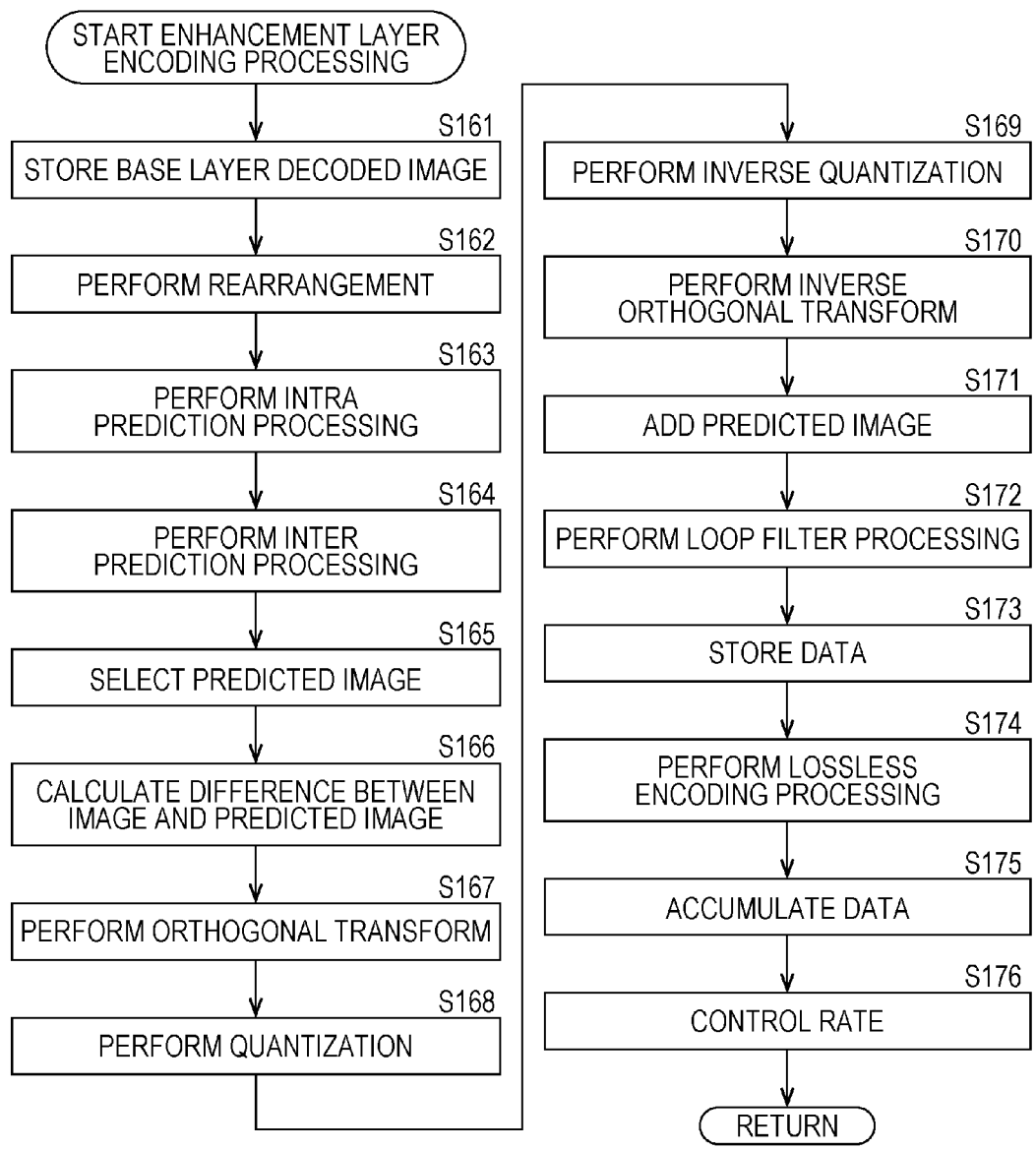
FIG. 40 is a flowchart for describing an example of a flow of enhancement layer encoding processing.

Next, an example of a flow of the enhancement layer encoding processing executed by the enhancement layer image encoding unit 132 in step S133 of FIG. 38 will be described by reference to the flowchart of FIG. 40.

Figure 39:
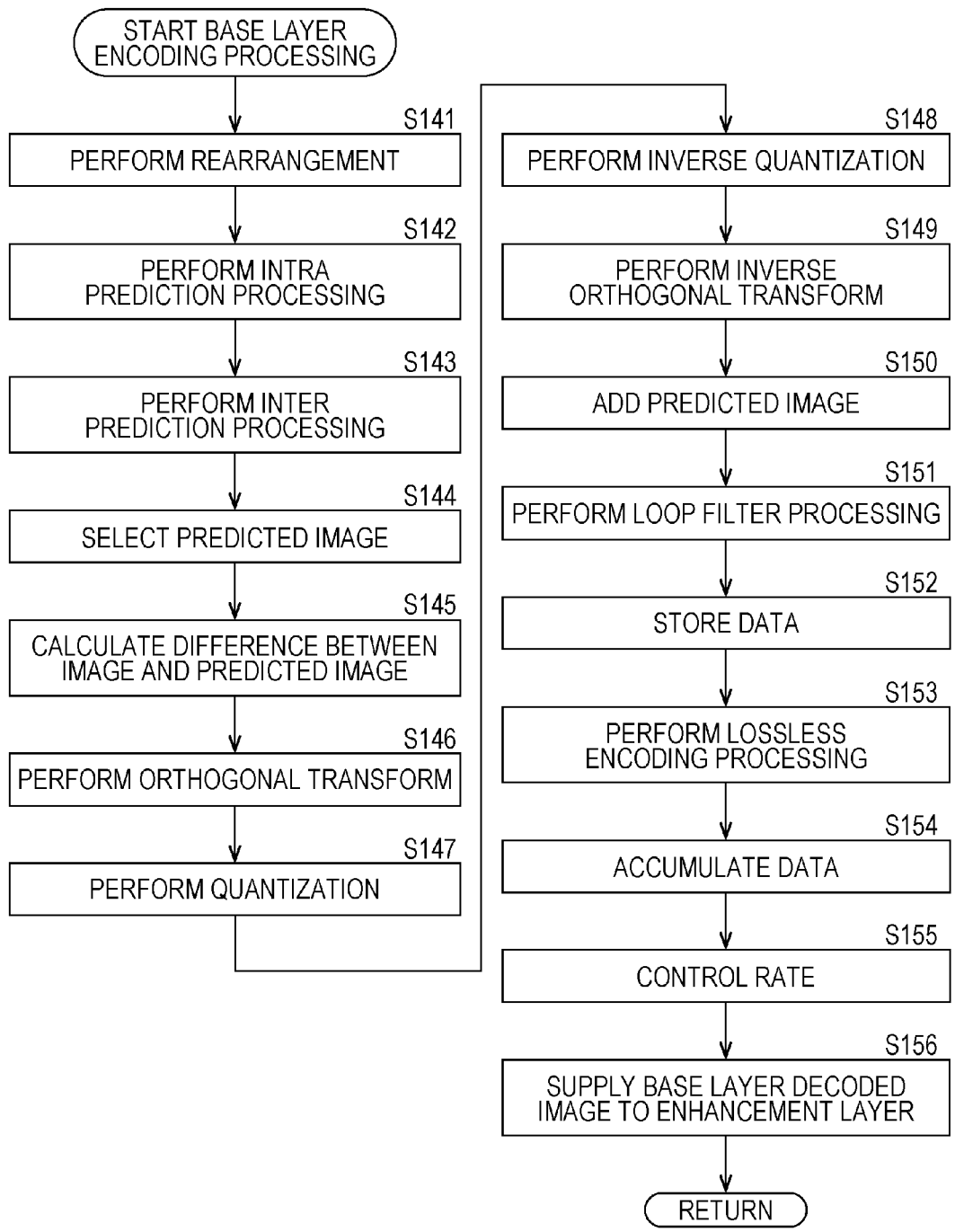
FIG. 39 is a flowchart for describing an example of a flow of base layer encoding processing.

In step S161, when the enhancement layer encoding processing is started, the frame memory 172 acquires and stores the information of the base layer including the base layer decoded image and the like supplied from the base layer image encoding processing by the processing of step S156 (FIG. 39).

Processing from steps S162 to S176 corresponds to the processing from steps S141 to S155 of the base layer encoding processing (FIG. 39), and is basically similarly executed to the corresponding processing. However, while the processing of the base layer encoding processing has been performed for the base layer, the processing of this enhancement layer encoding processing is performed for an enhancement layer.

When the processing of step S176 is terminated, the enhancement layer encoding processing is terminated, and the processing is returned to FIG. 38.

By execution of the processing as described above, the image encoding device 100 can more easily improve the encoding efficiency in the encoding of the RAW data.

Note that, in the above description, a case in which the image encoding device 100 encodes the two-hierarchy (two-layer) RAW data of the base layer and the enhancement layer subjected to the packing processing has been described. However, the number of hierarchies (the number of layers) of the RAW data encoded by the image encoding device 100 is arbitrary. That is, the encoding unit 122 of the image encoding device 100 may just have encoding units of the number of hierarchies (the number of layers) of the RAW data.

For example, when encoding RAW data of one hierarchy (only a base layer), the image encoding device 100 may just encode only the base layer. Therefore, the enhancement layer image encoding unit 132 can be omitted in the encoding unit 122.

Further, for example, when encoding RAW data of three hierarchies (three layers), the encoding unit 122 may include one base layer image encoding unit 131 and two enhancement layer image encoding units 132, and the base layer image encoding unit 131 may encode the base layer and the two enhancement layer image encoding units 132 may encode mutually different enhancement layers.

That is, when encoding RAW data of N hierarchies (N layers), for example, the encoding unit 122 may just include one base layer image encoding unit 131 and (N−1) enhancement layer image encoding units 132, and the base layer image encoding unit 131 may just encode the base layer and the (N−1) enhancement layer image encoding units 132 may just encode mutually different layers of the (N−1) enhancement layers.

3. Third Embodiment

<Image Decoding Device>

Figure 41:
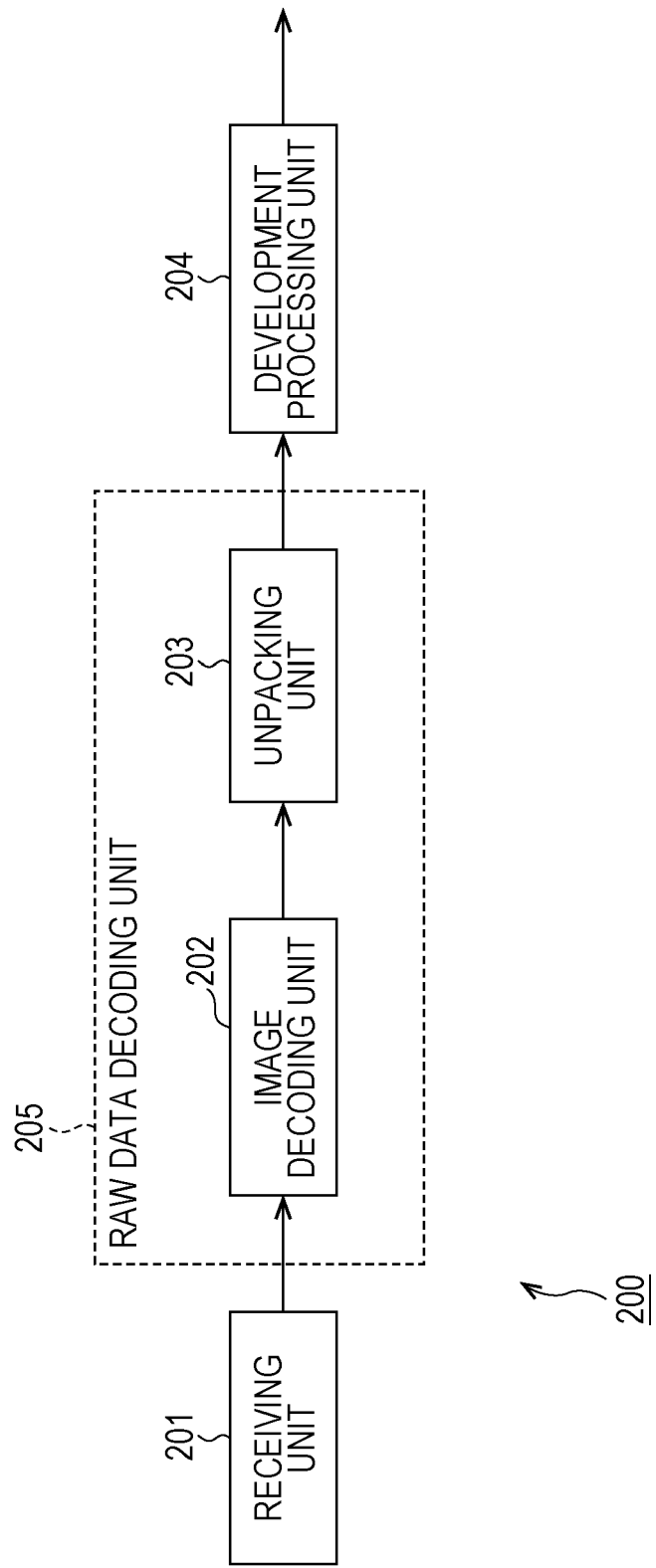
FIG. 41 is a block diagram illustrating a principle configuration example of an image decoding device.

Next, decoding of encoded data encoded as described above will be described. FIG. 41 is a block diagram illustrating a principal configuration example of an image decoding device corresponding to an image encoding device 100, the image decoding device being one form of an image processing apparatus to which the present technology is applied. An image decoding device 200 illustrated in FIG. 41 decodes encoded data generated by the image encoding device 100, by a decoding method corresponding to the encoding method.

As illustrated in FIG. 41, the image decoding device 200 includes a receiving unit 201, an image decoding unit 202, an unpacking unit 203, and a development processing unit 204.

The receiving unit 201 acquires a hierarchical image encoded stream transmitted from an encoding side. This hierarchical image encoded stream is a bit stream that includes encoded data that is encoded RAW data subjected to packing processing of rearranging each pixel data of the RAW data that is image data before demosaicing processing is performed according to the degree of correlation, SEI including packing information that is information related to the packing processing, a parameter set, and the like, as described in the first and second embodiments. The receiving unit 201 supplies the received hierarchical image encoded stream to the image decoding unit 202.

The image decoding unit 202 decodes the supplied hierarchical image encoded stream by a basically similar method to a case of decoding an encoded stream that is encoded image data after demosaicing processing, as described in the first embodiment. Note that, as described below, the image decoding unit 202 extracts the packing information included in the hierarchical image encoded stream. The image decoding unit 202 supplies the RAW data subjected to the packing processing, which has been obtained by decoding and the extracted packing information to the unpacking unit 203.

The unpacking unit 203 performs unpacking processing of returning the pixel data to an arrangement before the packing processing is performed, for the RAW data subjected to the packing processing, based on the packing information, as described in the first embodiment. Accordingly, the RAW data before the packing processing is performed is restored. The unpacking unit 203 supplies the obtained RAW data to the development processing unit 204.

The development processing unit 204 performs development processing such as demosaicing and automatic retouching, for the supplied RAW data, as described in the first embodiment. The development processing unit 204 outputs developed image data outside the image decoding device 200. An image of the image data is displayed on a monitor, predetermined image processing is applied to the image data, and the image data is encoded, recorded in a recording medium, and transmitted to another device through a transmission medium, for example.

Note that the image decoding unit 202 and the unpacking unit 203 may be configured as one processing unit (RAW data decoding unit 205). That is, for example, this RAW data decoding unit 205 (the image decoding unit 202 and the unpacking unit 203) may be configured as one image processing apparatus.

<Image Decoding Unit>

Figure 42:
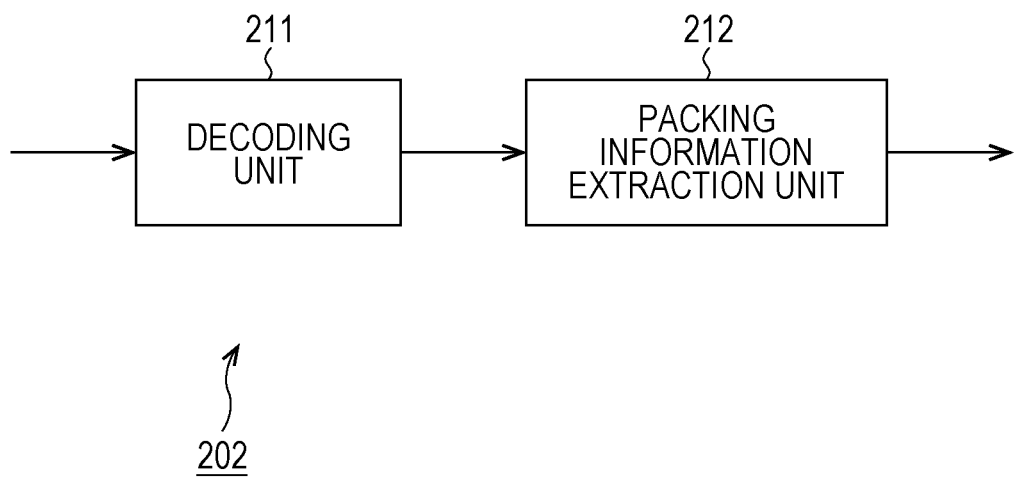
FIG. 42 is a block diagram illustrating a principal configuration example of an image decoding unit.

FIG. 42 is a block diagram illustrating a principal configuration example of the image decoding unit 202 of the FIG. 41. As illustrated in FIG. 42, the image decoding unit 202 includes a decoding unit 211 and a packing information extraction unit 212.

The decoding unit 211 performs decoding processing corresponding to encoding processing performed by an encoding unit 122, for the supplied hierarchical image encoded stream. As described in the first embodiment, the decoding unit 211 decodes the hierarchical image encoded stream by a basically similar method to a case of decoding encoded data that is encoded image data after the development processing to obtain the RAW data after the packing processing. The decoding unit 211 supplies the obtained RAW data after the packing processing, a parameter set and SEI (for example, CFAP SEI) of the encoded data, and the like to the packing information extraction unit 212.

The packing information extraction unit 212 extracts the packing information to be used in the unpacking processing from the supplied data (for example, the CFAP SEI). The hierarchical image encoded stream includes various types of packing information, as described in the first embodiment, for example. The packing information extraction unit 212 extracts the packing information, and supplies the packing information to the unpacking unit 203 together with the RAW rata after the packing processing.

<Decoding Unit>

Figure 43:
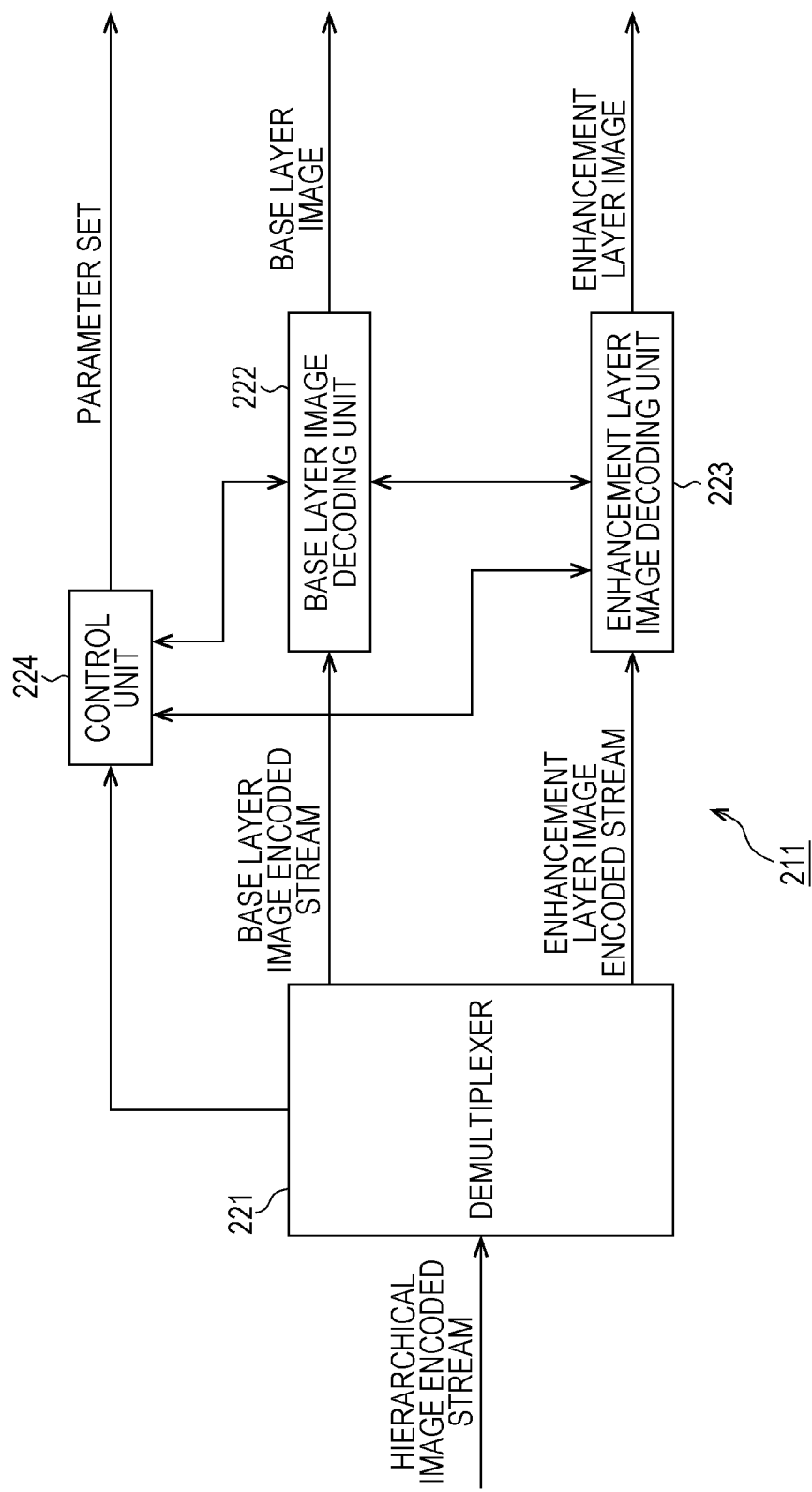
FIG. 43 is a block diagram illustrating a principal configuration example of a decoding unit.

FIG. 43 is a block diagram illustrating a principal configuration example of the decoding unit 211 of FIG. 42. The decoding method of the decoding unit 211 is arbitrary as long as the method corresponds to the encoding method of the encoding unit 122. For example, the decoding unit 211 performs hierarchical image decoding (scalable decoding) for the encoded data that is the RAW data after the packing processing, which has been subjected to hierarchical image encoding (scalable encoding). In FIG. 43, a case in which the decoding unit 211 performs the hierarchical image decoding (scalable decoding) for the encoded data that is the RAW data subjected to hierarchical image encoding (scalable encoding), the RAW data being made of two hierarchies of a base layer and an enhancement layer, and after the packing processing, will be described. As illustrated in FIG. 43, the decoding unit 211 includes a demultiplexer 221, abase layer image decoding unit 222, an enhancement layer image decoding unit 223, and a control unit 224.

The demultiplexer 221 receives the hierarchical image encoded stream transmitted from an encoding side, and demultiplexes the hierarchical image encoded stream to extract a base layer image encoded stream and an enhancement layer image encoded stream. Further, the demultiplexer 221 extracts the information such as the parameter set and the SEI (for example, CFAP SEI) included in the hierarchical image encoded stream, and supplies the information to the control unit 224.

The base layer image decoding unit 222 decodes the base layer image encoded stream extracted by the demultiplexer 221 to obtain data (also called base layer image) of the base layer of the RAW data after the packing processing. The base layer image decoding unit 222 supplies the obtained base layer image to the packing information extraction unit 212 (FIG. 42).

The enhancement layer image decoding unit 223 decodes the enhancement layer image encoded stream extracted by the demultiplexer 221 to obtain data (also called enhancement layer image) of the enhancement layer of the RAW data after the packing processing. The enhancement layer image decoding unit 223 supplies the obtained enhancement layer image to the packing information extraction unit 212 (FIG. 42).

The control unit 224 controls the base layer image decoding unit 222 and the enhancement layer image decoding unit 223 (controls the decoding of the respective layers) based on the information such as the parameter set supplied from the demultiplexer 221. The control unit 224 supplies the information such as the parameter set supplied from the demultiplexer 221 to the packing information extraction unit 212 (FIG. 42).

<Base Layer Image Decoding Unit>

Figure 44:
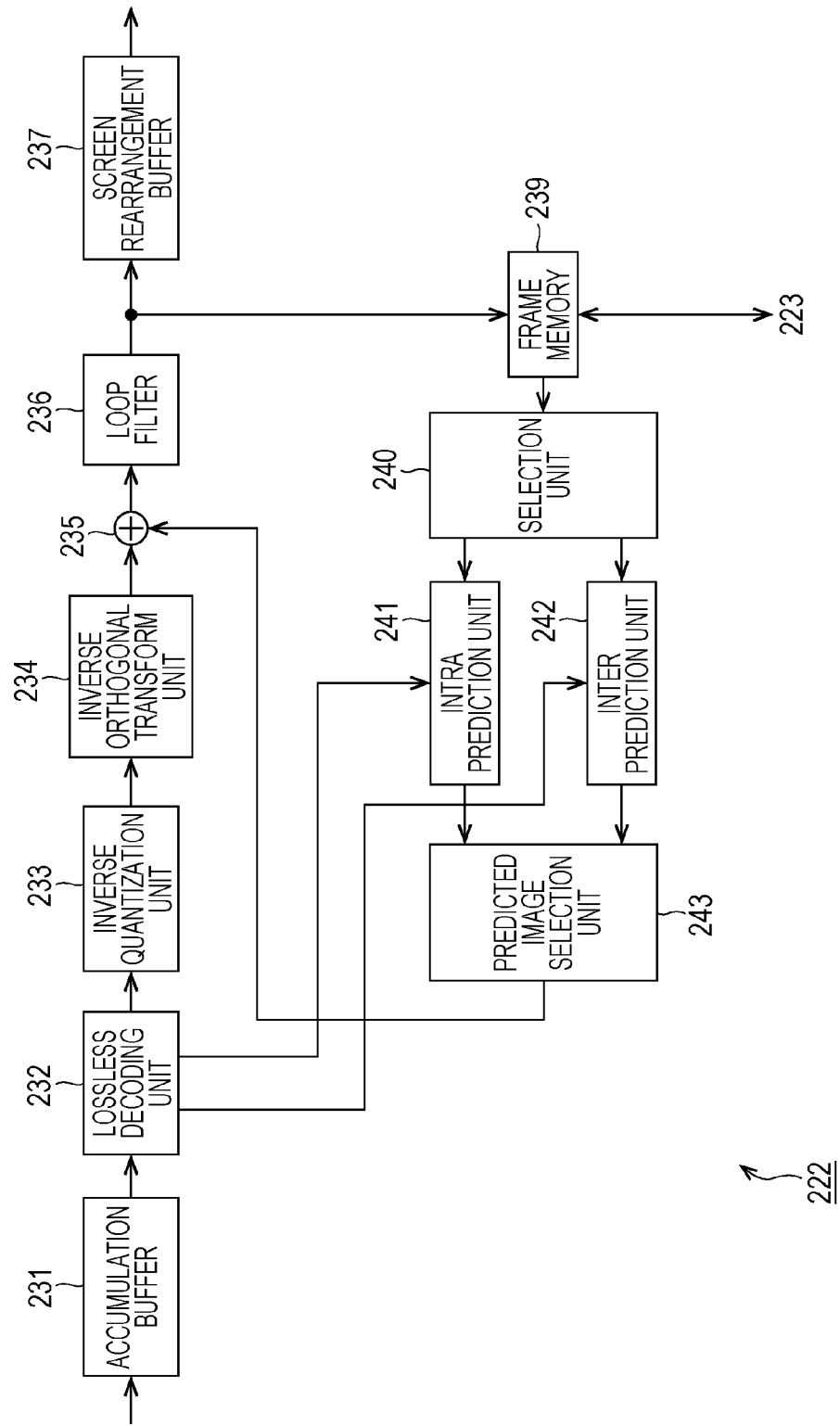
FIG. 44 is a block diagram illustrating a principal configuration example of a base layer image decoding unit.

FIG. 44 is a block diagram illustrating a principal configuration example of the base layer image decoding unit 222 of FIG. 43. As illustrated in FIG. 44, the base layer image decoding unit 222 includes an accumulation buffer 231, a lossless decoding unit 232, an inverse quantization unit 233, an inverse orthogonal transform unit 234, a calculation unit 235, a loop filter 236, and a screen rearrangement buffer 237. Further, the base layer image decoding unit 222 includes a frame memory 239, a selection unit 240, an intra prediction unit 241, an inter prediction unit 242, and a predicted image selection unit 243.

The accumulation buffer 231 is also a receiving unit that receives the transmitted encoded data (the base layer image encoded stream supplied from the demultiplexer 221). The accumulation buffer 231 receives the transmitted encoded data, accumulates the encoded data, and supplies the encoded data to the lossless decoding unit 232 at predetermined timing. Information necessary for decoding, such as prediction mode information, is added to the encoded data.

The lossless decoding unit 232 decodes the information encoded by the lossless encoding unit 146 and supplied from the accumulation buffer 231, in a decoding system corresponding to the encoding system. The lossless decoding unit 232 supplies a quantized coefficient of a difference image obtained by decoding to the inverse quantization unit 233.

Further, the lossless decoding unit 232 determines whether an intra prediction mode has been selected or an inter prediction mode has been selected as an optimum prediction mode, and supplies information related to the optimum prediction mode to the mode determined as being selected, of the intra prediction unit 241 and the inter prediction unit 242. That is, for example, when the intra prediction mode has been selected as the optimum prediction mode at the encoding side, the information (intra prediction mode information) related to the optimum prediction mode is supplied to the intra prediction unit 241. Further, for example, when the inter prediction mode has been selected as the optimum prediction mode at the encoding side, the information (inter prediction mode information) related to the optimum prediction mode is supplied to the inter prediction unit 242.

Further, the lossless decoding unit 232 extracts information necessary for inverse quantization, such as a quantization matrix and a quantization parameter from the encoded data, and supplies the information to the inverse quantization unit 233.

The inverse quantization unit 233 inversely quantizes quantized coefficient data obtained by decoding by the lossless decoding unit 232, in a system corresponding to the quantization system of the quantization unit 145. Note that the inverse quantization unit 233 is a processing unit similar to the inverse quantization unit 148. The inverse quantization unit 233 supplies the obtained coefficient data (orthogonal transform coefficient) to the inverse orthogonal transform unit 234.

The inverse orthogonal transform unit 234 inversely orthogonally transforms the orthogonal transform coefficient supplied from the inverse quantization unit 233, in a system corresponding to the orthogonal transform system of the orthogonal transform unit 144, as needed. Note that the inverse orthogonal transform unit 234 is a processing unit similar to the inverse orthogonal transform unit 149.

Image data of the difference image is restored by the inverse orthogonal transform processing. The restored image data of the difference image corresponds to the image data of the difference image before orthogonal transform is performed at the encoding side. Hereinafter, the restored image data of the different image obtained by the inverse orthogonal transform processing of the inverse orthogonal transform unit 234 is also called decoding residual data. The inverse orthogonal transform unit 234 supplies the decoding residual data to the calculation unit 235. Further, image data of a predicted image is supplied to the calculation unit 235 from the intra prediction unit 241 or the inter prediction unit 242 through the predicted image selection unit 243.

The calculation unit 235 obtains image data of a reconfigured image that is an added difference image and predicted image, using the decoding residual data and the image data of the predicted image. This reconfigured image corresponds to input image before a predicted image is subtracted by a calculation unit 143. The calculation unit 235 supplies the reconfigured image to the loop filter 236.

The loop filter 236 appropriately apply loop filter processing including deblocking filter processing, adaptive loop filter processing, and the like to the supplied reconfigured image to generate a decoded image. For example, the loop filter 236 removes block distortion by performing deblocking filter processing for the reconfigured image. Further, for example, the loop filter 236 performs image quality improvement for a deblocking filter processing result (the reconfigured image from which the block distortion has been removed) by performing the loop filter processing using a Wiener filter.

Types of the filter processing performed by the loop filter 236 are arbitrary, and filter processing other than the above processing may be performed. Further, the loop filter 236 may perform the filter processing using a filter coefficient used in filter processing performed in encoding and supplied from the encoding side. Further, the loop filter 236 may omit such filter processing and output the input data without performing the filter processing.

The loop filter 236 supplies the decoded image (or the reconfigured image) that is a filter processing result to the screen rearrangement buffer 237 and the frame memory 239.

The screen rearrangement buffer 237 rearranges an order of frames about the decoded image. That is, the screen rearrangement buffer 237 rearranges the image with frames rearranged in an order of encoding by the screen rearrangement buffer 142 into an original order of display. That is, the screen rearrangement buffer 237 stores the image data of the decoded image of frames to be supplied in the order of encoding, in that order, and reads, in the order of display, the image data of the decoded image of the frames stored in the order of encoding, and supplies the read image data to the packing information extraction unit 212 (FIG. 42).

The frame memory 239 stores the supplied decoded image, and supplies the stored decoded image to the intra prediction unit 241 and the inter prediction unit 242 through the selection unit 240 as a reference image at predetermined timing or based on a request of an outside such as the intra prediction unit 241 or the inter prediction unit 242.

The selection unit 240 selects a supply destination of the reference image supplied from the frame memory 239. For example, in a case of intra prediction, the selection unit 240 supplies the reference image supplied from the frame memory 239 to the intra prediction unit 241. Further, for example, in a case of inter prediction, the selection unit 240 supplies the reference image supplied from the frame memory 239 to the inter prediction unit 242.

The intra prediction mode information and the like are appropriately supplied to the intra prediction unit 241 from the lossless decoding unit 232. The intra prediction unit 241 performs intra prediction in the intra prediction mode (optimum intra prediction mode) used in the intra prediction unit 154 to generate a predicted image. At that time, the intra prediction unit 241 performs intra prediction using the image data of the reconfigured image supplied from the frame memory 239 through the selection unit 240. That is, the intra prediction unit 241 uses the reconfigured image as the reference image (peripheral pixel). The intra prediction unit 241 supplies the generated predicted image to the predicted image selection unit 243.

Optimum prediction mode information, motion information, and the like are appropriately supplied to the inter prediction unit 242 from the lossless decoding unit 232. The inter prediction unit 242 performs inter prediction using the decoded image (reference image) acquired from the frame memory 239 in the inter prediction mode (optimum inter prediction mode) indicated by the optimum prediction mode information acquired from the lossless decoding unit 232 to generate a predicted image.

The predicted image selection unit 243 supplies the predicted image supplied from the intra prediction unit 241 or the predicted image supplied from the inter prediction unit 242 to the calculation unit 235. In the calculation unit 235, the predicted image and the decoding residual data (difference image information) from the inverse orthogonal transform unit 234 are added, and a reconfigured image is obtained.

Further, the frame memory 239 supplies the stored information such as a base layer decoded image and the like to the enhancement layer image decoding unit 223 (FIG. 43), as needed. Note that the frame memory 239 may acquire and store information such as an enhancement layer decoded image and the like supplied from the enhancement layer image decoding unit 223. This information is supplied to the intra prediction unit 241 or the inter prediction unit 242 through the selection unit 240 as the reference image and the like, as needed.

<Enhancement Layer Image Decoding Unit>

Figure 45:
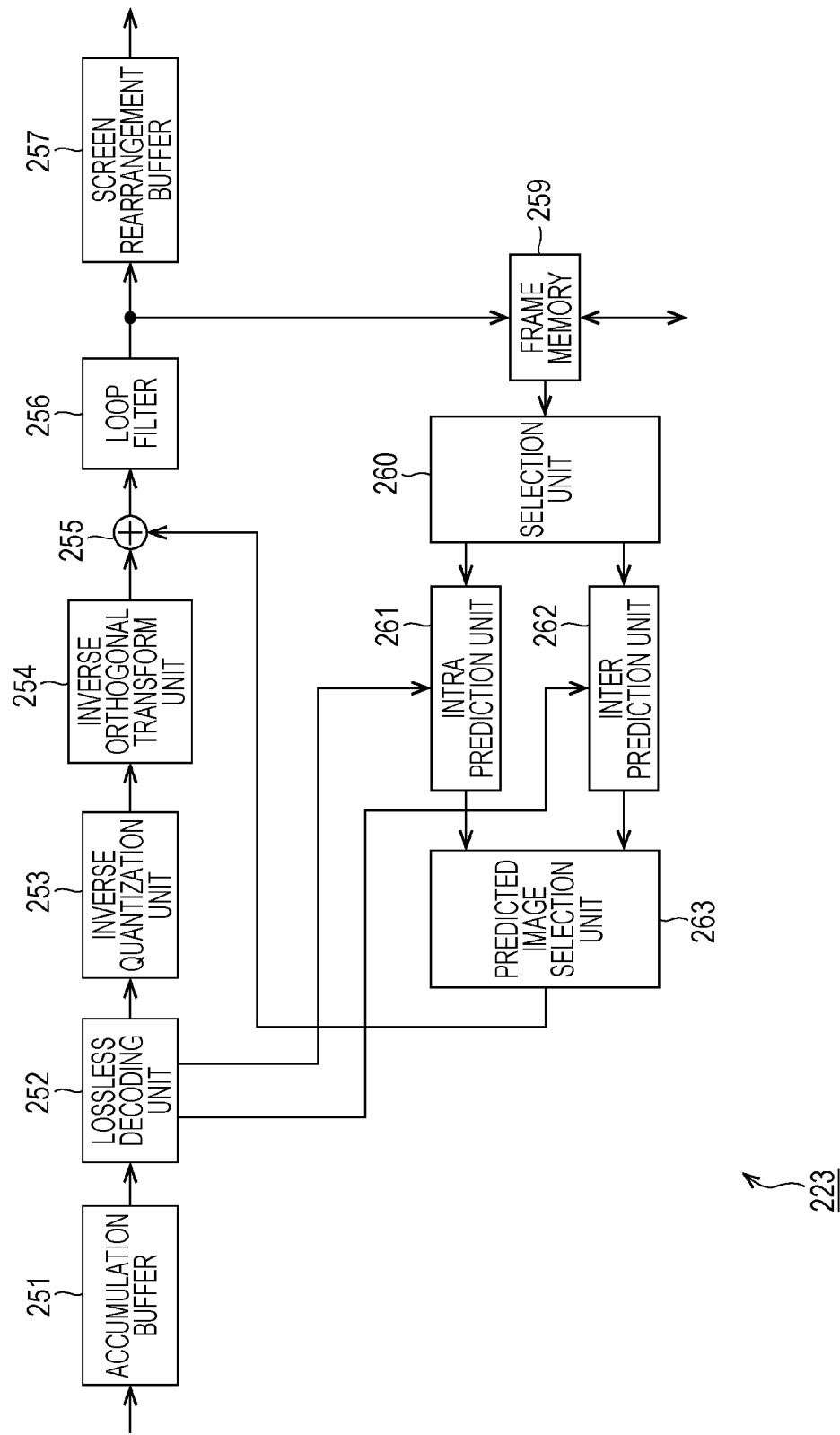
FIG. 45 is a block diagram illustrating a principal configuration diagram of an enhancement layer image decoding unit.

FIG. 45 is a block diagram illustrating a principal configuration example of the enhancement layer image decoding unit 223 of FIG. 43. As illustrated in FIG. 43, the enhancement layer image decoding unit 223 has a configuration basically similar to the base layer image decoding unit 222 of FIG. 44.

That is, as illustrated in FIG. 45, the enhancement layer image decoding unit 223 includes an accumulation buffer 251, a lossless decoding unit 252, an inverse quantization unit 253, an inverse orthogonal transform unit 254, a calculation unit 255, a loop filter 256, and a screen rearrangement buffer 257. Further, the enhancement layer image decoding unit 223 includes a frame memory 259, a selection unit 260, an intra prediction unit 261, an inter prediction unit 262, and a predicted image selection unit 263.

The accumulation buffer 251 to the predicted image selection unit 263 correspond to the accumulation buffer 231 to the predicted image selection unit 243 of FIG. 44, and perform processing similar to corresponding processing units. Note that the units of the enhancement layer image decoding unit 223 perform processing about encoding of enhancement layer image information, instead of a base layer. Therefore, the description about the accumulation buffer 231 to the predicted image selection unit 243 of FIG. 44 can be applied as description of the processing of the accumulation buffer 251 to the predicted image selection unit 263. In that case, data to be processed needs to be data of the enhancement layer, instead of data of the base layer. Further, processing units of an input source and an output destination of data need to be appropriately replaced with and read as corresponding processing units in the accumulation buffer 251 to the predicted image selection unit 263.

Further, the frame memory 259 acquires and stores the information such as the base layer decoded image and the like supplied from the base layer image decoding unit 222 (FIG. 44). This information is supplied to the intra prediction unit 261 or the inter prediction unit 262 through the selection unit 260 as the reference image and the like, as needed. Note that the frame memory 259 may supply the stored enhancement layer decoded image to the base layer image decoding unit 222 (FIG. 44), as needed.

<Unpacking Unit>

Figure 46:
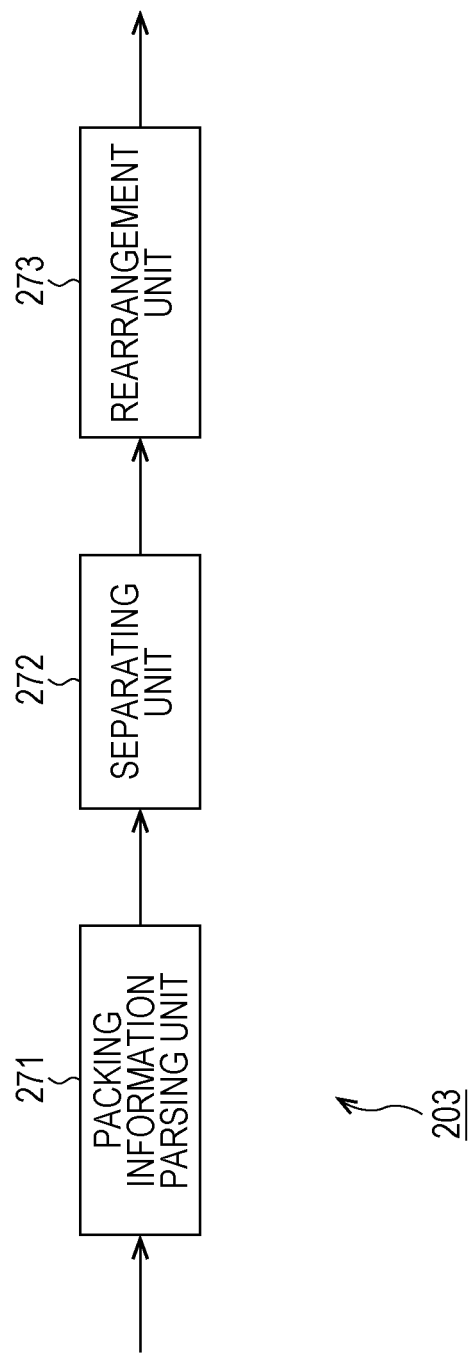
FIG. 46 is a block diagram illustrating a configuration example of an unpacking unit.

FIG. 46 is a block diagram illustrating a principal configuration example of the unpacking unit 203 of FIG. 41. As illustrated in FIG. 46, the unpacking unit 203 includes a packing information parsing unit 271, a separating unit 272, and a rearrangement unit 273.

The packing information parsing unit 271 parses packing information supplied from the image decoding unit 202 (FIG. 41). The packing information parsing unit 271 supplies a parsing result to the separating unit 272 together with the RAW data subjected to the packing processing and supplied from the image decoding unit 202 (FIG. 41).

The separating unit 272 separates the pixel data of the RAW data subjected to the packing processing based on the parsing result of the packing information. The separating unit 272 supplies the separated pixel data to the rearrangement unit 273 together with the parsing result of the packing information.

The rearrangement unit 273 rearranges and puts the separated pixel data back to the arrangement before the packing processing is performed, based on the parsing result of the packing information. That is, the RAW data before the packing processing is performed is restored. The rearrangement unit 273 supplies the obtained RAW data to the development processing unit 204 (FIG. 41).

With the above-described configuration, the image decoding device 200 can more easily and accurately perform decoding by a method corresponding to the encoding method associated with the packing processing, and can perform unpacking processing. That is, the image decoding device 200 can more easily improve the encoding efficiency.

<Flow of Image Decoding Processing>

Next, a flow of the processing executed by the image decoding device 200 as described above will be described. First, an example of a flow of RAW image decoding processing will be described with reference to the flowchart of FIG. 47.

In step S201, when the RAW image decoding processing is started, the receiving unit 201 of the image decoding device 200 receives the bit stream (hierarchical image encoded stream) including the encoded data that is encoded RAW data subjected to the packing processing and transmitted from the encoding side.

In step S202, the image decoding unit 202 decodes the hierarchical image encoded stream received in step S201.

In step S203, the unpacking unit 203 performs the unpacking processing for the RAW data subjected to the packing processing and obtained by the processing of step S202.

In step S204, the development processing unit 204 performs development processing including demosaicing processing, retouch processing of color, brightness, tone, and the like, and the like for the RAW data obtained by the processing of step S203. When image data after the demosaicing processing is obtained, the RAW image decoding processing is terminated.

<Flow of Image Decoding Processing>

Next, an example of a flow of image decoding processing executed in step S202 of FIG. 47 will be described by reference to the flowchart of FIG. 48. In step S211, when the image decoding processing is started, the decoding unit 211 of the image decoding unit 202 decodes the hierarchical image encoded stream. In step S212, the packing information extraction unit 212 extracts the packing information from the SEI (for example, the CFAP SEI) included in the hierarchical image encoded stream. As described in the first embodiment, for example, the CFAP SEI includes various types of packing information. The packing information extraction unit 212 extracts the packing information, and provides the packing information to the unpacking processing. When the packing information is included in the parameter set, header information, or the like, the packing information extraction unit 212 may extract the packing information therefrom.

Figure 47:
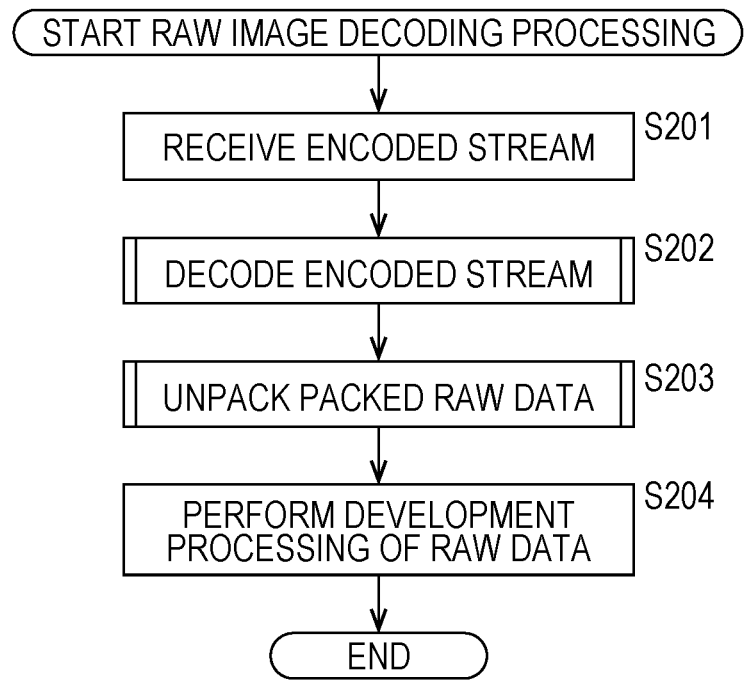
FIG. 47 is a flowchart for describing an example of a flow of RAW image decoding processing.

When the processing of step S212 is terminated, the image decoding processing is terminated, and the processing is returned to FIG. 47.

<Flow of Decoding Processing>

Next, an example of a flow of decoding processing executed in step S211 of FIG. 48 will be described with reference to the flowchart of FIG. 49.

In step S221, when the decoding processing is started, the demultiplexer 221 of the image decoding device 200 demultiplexes the hierarchical image encoded stream transmitted from the encoding side on a layer by layer basis.

In step S222, the control unit 224 controls the decoding of each layer based on the information such as the parameter set and the SEI extracted in step S221.

In step S223, the base layer image decoding unit 222 decodes the base layer image encoded stream. In step S224, the enhancement layer image decoding unit 223 decodes the enhancement layer image encoded stream.

When the processing of step S224 is terminated, the decoding processing is terminated.

<Flow of Base Layer Decoding Processing>

Next, an example of a flow of base layer decoding processing executed in step S223 of FIG. 47 will be described with reference to the flowchart of FIG. 50.

In step S231, when the base layer decoding processing is started, the accumulation buffer 231 of the base layer image decoding unit 222 accumulates the transmitted base layer encoded stream. In step S232, the lossless decoding unit 232 decodes the base layer encoded stream supplied from the accumulation buffer 231. That is, image data of an I slice, a P slice, and a B slice encoded by the lossless encoding unit 146 is decoded. At this time, the various types of information other than the image data, which are included in the bit stream such as the header information are also decoded.

In step S233, the inverse quantization unit 233 inversely quantizes a quantized coefficient obtained by the processing of step S232.

In step S234, the inverse orthogonal transform unit 234 inversely orthogonally transforms the coefficient inversely quantized in step S233.

In step S235, the intra prediction unit 241 and the inter prediction unit 242 perform prediction processing, and generate a predicted image. That is, the prediction processing is performed in a prediction mode applied in encoding, the prediction mode having been determined in the lossless decoding unit 232. To be specific, for example, when intra prediction is applied in encoding, the intra prediction unit 241 generates the predicted image in the intra prediction mode, which has been determined to be optimum in encoding. Further, for example, when inter prediction is applied in encoding, the inter prediction unit 242 generates the predicted image in the inter prediction mode, which has been determined to be optimum in encoding.

In step S236, the calculation unit 235 adds the predicted image generated in step S235 to the difference image obtained by the inverse orthogonal transform in step S234. Accordingly, the image data of the reconfigured image can be obtained.

In step S237, the loop filter 236 appropriately performs the loop filter processing including the deblocking filter processing, the adaptive loop filter processing, and the like for the image data of the reconfigured image obtained by the processing of step S236.

In step S238, the screen rearrangement buffer 237 performs rearrangement of frames of a decoded image obtained by the filter processing of step S237. That is, an order of the frames rearranged in encoding is rearranged to an original order of display. The screen rearrangement buffer 237 reads the frames of the decoded image in the rearranged order, and supplies the frames to the packing information extraction unit 212.

In step S239, the frame memory 239 stores data of the decoded image obtained by the processing of step S237, the reconfigured image obtained by the processing of step S226, and the like.

In step S240, the frame memory 239 supplies the stored information of the base layer decoded image and the like to enhancement layer decoding processing.

Figure 49:
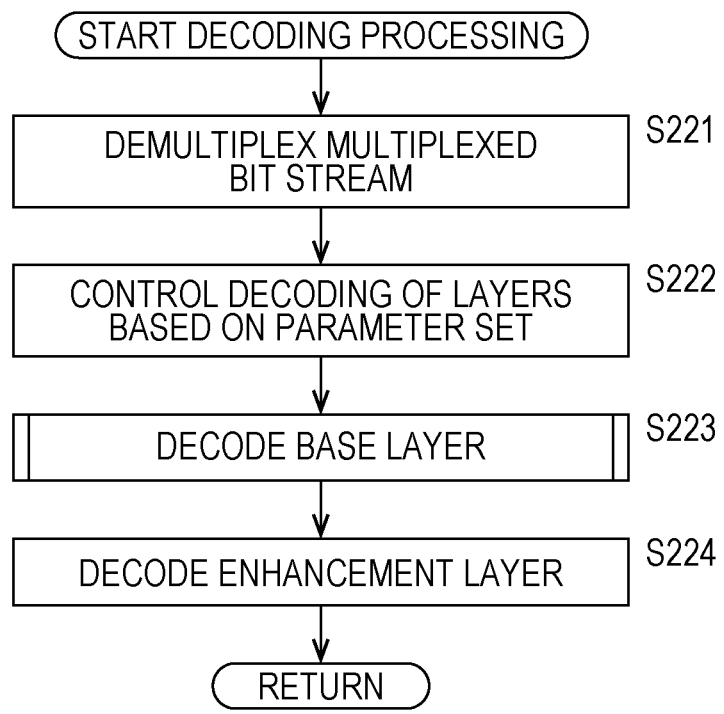
FIG. 49 is a flowchart for describing an example of a flow of decoding processing.

When the processing of step S240 is terminated, the base layer decoding processing is terminated, and the processing is returned to FIG. 49.

<Flow of Enhancement Layer Decoding Processing>

Figure 51:
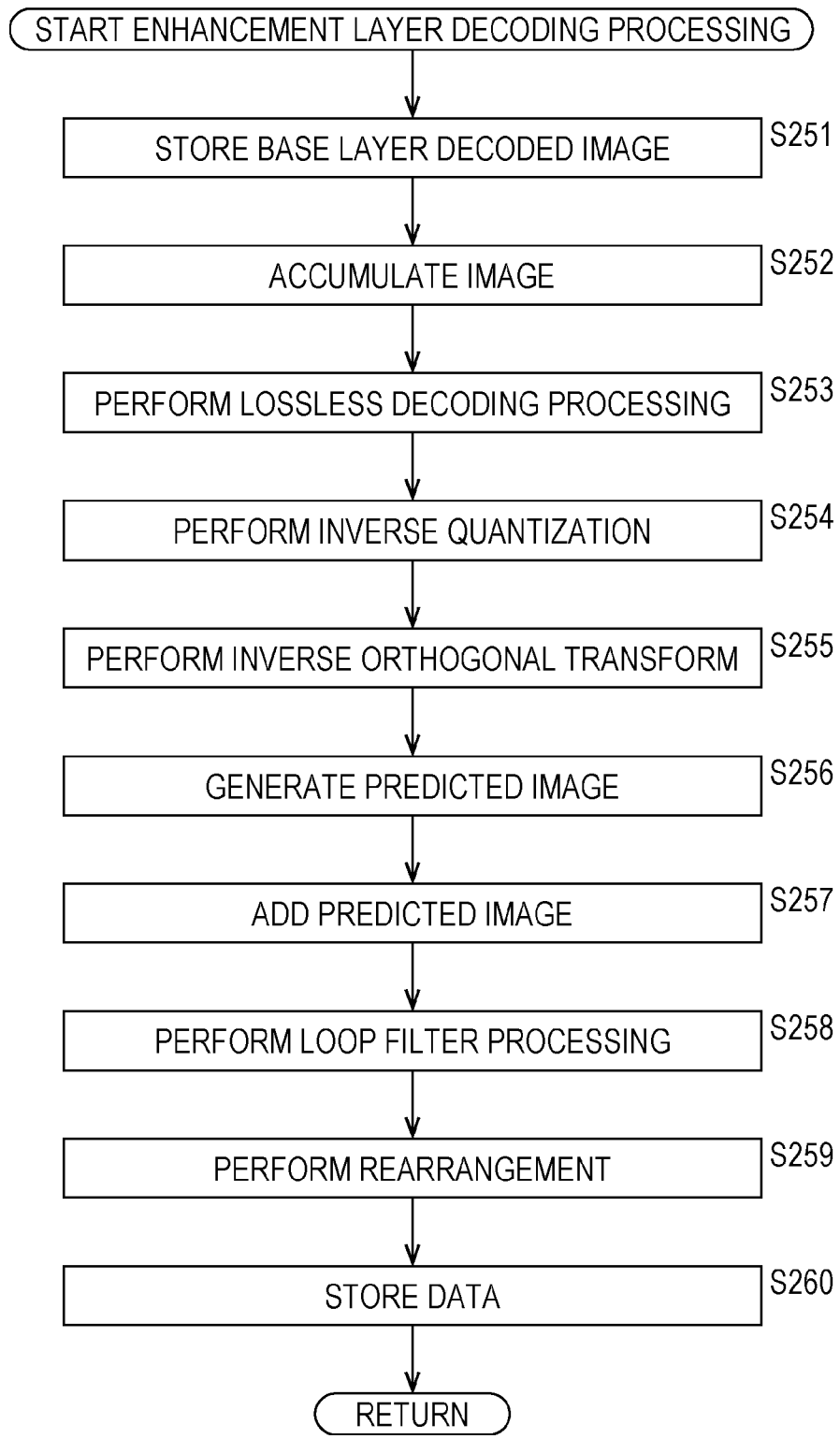
FIG. 51 is a flowchart for describing an example of a flow of enhancement layer decoding processing.

Next, an example of a flow of the enhancement layer decoding processing executed by the enhancement layer image decoding unit 223 in step S224 of FIG. 49 will be described with reference to the flowchart of FIG. 51.

Figure 50:
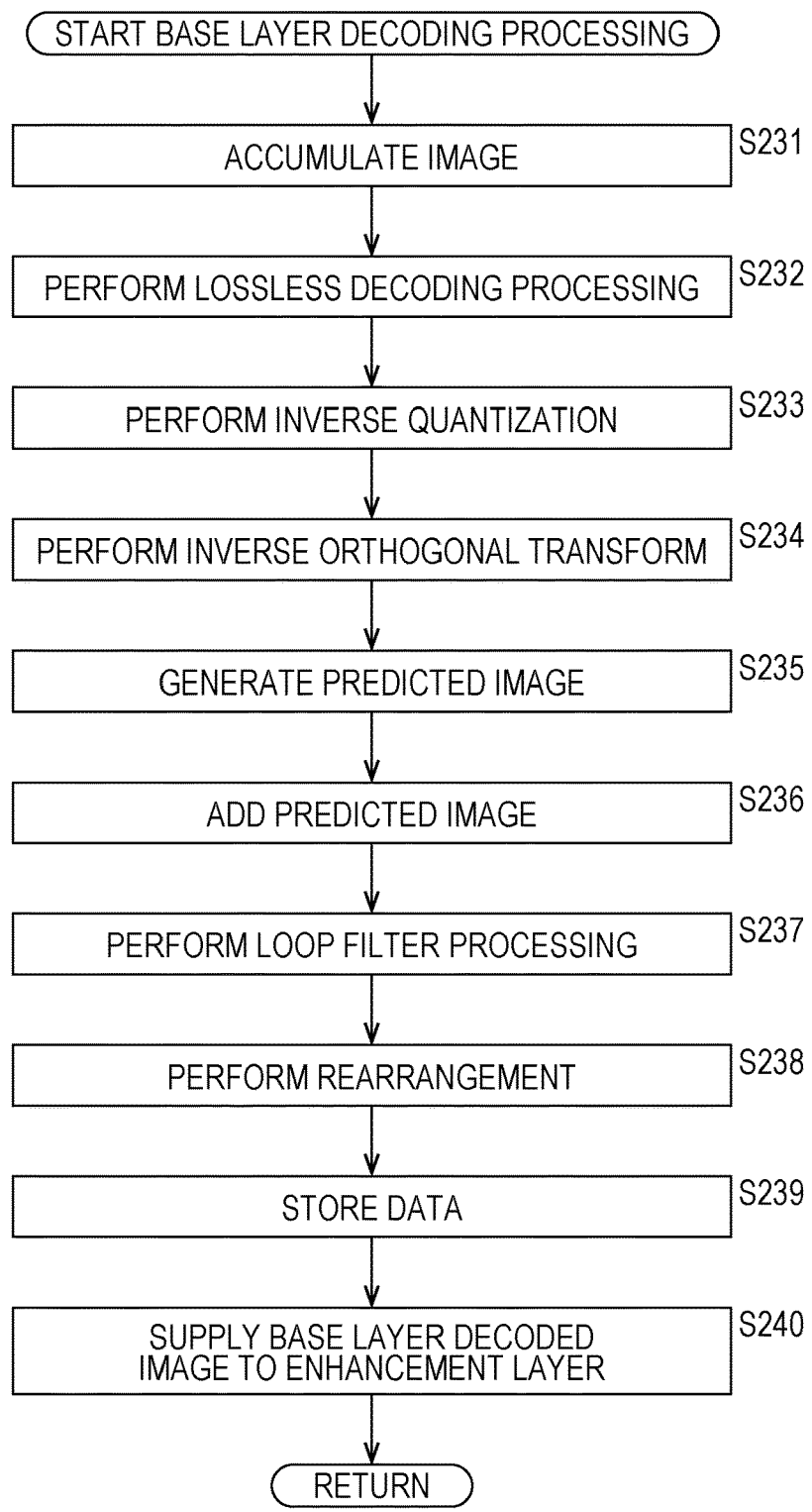
FIG. 50 is a flowchart for describing an example of a flow of base layer decoding processing.

In step S251, when the enhancement layer decoding processing is started, the frame memory 259 acquires and stores the information of the base layer including the base layer decoded image and the like supplied from the base layer decoding processing by the processing of step S240 (FIG. 50).

Processing from steps S252 to S260 correspond to the processing from steps S231 to S239 of the base layer decoding processing (FIG. 50), and is basically similarly executed to the corresponding processing. However, while the processing of the base layer decoding processing has been performed for the base layer, the processing of the enhancement layer decoding processing is performed for the enhancement layer.

When the processing of step S260 is terminated, the enhancement layer decoding processing is terminated, and the processing is returned to FIG. 49.

<Flow of Unpacking Processing>

Figure 52:
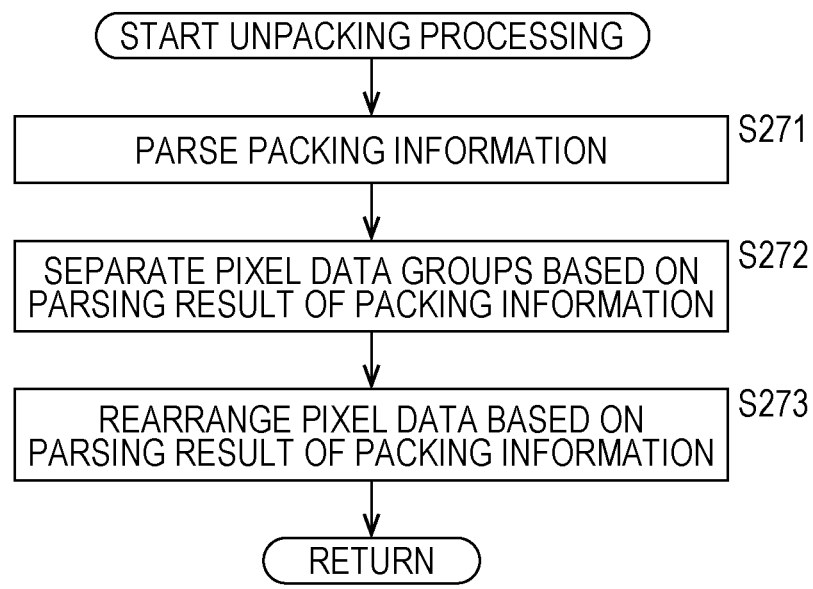
FIG. 52 is a flowchart for describing an example of a flow of unpacking processing.

Next, an example of a flow of the unpacking processing executed in step S203 of FIG. 47 will be described with reference to the flowchart of FIG. 52.

Figure 48:
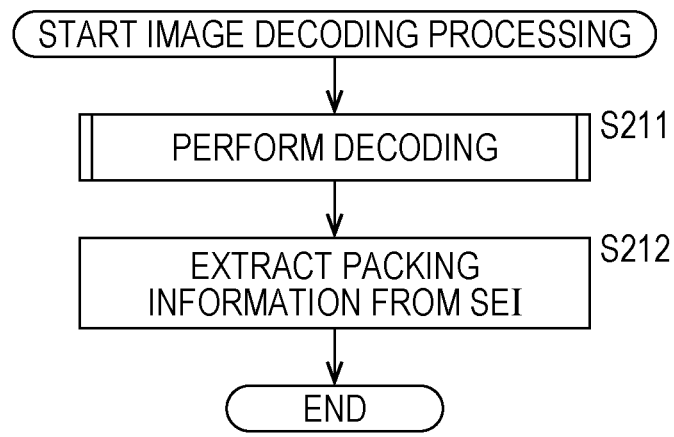
FIG. 48 is a flowchart for describing an example of a flow of image decoding processing.

In step S271, when the unpacking processing is started, the packing information parsing unit 271 (FIG. 46) of the unpacking unit 203 parses the packing information extracted by the processing of step S212 (FIG. 48).

In step S272, the separating unit 272 separates pixel data groups of the RAW data subjected to the packing processing and obtained by decoding encoded data by the processing of step S211 (FIG. 48), based on a parsing result of the packing information obtained by the processing of step S271.

In step S273, the rearrangement unit 273 rearranges the pixel data separated in step S272 to an arrangement before the packing processing, based on the parsing result of the packing information obtained by the processing of step S271. By the processing, the RAW data before the packing processing is restored.

When the processing of step S273 is terminated, the unpacking processing is terminated, and the processing is returned to FIG. 48.

By execution of the processing as described above, the image decoding device 200 can easily and correctly decode the encoded data that is encoded RAW data. That is, the image decoding device 200 can more easily improve the encoding efficiency in encoding of RAW data.

Note that, in the above description, a case in which the image decoding device 200 decodes the encoded data that is two-hierarchy (two-layer) encoded RAW data of the base layer and the enhancement layer subjected to the packing processing has been described. However, the number of hierarchies (the number of layers) of the RAW data of the encoded data decoded by the image decoding device 200 is arbitrary. That is, the decoding unit 211 of the image decoding device 200 may just include the encoding units of the number of hierarchies (the number of layers) of the RAW data.

For example, when decoding the encoded data that is encoded RAW data of one hierarchy (only the base layer), the image decoding device 200 may just encode only the base layer. Therefore, the enhancement layer image decoding unit 223 can be omitted in the decoding unit 211 (FIG. 43).

Further, when decoding the encoded data that is encoded RAW data of three hierarchies (three layers), the decoding unit 211 may just include one base layer image decoding unit 222 and two enhancement layer image decoding units 223, and the base layer image decoding unit 222 may just encode the base layer and the two enhancement layer image decoding units 223 may just encode mutually different enhancement layers.

That is, for example, when decoding the encoded data that is encoded RAW data of N hierarchies (N layers), the decoding unit 211 may just include one base layer image decoding unit 222 and (N−1) enhancement layer image decoding units 223, and the base layer image decoding unit 222 may just encode the base layer and the (N−1) enhancement layer image decoding units 223 may just encode mutually different layers of (N−1) enhancement layers.

As for an application range of the present technology, the present technology can be applied to any image encoding device and image decoding device that can encode/decode RAW data.

Further, for example, the present technology can be applied to the image encoding device and the image decoding device used in receiving the image information (bit stream) compressed by the orthogonal transform and the motion compensation such as discrete cosine transform, like MPEG, H. 26x, or the like through satellite broadcasting, a cable television, the Internet, or a network medium such as a mobile phone device. Further, the present technology can be applied to the image encoding device and the image decoding device used in performing processing on a storage medium like an optical disk, a magnetic disk, or a flash memory.

4. Fourth Embodiment

<Application to Multi-View Image Encoding/Multi-View Image Decoding>

Figure 53:
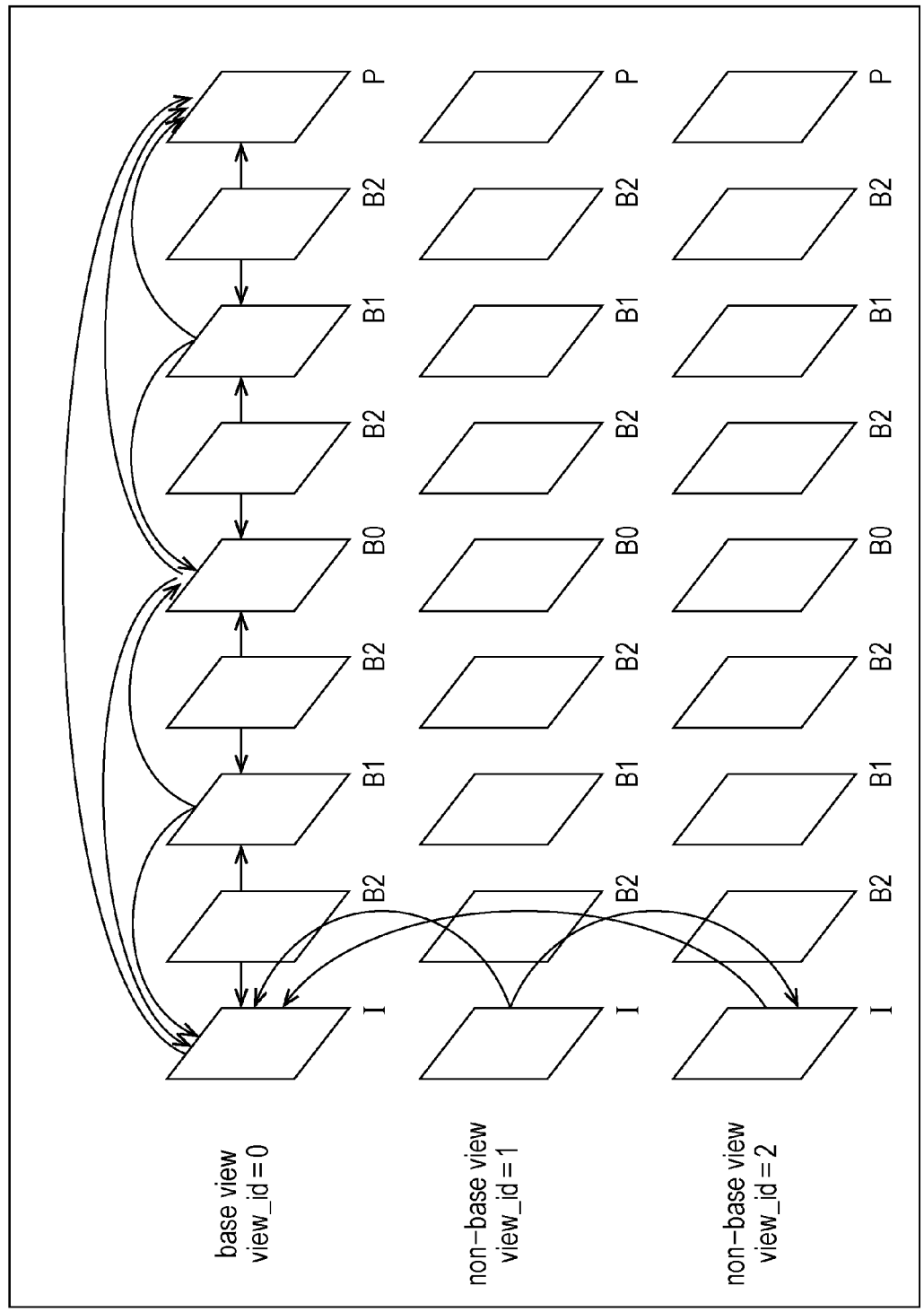
FIG. 53 is a diagram illustrating an example of a multi-view image encoding system.

The above-described series of processing can be applied to multi-view image encoding/multi-view image decoding. FIG. 53 illustrates an example of a multi-view image encoding system.

As illustrated in FIG. 53, a multi-view image includes images of a plurality of viewpoints (views). The plurality of views of the multi-view image is made of a base view for which encoding/decoding are performed using only images of the own view without using information of other views, and non-base views for which encoding/decoding are performed using the information of other views. The encoding/decoding of the non-base views may use information of the base view or may use information of another non-base view.

That is, a reference relationship among the views in the multi-view image encoding/decoding is similar to a reference relationship among layers in hierarchical image encoding/decoding. Therefore, in encoding/decoding of the multi-view images like FIG. 53, the above-described method may be applied. In doing so, the encoding efficiency can be more easily improved in encoding of RAW data in the case of the multi-view images.

<Multi-View Image Encoding Device>

Figure 54:
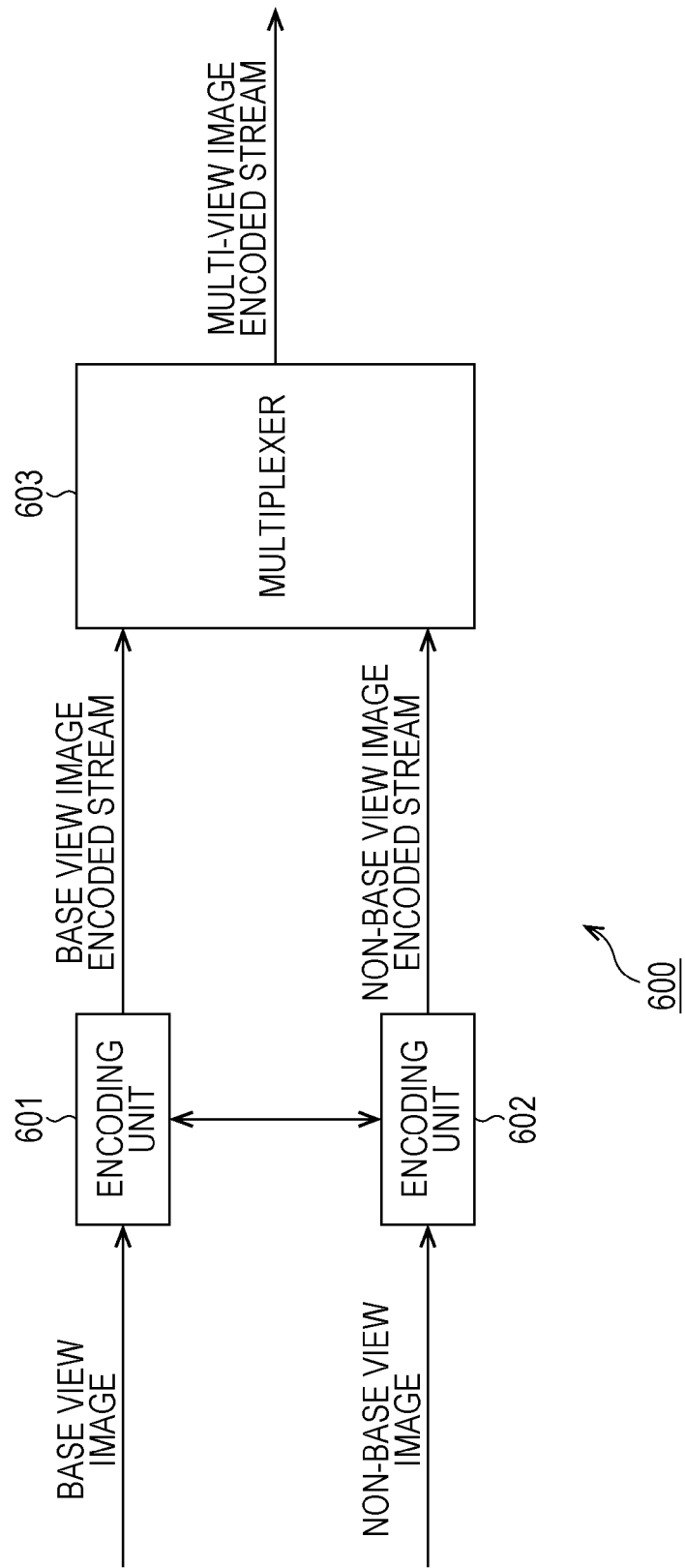
FIG. 54 is a diagram illustrating a principal configuration example of a multi-view image encoding device to which the present technology is applied.

FIG. 54 is a diagram illustrating a multi-view image encoding device that performs the above-described multi-view image encoding. As illustrated in FIG. 54, a multi-view image encoding device 600 includes an encoding unit 601, an encoding unit 602, and a multiplexer 603.

The encoding unit 601 encodes the base view image to generate a base view image encoded stream. The encoding unit 602 encodes the non-base view image to generate a non-base view image encoded stream. The multiplexer 603 multiplexes the base view image encoded stream generated in the encoding unit 601 and the non-base view image encoded stream generated in the encoding unit 602 to generate a multi-view image encoded stream.

As the encoding unit 122 of the image encoding device 100 described in the second embodiment, such a multi-view image encoding device 600 may be applied. In doing so, the image encoding device 100 can encode the multi-view images in which images of respective viewpoints are RAW data by the method described in the first and second embodiments. That is, the image encoding device 100 can more easily improve the encoding efficiency in the encoding of the multi-view images in which the images of respective viewpoints are RAW data.

<Multi-View Image Decoding Device>

Figure 55:
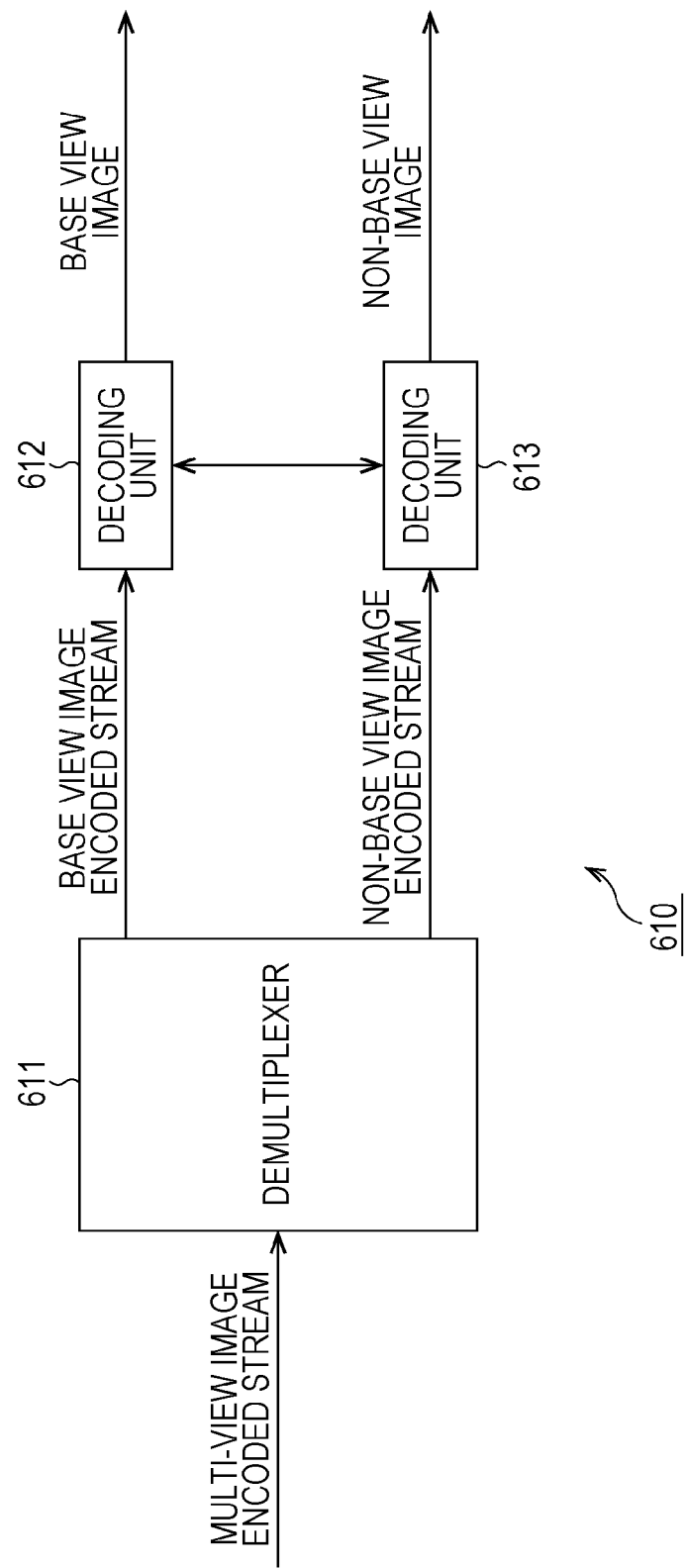
FIG. 55 is a diagram illustrating a principal configuration example of a multi-view image decoding device to which the present technology is applied.

FIG. 55 is a diagram illustrating a multi-view image decoding device that performs the above-described multi-view image decoding. As illustrated in FIG. 55, a multi-view image decoding device 610 includes a demultiplexer 611, a decoding unit 612, and a decoding unit 613.

The demultiplexer 611 demultiplexes the multi-view image encoded stream that is the multiplexed base view image encoded stream and non-base view image encoded stream to extract the base view image encoded stream and the non-base view image encoded stream. The decoding unit 612 decodes the base view image encoded stream extracted by the demultiplexer 611 to obtain the base view image. The decoding unit 613 decodes the non-base view image encoded stream extracted by the demultiplexer 611 to obtain the non-base view image.

As the decoding unit 211 of the image decoding device 200 described in the third embodiment, such a multi-view image decoding device 610 may be applied. In doing so, the image decoding device 200 can accurately decode the encoded data that is the multi-view images in which the images of respective viewpoints are RAW data encoded by the method described in the first or second embodiment. That is, the image decoding device 200 can more easily improve the encoding efficiency in the encoding of the multi-view images in which the images of respective viewpoints are RAW data.

5. Fifth Embodiment

<Computer>

The above-described series of processing can be executed by hardware or can be executed by software. When the series of processing is executed by software, a program that configures the software is installed in a computer. Here, the computer includes a computer incorporated in special hardware, and a general-purpose personal computer that can execute various functions by installing various programs.

Figure 56:
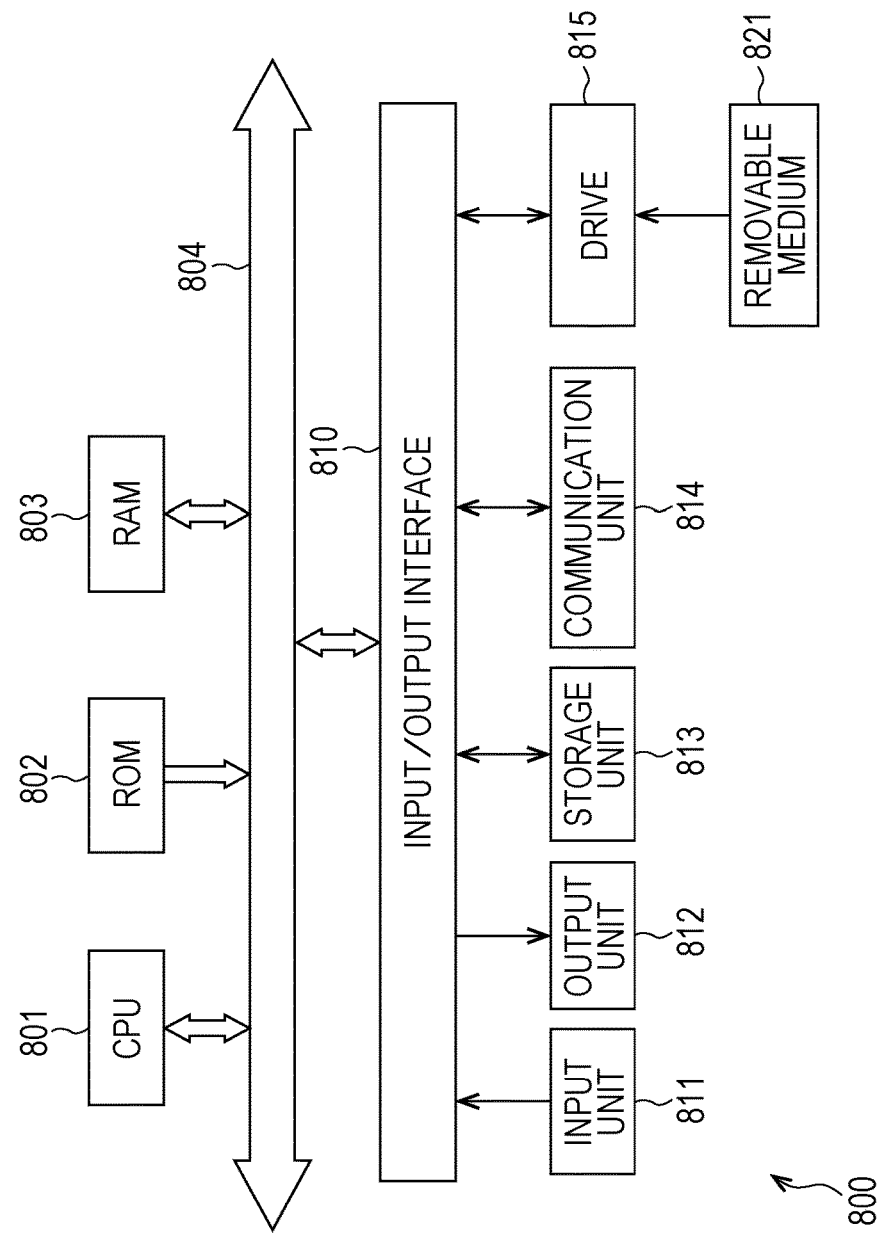
FIG. 56 is a block diagram illustrating a principal configuration example of a computer.

FIG. 56 is a block diagram illustrating a configuration example of hardware of a computer that executes the above-described series of processing with a program.

In a computer 800 illustrated in FIG. 56, a central processing unit (CPU) 801, a read only memory (ROM) 802, a random access memory (RAM) 803 are mutually connected through a bus 804.

An input/output interface 810 is also connected to the bus 804. An input unit 811, an output unit 812, a storage unit 813, a communication unit 814, and a drive 815 are connected to the input/output interface 810.

The input unit 811 is made of a keyboard, a mouse, a microphone, a touch panel, an input terminal, and the like. The output unit 812 is made of a display, a speaker, an output terminal, and the like. The storage unit 813 is made of a hard disk, a RAM disk, a non-volatile memory, and the like. The communication unit 814 is made of a network interface, for example. The drive 815 drives a removable medium 821 such as a magnetic disk, an optical disk, a magneto-optical disk, or a semiconductor memory.

In a computer configured as described above, for example, the CPU 801 loads the program stored in the storage unit 813 to the RAM 803 through the input/output interface 810 and the bus 804, and executes the program, thereby to perform the above-described series of processing. Necessary data and the like in executing various types of processing by the CPU 801 are appropriately stored in the RAM 803.

The program executed by the computer (CPU 801) can be recorded in a removable medium 821 as a package medium and can be applied, for example. In that case, the program can be installed to the storage unit 813 through the input/output interface 810 by mounting the removable medium 821 to the drive 815.

Further, the program can be provided through a wired or wireless transmission medium such as a local area network, the Internet, or digital satellite broadcasting. In that case, the program can be received by the communication unit 814 and installed to the storage unit 813.

In addition, the program can be installed to the ROM 802 or the storage unit 813 in advance.

Note that the program executed by the computer may be a program that performs processing in time series along the order described in the present specification, or may be a program that performs the processing in parallel or at necessary timing when called.

Further, in the present specification, steps that write the program and are recorded in the recording medium include not only processing performed in time series along the described order but also processing that is not necessarily processed in time series but is executed individually or in parallel.

Further, in the present specification, the system means a group of a plurality of configuration elements (devices, modules (components) and the like), and whether all the configuration elements are housed in the same casing is not required. Therefore, both a plurality of devices housed in individual casings and connected through the network, and one device including a plurality of modules housed in one casing are systems.

Further, the configuration described as one device (or one processing unit) may be divided and configured as a plurality of devices (or processing units). Contrary to the above, the configuration described as a plurality of devices (or processing units) may be collectively configured as one device (or one processing unit). Further, a configuration other than the above-described configurations may be added to the configurations of the devices (or processing units). Further, a part of the configuration of a certain device (or processing unit) may be included in the configuration of another device (or another processing unit) as long as the configuration or the operation as the entire system is substantially the same.

As described above, favorable embodiments of the present disclosure have been described in detail with reference to the appended drawings. However, the technical scope of the present disclosure is not limited to the examples. It is apparent that a person having ordinary knowledge in the technical field of the present disclosure can arrive at various changed examples or modification examples within the scope of the technical idea described in claims, and it is understood that, apparently, these changed examples and modification examples belong to the technical scope of the present disclosure.

For example, the present technology can have a configuration of cloud computing that processes one function by a plurality of devices in a shared manner or in cooperation with one another through the network.

Further, the steps described in the above-described flowcharts can be executed by a plurality of devices in a shared manner, in addition to being executed by one device.

Further, when a plurality of pieces of processing is included in one step, the plurality of pieces of processing included in the one step can be executed by a plurality of devices in a shared manner, in addition to being executed by one device.

The image encoding device and the image decoding device according to the embodiments can be applied to various electronic devices such as a transmitter or a receiver in satellite broadcasting, wired broadcasting such as a cable TV, distribution on the Internet, or distribution by cellular communication to terminals, a recording device that records an image in media such as an optical disk, a magnetic disk, or a flash memory, and a reproducing device that reproduces an image from these storage media. Hereinafter, four application examples will be described.

6. Sixth Embodiment

First Application Example: Television Receiver

Figure 57:
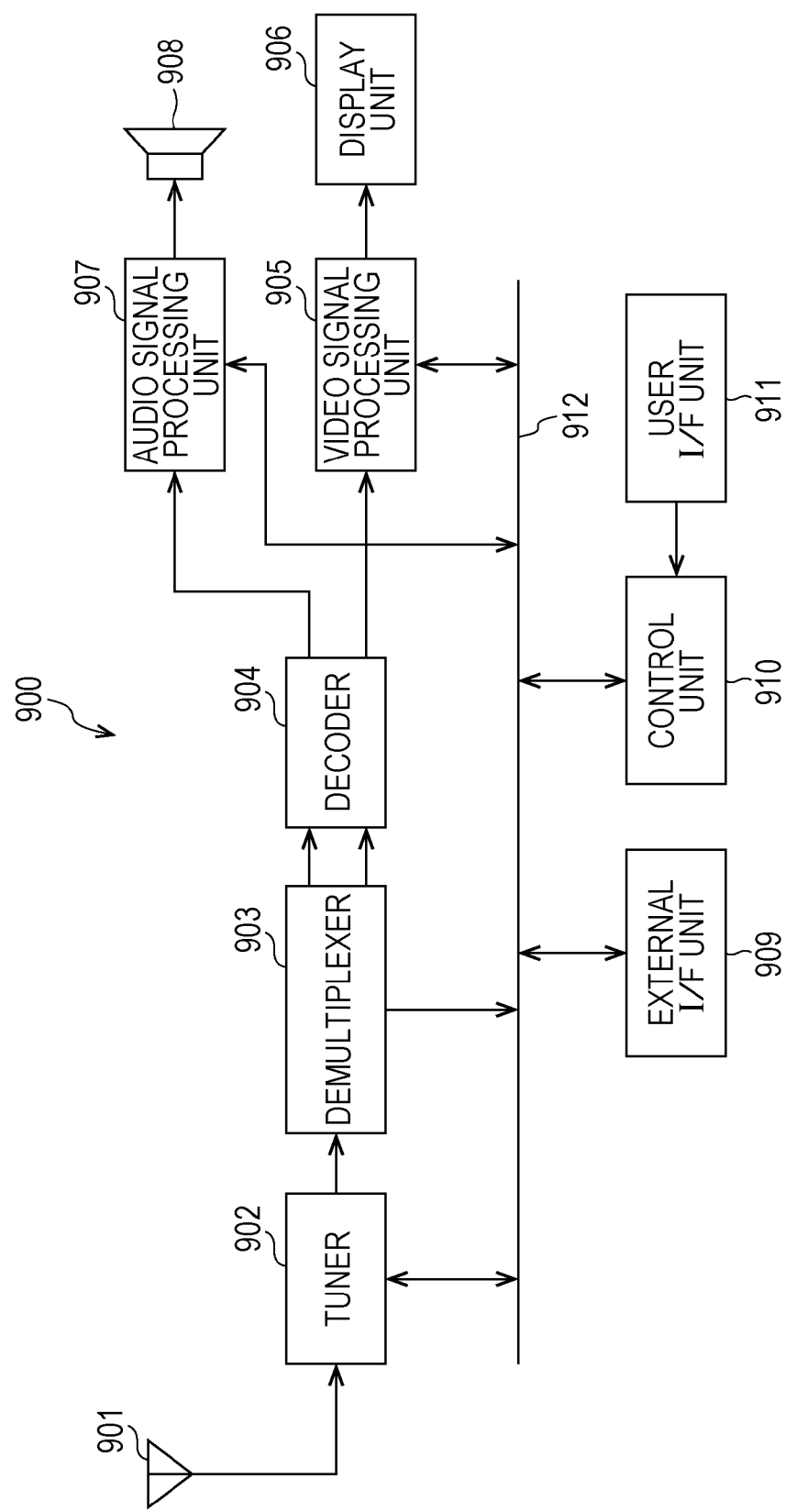
FIG. 57 is a block diagram illustrating an example of a schematic configuration of a television device.

FIG. 57 illustrates an example of a schematic configuration of a television device to which the above-described embodiments are applied. A television device 900 includes an antenna 901, a tuner 902, a demutiplexer 903, a decoder 904, a video signal processing unit 905, a display unit 906, an audio signal processing unit 907, a speaker 908, an external interface (I/F) unit 909, a control unit 910, a user interface (I/F) unit 911, and a bus 912.

The tuner 902 extracts a signal of a desired channel from a broadcasting signal received through the antenna 901, and demodulates the extracted signal. The tuner 902 then outputs an encoded bit stream obtained by the demodulation to the demutiplexer 903. That is, the tuner 902 functions as a transmission unit in the television device 900, which receives an encoded stream that is an encoded image.

The demutiplexer 903 separates a video stream and an audio stream of a TV program to be viewed from the encoded bit stream, and outputs the separated streams to the decoder 904. Further, the demutiplexer 903 extracts auxiliary data such as electronic program guide (EPG) and the like from the encoded bit stream, and supplies the extracted data to the control unit 910. Note that, when the encoded bit stream is scrambled, the demutiplexer 903 may descramble the encoded bit stream.

The decoder 904 decodes the video stream and the audio stream input from the demutiplexer 903. The decoder 904 then outputs video data generated by the decoding processing to the video signal processing unit 905. Further, the decoder 904 outputs audio data generated by the decoding processing to the audio signal processing unit 907.

The video signal processing unit 905 reproduces the video data input from the decoder 904, and displays a video in the display unit 906. Further, the video signal processing unit 905 may display an application screen supplied through the network in the display unit 906. Further, the video signal processing unit 905 may perform additional processing such as noise removal for the video data according to setting. Further, the video signal processing unit 905 may generate an image of a graphical user interface (GUI) such as a menu, a button, or a cursor, and superimpose the generated image on an output image.

The display unit 906 is driven by a drive signal supplied from the video signal processing unit 905, and displays the video or the image on a video screen of a display device (for example, a liquid crystal display, a plasma display, or an organic electro luminescence display (OELD) (organic EL display)).

The audio signal processing unit 907 performs reproduction processing such as D/A conversion and amplification for the audio data input from the decoder 904, and outputs audio from the speaker 908. Further, the audio signal processing unit 907 may perform additional processing such as noise removal for the audio data.

The external interface unit 909 is an interface for connecting the television device 900 and an external device or the network. For example, the video stream or the audio stream received through the external interface unit 909 may be decoded by the decoder 904. That is, the external interface unit 909 also functions as a transmission unit in the television device 900, which receives the encoded stream that is an encoded image.

The control unit 910 includes a processor such as a CPU and memories such as a RAM and a ROM. The memory stores a program executed by the CPU, program data, EPG data, data acquired through the network, and the like. The program stored in the memory is read and executed by the CPU at the time of startup of the television device 900, for example. The CPU controls the operation of the television device 900 according to an operation signal input from the user interface unit 911 by executing the program.

The user interface unit 911 is connected with the control unit 910. The user interface unit 911 includes a button and a switch used by a user to operate the television device 900, and a receiving unit of a remote control signal. The user interface unit 911 detects an operation by the user through the configuration elements to generate an operation signal, and outputs the generated operation signal to the control unit 910.

The bus 912 mutually connects the tuner 902, the demultiplexer 903, the decoder 904, the video signal processing unit 905, the audio signal processing unit 907, the external interface unit 909, and the control unit 910.

In the television device 900 configured as described above, the decoder 904 has a function of the image decoding device 200 according to the above-described embodiment. That is, the decoder 904 can correctly decode encoded data that is RAW data encoded by the method described in the first or second embodiment, by the method described in the first or third embodiment. Therefore, the television device 900 can more easily improve the encoding efficiency in the encoding of the RAW data.

Second Application Example: Mobile Phone Device

Figure 58:
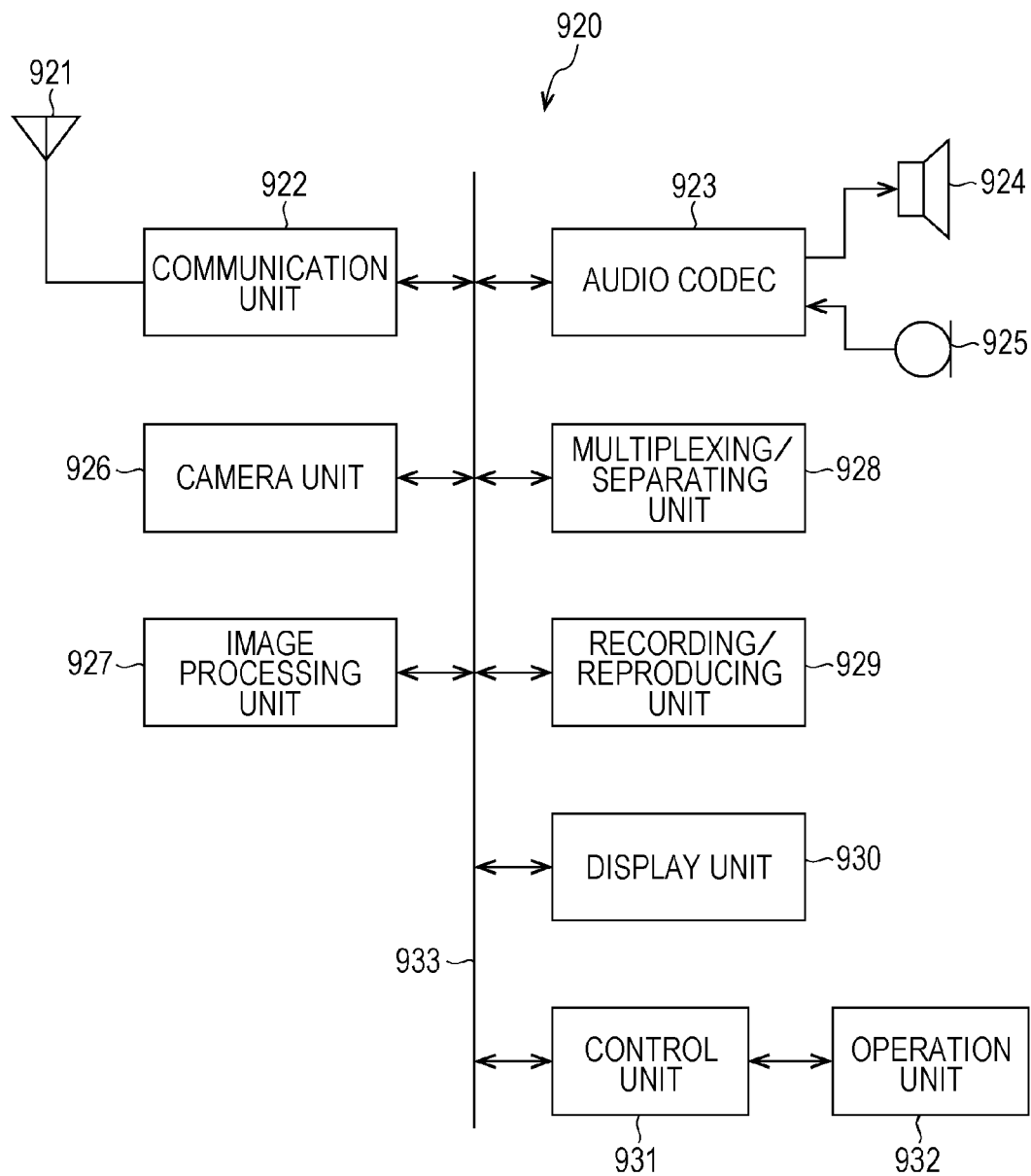
FIG. 58 is a block diagram illustrating an example of a schematic configuration of a mobile phone device.

FIG. 58 illustrates an example of a schematic configuration of a mobile phone device to which the above-described embodiments are applied. A mobile phone device 920 includes an antenna 921, a communication unit 922, an audio codec 923, a speaker 924, a microphone 925, a camera unit 926, an image processing unit 927, a multiplexing/separating unit 928, a recording/reproducing unit 929, a display unit 930, a control unit 931, an operation unit 932, and a bus 933.

The antenna 921 is connected to the communication unit 922. The speaker 924 and the microphone 925 are connected to the audio codec 923. The operation unit 932 is connected to the control unit 931. The bus 933 mutually connects the communication unit 922, the audio codec 923, the camera unit 926, the image processing unit 927, the multiplexing/separating unit 928, the recording/reproducing unit 929, the display unit 930, and the control unit 931.

The mobile phone device 920 performs operations such as transmission/reception of an audio signal, transmission/reception of an electronic mail or image data, imaging of an image, and recording of data, in various operation modes including a voice call mode, a data communication mode, a capturing mode, and a TV phone mode.

In the voice call mode, an analog audio signal generated by the microphone 925 is supplied to the audio codec 923. The audio codec 923 converts the analog audio signal into audio data, and performs A/D conversion for the converted audio data and compresses the audio data. The audio codec 923 then outputs the compressed audio data to the communication unit 922. The communication unit 922 encodes and modulates the audio data to generate a transmission signal. The communication unit 922 then transmits the generated transmission signal to abase station (not illustrated) through the antenna 921. Further, the communication unit 922 amplifies a wireless signal received through the antenna 921 and performs frequency conversion to acquire a reception signal. The communication unit 922 then demodulates and decodes the reception signal to generate audio data, and outputs the generated audio data to the audio codec 923. The audio codec 923 expands the audio data and performs D/A conversion to generate an analog audio signal. The audio codec 923 then supplies the generated audio signal to the speaker 924 to output audio.

Further, in the data communication mode, for example, the control unit 931 generates text data that configures the electronic mail according to an operation by the user through the operation unit 932. Further, the control unit 931 displays texts in the display unit 930. Further, the control unit 931 generates electronic main data according to a transmission instruction from the user through the operation unit 932, and outputs the generated electronic mail data to the communication unit 922. The communication unit 922 encodes and modulates the electronic mail data to generate a transmission signal. The communication unit 922 then transmits the generated transmission signal to the base station (not illustrated) through the antenna 921. Further, the communication unit 922 amplifies a wireless signal received through the antenna 921 and performs frequency conversion to acquire a reception signal. The communication unit 922 then demodulates and decodes the reception signal to restore the electronic mail data, and outputs the restored electronic mail data to the control unit 931. The control unit 931 displays contents of the electronic mail in the display unit 930, supplies the electronic mail data to the recording/reproducing unit 929, and writes the electronic mail data in a storage medium.

The recording/reproducing unit 929 includes a readable/writable arbitrary storage medium. For example, the storage medium may be a built-in type storage medium such as a RAM or a flash memory, or may be an externally-mounted type storage medium such as a hard disk, a magnetic disk, a magneto-optical disk, an optical disk, a universal serial bus (USB) memory, or a memory card.

Further, in the capturing mode, for example, the camera unit 926 images an object to generate image data, and outputs the generated image data to the image processing unit 927. The image processing unit 927 encodes the image data input from the camera unit 926, supplies an encoded stream to the recording/reproducing unit 929, and writes the encoded stream in the storage medium.

Further, in the image display mode, the recording/reproducing unit 929 reads the encoded stream recorded in the storage medium, and outputs the read encoded stream to the image processing unit 927. The image processing unit 927 decodes the encoded stream input from the recording/reproducing unit 929, supplies image data to the display unit 930, and displays an image thereof.

Further, in the TV phone mode, for example, the multiplexing/separating unit 928 multiplexes the video stream encoded by the image processing unit 927, and the audio stream input from the audio codec 923, and outputs the multiplexed stream to the communication unit 922. The communication unit 922 encodes and modulates the stream to generate a transmission signal. The communication unit 922 then transmits the generated transmission signal to the base station (not illustrated) through the antenna 921. Further, the communication unit 922 amplifies a wireless signal received through the antenna 921 and performs frequency conversion to acquire a reception signal. The encoded bit stream can be included in these transmission signal and reception signal. The communication unit 922 then demodulates and decodes the reception signal to restore a stream, and outputs the restored stream to the multiplexing/separating unit 928. The multiplexing/separating unit 928 separates the video stream and the audio stream from the input stream, and outputs the video stream to the image processing unit 927 and outputs the audio stream to the audio codec 923. The image processing unit 927 decodes the video stream to generate video data. The video data is supplied to the display unit 930, and a series of images is displayed by the display unit 930. The audio codec 923 expands the audio stream and performs D/A conversion to generate an analog audio signal. The audio codec 923 then supplies the generated audio signal to the speaker 924 to output audio.

In the mobile phone device 920 as configured as described above, the image processing unit 927 has functions of the image encoding device 100 and the image decoding device 200 according to the above-described embodiments. That is, the image processing unit 927 can encode RAW data by the method described in the first or second embodiment, and can correctly decode encoded data obtained by the encoding by the method described in the first or third embodiment. Therefore, the mobile phone device 920 can more easily improve the encoding efficiency in the encoding of the RAW data.

Third Application Example: Recording/Reproducing Device

Figure 59:
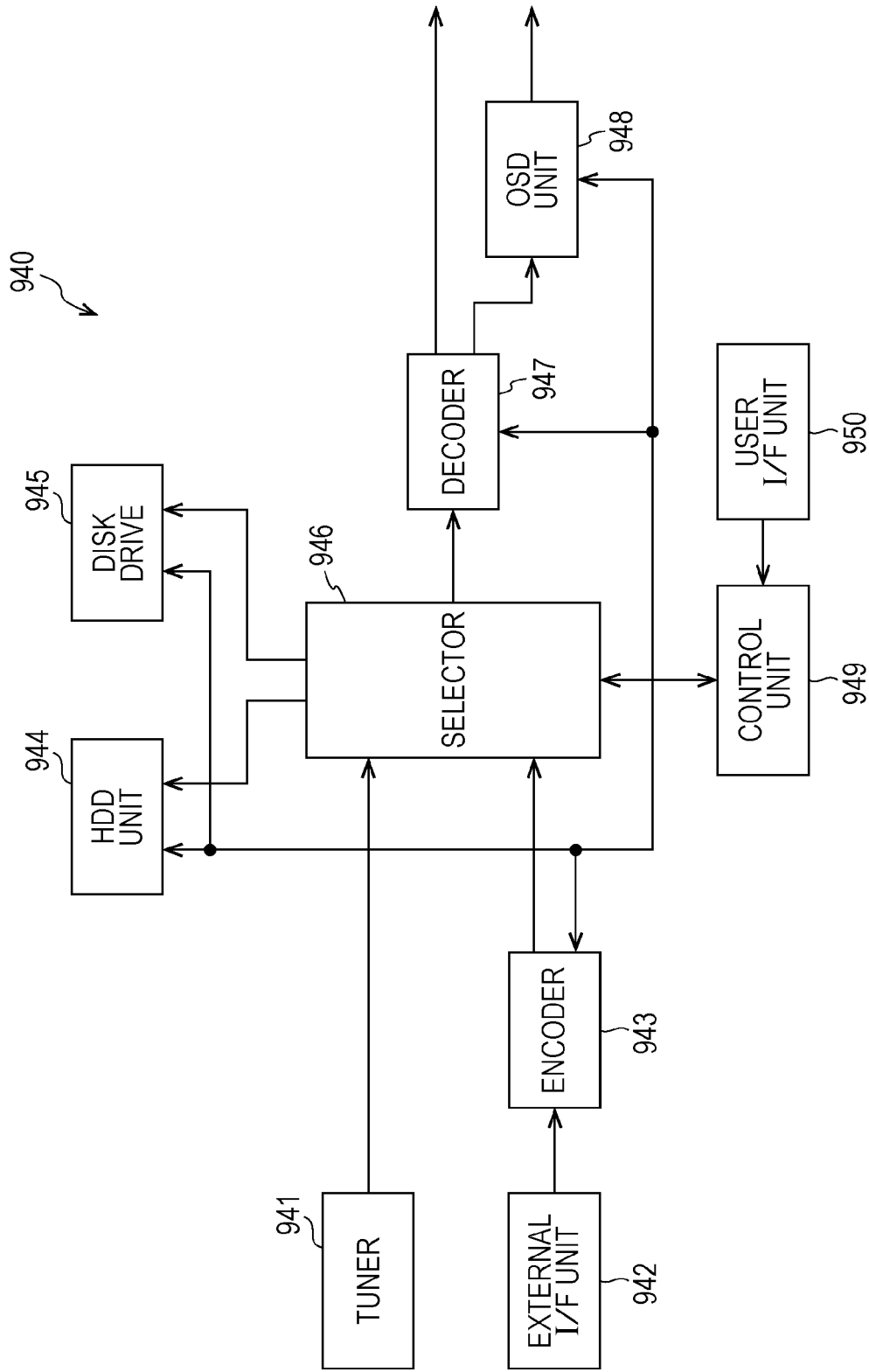
FIG. 59 is a block diagram illustrating an example of a schematic configuration of a recording/reproducing device.

FIG. 59 illustrates an example of a schematic configuration of a recording/reproducing device to which the above-described embodiments are applied. The recording/reproducing device 940 encodes audio data and video data of a broadcast program, and records the encoded data in a recording medium, for example. Further, the recording/reproducing device 940 may encode the audio data and the video data acquired from another device, and records the encoded data in the recording medium, for example. Further, the recording/reproducing device 940 reproduces the data recorded in the recording medium according to an instruction of a user on a monitor and a speaker, for example. At this time, the recording/reproducing device 940 decodes the audio data and the video data.

The recording/reproducing device 940 includes a tuner 941, an external interface (I/F) unit 942, an encoder 943, a hard disk drive (HDD) 944, a disk drive 945, a selector 946, a decoder 947, an on-screen display (OSD) 948, a control unit 949, and a user interface (I/F) unit 950.

The tuner 941 extracts a signal of a desired channel from a broadcast signal received through an antenna (not illustrated), and demodulates the extracted signal. The tuner 941 then outputs an encoded bit stream obtained by the demodulation to the selector 946. That is, the tuner 941 has a role as a transmission unit in the recording/reproducing device 940.

The external interface unit 942 is an interface for connecting the recording/reproducing device 940 and an external device or a network. The external interface unit 942 may be, for example, an institute of electrical and electronic engineers (IEEE) 1394 interface, a network interface, a USB interface, or a flash memory interface. For example, the video data and the audio data received through the external interface unit 942 are input to the encoder 943. That is, the external interface unit 942 has a role as a transmission unit in the recording/reproducing device 940.

When the video data and the audio data input from the external interface unit 942 have not been yet encoded, the encoder 943 encodes the video data and the audio data. The encoder 943 then outputs an encoded bit stream to the selector 946.

The HDD 944 records the encoded bit stream that is compressed content data of video and audio, various programs, and other data in an internal hard disk. Further, the HDD 944 reads the data from the hard disk at the time of reproduction of the video and the audio.

The disk drive 945 records and reads the data to amounted recording medium. The recording medium mounted in the disk drive 945 is, for example, a digital versatile disc (DVD) disk (a DVD-video, a DVD-random access memory (DVD-RAM), a DVD-recordable (DVD-R), a DVD-rewritable (DVD-RW), a DVD+recordable (DVD+R), DVD+rewritable (a DVD+RW) or the like), a Blu-ray (registered trademark) disk, or the like.

The selector 946 selects the encoded bit stream input from the tuner 941 or the encoder 943 at the time of recording the video and the audio, and outputs the selected encoded bit stream to the HDD 944 or the disk drive 945. Further, the selector 946 outputs the encoded bit stream input from the HDD 944 or the disk drive 945 to the decoder 947 at the time of reproduction of the video and the audio.

The decoder 947 decodes the encoded bit stream to generate the video data and the audio data. The decoder 947 then outputs the generated video data to the OSD 948. Further, the decoder 947 outputs the generated audio data to an external speaker.

The OSD 948 reproduces the video data input from the decoder 947, and displays video. Further, the OSD 948 may superimpose an image of a GUI such as a menu, a button, or a cursor on the video to be displayed.

The control unit 949 includes a processor such as a CPU and memories such as a RAM and a ROM. The memory stores a program executed by the CPU, program data, and the like. The program stored in the memory is read and executed by the CPU at the time of startup of the recording/reproducing device 940. The CPU controls the operation of the recording/reproducing device 940 according to an operation signal input from the user interface unit 950, for example, by executing the program.

The user interface unit 950 is connected with the control unit 949. The user interface unit 950 includes, for example, a button and a switch used by the user to operate the recording/reproducing device 940, a reception unit of a remote control signal, and the like. The user interface unit 950 detects the operation by the user through these configuration elements to generate an operation signal, and outputs the generated operation signal to the control unit 949.

In the recording/reproducing device 940 configured as described above, the encoder 943 has a function of the image encoding device 100 according to the above-described embodiment. That is, the encoder 943 can encode RAW data by the method described in the first or second embodiment. Further, the decoder 947 has a function of the image decoding device 200 according to the above-described embodiment. That is, the decoder 947 can correctly decode the encoded data that is the RAW data encoded by the method described in the first or second embodiment, by the method described in the first or third embodiment. Accordingly, the recording/reproducing device 940 can more easily improve the encoding efficiency in the encoding of the RAW data.

Fourth Application Example: Imaging Device

Figure 60:
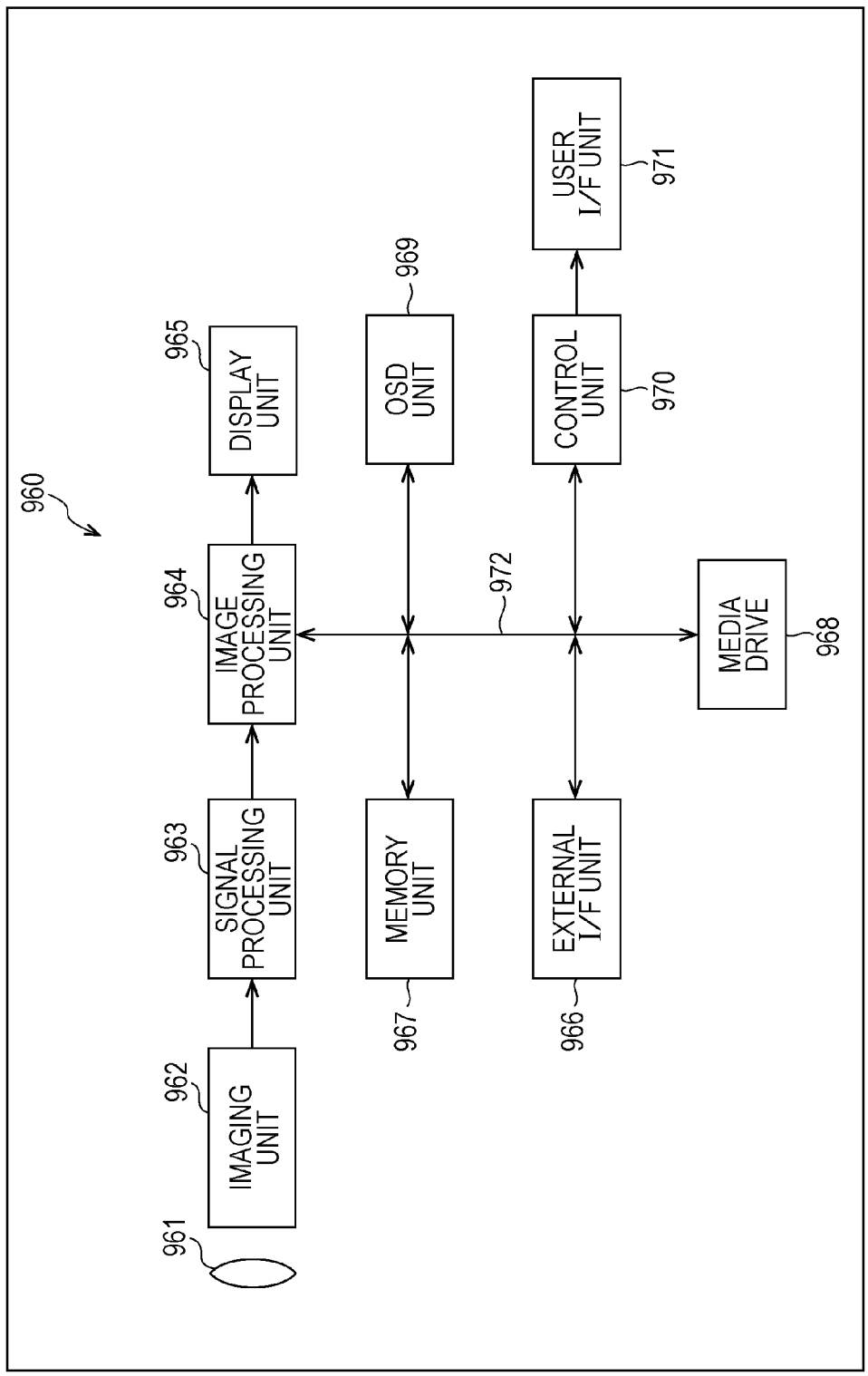
FIG. 60 is a block diagram illustrating an example of a schematic configuration of an imaging device.

FIG. 60 illustrates an example of a schematic configuration of an imaging device to which the above-described embodiments are applied. An imaging device 960 images an object, generates an image, encodes image data, and records the encoded image data in a recording medium.

The imaging device 960 includes an optical block 961, an imaging unit 962, a signal processing unit 963, an image processing unit 964, a display unit 965, an external interface (I/F) unit 966, a memory unit 967, a media drive 968, an OSD 969, a control unit 970, a user interface (I/F) unit 971, and a bus 972.

The optical block 961 is connected to the imaging unit 962. The imaging unit 962 is connected with the signal processing unit 963. The display unit 965 is connected with the image processing unit 964. The user interface unit 971 is connected with the control unit 970. The bus 972 mutually connects the image processing unit 964, the external interface unit 966, the memory unit 967, the media drive 968, the OSD 969, and the control unit 970.

The optical block 961 includes a focus lens, a diaphragm mechanism, and the like. The optical block 961 focuses an optical image of an object on an imaging surface of the imaging unit 962. The imaging unit 962 includes an image sensor such as a charge coupled device (CCD) or a complementary metal oxide semiconductor (CMOS), and photo-electrically converts the optical image focused on the imaging surface into an image signal as an electrical signal. The imaging unit 962 then outputs the image signal to the signal processing unit 963.

The signal processing unit 963 performs various types of camera signal processing such as knee correction, gamma correction, and color correction for the image signal input from the imaging unit 962. The signal processing unit 963 outputs the image data subjected to the camera signal processing to the image processing unit 964.

The image processing unit 964 encodes the image data input from the signal processing unit 963 to generate encoded data. The image processing unit 964 then outputs the generated encoded data to the external interface unit 966 or the media drive 968. Further, the image processing unit 964 decodes the encoded data input from the external interface unit 966 or the media drive 968 to generate image data. The image processing unit 964 then outputs the generated image data to the display unit 965. Further, the image processing unit 964 may output the image data input from the signal processing unit 963 to the display unit 965 and display the image in the display unit 965. Further, the image processing unit 964 may superimpose data for display acquired from the OSD 969 on an image to be output to the display unit 965.

The OSD 969 generates, for example, an image of a GUI such as a menu, a button, or a cursor, and outputs the generated image to the image processing unit 964.

The external interface unit 966 is configured as a USB input/output terminal, for example. The external interface unit 966 connects the imaging device 960 and a printer at the time of printing an image, for example. Further, a drive is connected to the external interface unit 966, as needed. A removable medium such as a magnetic disk or an optical disk is mounted to the drive, and a program read from the removable medium can be installed to the imaging device 960. Further, the external interface unit 966 may be configured as a network interface connected to a network such as a LAN or the Internet. That is, the external interface unit 966 has a role as a transmission unit in the imaging device 960.

The recording medium mounted to the media drive 968 may be a readable/writable arbitrary removable medium such as a magnetic disk, a magneto-optical disk, an optical disk, or a semiconductor memory. Further, the recording medium may be mounted to the media drive 968 in a fixed manner to configure a non-transportable storage unit like a built-in type hard disk drive or a solid state device (SSD).

The control unit 970 includes a processor such as a CPU and memories such as a RAM and a ROM. The memory stores a program executed by the CPU, program data, and the like. The program stored in the memory is read and executed by the CPU at the time of startup of the imaging device 960, for example. The CPU controls the operation of the imaging device 960 according to an operation signal input from the user interface unit 971, for example, by executing the program.

The user interface unit 971 is connected with the control unit 970. The user interface unit 971 includes, for example, a button and a switch used by the user to operate the imaging device 960. The user interface unit 971 detects an operation by the user through the configuration elements to generate an operation signal, and outputs the generated operation signal to the control unit 970.

In the imaging device 960 configured as described above, the image processing unit 964 has functions of the image encoding device 100 and the image decoding device 200 according to the above-described embodiments. That is, the image processing unit 964 can encode RAW data by the method described in the first or second embodiment, and can correctly decode the encoded data obtained by the encoding, by the method described in the first or third embodiment. Therefore, the imaging device 960 can more easily improve the encoding efficiency in the encoding of the RAW data.

Note that the present technology can be applied to HTTP streaming such as MPEG DASH, which selects and uses appropriate encoded data from a plurality of encoded data having mutually different resolutions prepared in advance in units of segment. That is, among such a plurality of encoded data, information related to encoding and decoding can be shared.

7. Seventh Embodiment: Other Implementation Example

Examples of devices and systems to which the present technology is applied have been described. However, the present technology is not limited to the examples, and can be implemented as any configuration to be mounted in such devices or devices that configure such systems, for example, a processor as system large scale integration (LSI), a module that uses a plurality of processors, a unit that uses a plurality of modules, a set obtained by further adding other functions to the unit (that is, a configuration of a part of a device).

<Video Set>

Figure 61:
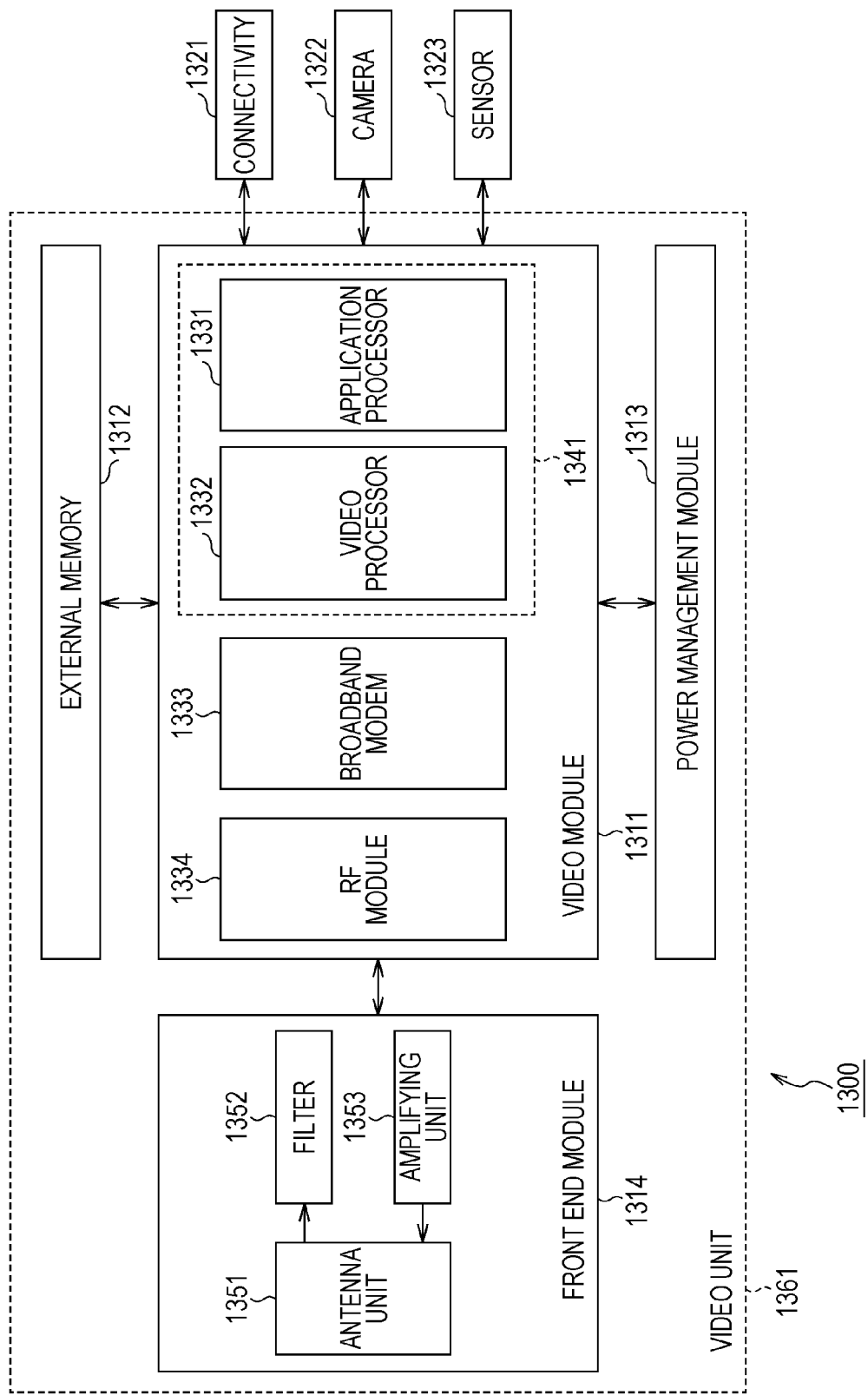
FIG. 61 is a block diagram illustrating an example of a schematic configuration of a video set.

An example of when the present technology is implemented as a set will be described with reference to FIG. 61. FIG. 61 illustrates an example of a schematic configuration of a video set to which the present technology is applied.

In recent years, electronic devices have been multi-functionalized. When a part of the configuration thereof is implemented on sale or on offer in the development or manufacturing thereof, not only a configuration having one function being implemented but also a plurality of configurations having related functions being combined and the plurality of functions being implemented as one set have been common.

A video set 1300 illustrated in FIG. 61 is a multi-functionalized configuration, and is a combination of a device having functions related to encoding and decoding of an image (the functions may be related to one of or both of the encoding and the decoding) with a device having another function related to the functions.

As illustrated in FIG. 61, the video set 1300 includes a module group including a video module 1311, an external memory 1312, a power management module 1313, a front end module 1314, and the like, and a device having related functions such as a connectivity 1321, a camera 1322, and a sensor 1323.

The module is a component having coherent functions where some mutually-related component functions are integrated. A specific physical configuration is arbitrary. However, for example, a plurality of processors having respective functions, electronic circuit elements such as a resistance and a capacitor, and other devices being arranged on a wiring board and the like being integrated can be considered. Further, a new module being formed of a combination of a module and another module, a processor, and the like can be considered.

In the example of FIG. 61, the video module 1311 is a combination of configurations having functions related to image processing, and includes an application processor, a video processor, a broadband modem 1333, and an RF module 1334.

The processor is an integration of the configurations having predetermined functions on a semiconductor chip by system on a chip (SoC), and may be called system large scale integration (LSI) or the like. The configurations having the predetermined functions may be a logic circuit (hardware configuration), or may be a CPU, a ROM, a RAM, and the like and a program (software configuration) executed using the aforementioned elements, or may be a combination thereof. For example, the processor includes the logic circuit, the CPU, the ROM, the RAM, and the like, and a part of the functions may be realized by the logic circuit (hardware configuration), and other functions may be realized by the program (software configuration) executed by the CPU.

The application processor 1331 of FIG. 61 is a processor that executes an application related to image processing. The application executed in the application processor 1331 not only performs calculation processing but also can control the configurations inside and outside the video module 1311 such as a video processor 1332 as needed, in order to realize the predetermined functions.

The video processor 1332 is a processor having functions related to encoding/decoding of an image (the functions are related to one or both of the encoding and the decoding).

The broadband modem 1333 digitally modulates data (digital signal) to be transmitted by wired or wireless (or both) broadband communication, which is performed through a broadband line such as the Internet or a public telephone line network, to convert the data into an analog signal, and demodulates the analog signal received by the broadband communication to convert the analog signal into data (digital signal). The broadband modem 1333 processes arbitrary information such as image data processed by the video processor 1332, a stream that is encoded image data, an application program, and setting data.

The RF module 1334 is a module that performs frequency conversion, modulation/demodulation, amplification, filter processing, and the like for a radio frequency (RF) signal transmitted/received through an antenna. For example, the RF module 1334 performs the frequency conversion and the like for a base band signal generated in the broadband modem 1333 to generate an RF signal. Further, for example, the RF module 1334 performs the frequency conversion and the like for the RF signal received through the front end module 1314 to generate a base band signal.

Note that, as illustrated by the dotted line 1341 in FIG. 61, the application processor 1331 and the video processor 1332 are integrated, and configured as one processor.

The external memory 1312 is a module including a storage device used by the video module 1311, and provided outside the video module 1311. The storage device of the external memory 1312 may be realized by any physical configuration. However, typically, the storage device is often used to store high-capacity data like image data in units of frame. Therefore, for example, the storage device is desirably realized by a relatively-cheap and high-capacity semiconductor memory like a dynamic random access memory (DRAM).

The power management module 1313 manages and controls power supply to the video module 1311 (the configurations in the video module 1311).

The front end module 1314 is a module that provides a front end function (an antenna-side transmission/reception-end circuit) to the RF module 1334. As illustrated in FIG. 61, the front end module 1314 includes, for example, an antenna unit 1351, a filter 1352, and an amplifying unit 1353.

The antenna unit 1351 includes an antenna that transmits/receives a wireless signal and its peripheral configurations. The antenna unit 1351 transmits a signal supplied from the amplifying unit 1353 as a wireless signal, and supplies the received wireless signal to the filter 1352 as an electrical signal (RF signal). The filter 1352 performs filter processing and the like for the RF signal received through the antenna unit 1351, and supplies the RF signal subjected to the processing to the RF module 1334. The amplifying unit 1353 amplifies the RF signal supplied from the RF module 1334, and supplies the amplified RF signal to the antenna unit 1351.

The connectivity 1321 is a module having a function related to connection with an outside. A physical configuration of the connectivity 1321 is arbitrary. For example, the connectivity 1321 includes a configuration having a communication function other than the communication standard supported by the broadband modem 1333, an external input/output terminal, and the like.

For example, the connectivity 1321 may include a module having a communication function complying with a wireless communication standard such as Bluetooth (registered trademark), IEEE 802.11 (for example, Wireless Fidelity (Wi-Fi, registered trademark)), Near Field Communication (NFC), or IrDA (InfraRed Data Association), or may include an antenna that transmits/receives a signal and the like that comply with the standard. Further, for example, the connectivity 1321 may include a module having a communication function complying with a wired communication standard such as Universal Serial Bus (USB) or High-Definition Multimedia Interface (HDMI, registered trademark), or a terminal complying with the standard. Further, for example, the connectivity 1321 may have another data (signal) transmission function such as an analog input/output terminal.

Note that the connectivity 1321 may include a device of a transmission destination of the data (signal). For example, the connectivity 1321 may include a drive (including not only a drive of a removable medium but also a hard disk, a solid state drive (SSD), a network attached storage (NAS), and the like) which reads/writes data from/to a recording medium such as a magnetic disk, an optical disk, an magnetoptical disk, or a semiconductor memory. Further, the connectivity 1321 may include an output device (such as a monitor or a speaker) of an image or audio.

The camera 1322 is a module having a function to image an object and obtain image data of the object. The image data obtained by the imaging by the camera 1322 is supplied to the video processor 1332, for example, and is encoded.

The sensor 1323 is a module having an arbitrary sensor function such as an audio sensor, an ultrasonic sensor, an optical sensor, an illuminance sensor, an infrared sensor, an image sensor, a rotation sensor, an angle sensor, an angular speed sensor, a speed sensor, an acceleration sensor, an inclination sensor, a magnetic identification sensor, an impact sensor, a temperature sensor. Data detected by the sensor 1323 is, for example, supplied to the application processor 1331 and operated by the applications and the like.

The configuration described above as the module may be realized as a processor. Contrary to that, the configuration described as the processor may be realized as a module.

In the video set 1300 having the above configuration, the present technology can be applied to the video processor 1332 as described below. Therefore, the video set 1300 can be implemented as a set to which the present technology is applied.

<Configuration Example of Video Processor>

Figure 62:
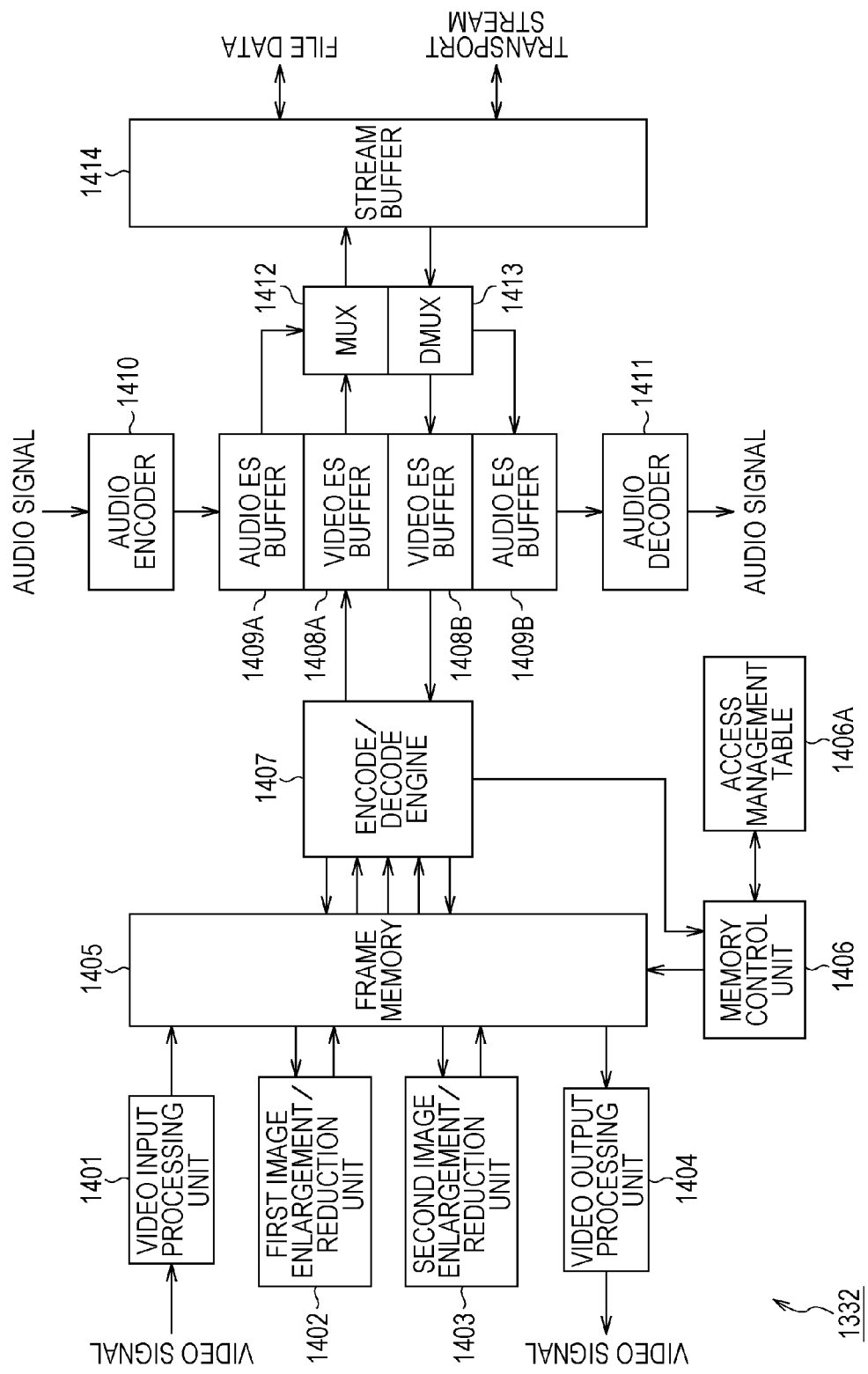
FIG. 62 is a block diagram illustrating an example of a schematic configuration of a video processor.

FIG. 62 illustrates an example of a schematic configuration of a video processor 1332 (FIG. 61) to which the present technology is applied.

In the example of FIG. 62, the video processor 1332 has a function to encode a video signal and an audio signal in a predetermined system upon receipt of inputs of these signals, and a function to decode the encoded video data and audio data, and to reproduce and output the video signal and the audio signal.

As illustrated in FIG. 62, the video processor 1332 includes a video input processing unit 1401, a first image enlargement/reduction unit 1402, a second image enlargement/reduction unit 1403, a video output processing unit 1404, a frame memory 1405, and a memory control unit 1406. Further, the video processor 1332 includes an encode/decode engine 1407, video ES (elementary stream) buffers 1408A and 1408B, and audio ES buffers 1409A and 1409B. Further, the video processor 1332 includes an audio encoder 1410, an audio decoder 1411, a multiplexer (MUX) 1412, a demultiplexer (DMUX) 1413, and a stream buffer 1414.

The video input processing unit 1401 acquires the video signal input from the connectivity 1321 (FIG. 61) or the like, and converts the video signal into digital image data, for example. The first image enlargement/reduction unit 1402 performs format conversion, enlargement/reduction processing of an image, and the like, for the image data. The second image enlargement/reduction unit 1403 performs, for the image data, enlargement/reduction processing of an image according to a format in an output destination through the video output processing unit 1404, and format conversion and enlargement/reduction processing of an image similar to those of the first image enlargement/reduction unit 1402. The video output processing unit 1404 performs, for the image data, format conversion, conversion into an analog signal, and the like, and outputs the analog signal to the connectivity 1321, and the like as a reproduced video signal.

The frame memory 1405 is a memory for image data commonly used by the video input processing unit 1401, the first image enlargement/reduction unit 1402, the second image enlargement/reduction unit 1403, the video output processing unit 1404, and the encode/decode engine 1407. The frame memory 1405 is realized as a semiconductor memory such as a DRAM.

The memory control unit 1406 controls an access of writing/reading to/from the frame memory 1405 according to an access schedule to the frame memory 1405 written in an access management table 1406A, upon receipt of a synchronization signal from the encode/decode engine 1407. The access management table 1406A is updated by the memory control unit 1406 according to processing executed in the encode/decode engine 1407, the first image enlargement/reduction unit 1402, the second image enlargement/reduction unit 1403, and the like.

The encode/decode engine 1407 performs encoding processing of the image data, and decoding processing of a video stream that is encoded image data. For example, the encode/decode engine 1407 encodes the image data read from the frame memory 1405, and sequentially writes the image data in the video ES buffer 1408A as a video stream. Further, for example, the encode/decode engine 1407 sequentially reads the video stream from the video ES buffer 1408B, and sequentially writes the video stream in the frame memory 1405 as image data. The encode/decode engine 1407 uses the frame memory 1405 as a work area in the encoding and decoding. Further, the encode/decode engine 1407 outputs a synchronization signal to the memory control unit 1406 at timing when starting processing for each macroblock.

The video ES buffer 1408A buffers the video stream generated by the encode/decode engine 1407, and supplies the video steam to the multiplexer (MUX) 1412. The video ES buffer 1408B buffers the video stream supplied from the demultiplexer (DMUX) 1413, and supplies the video stream to the encode/decode engine 1407.

The audio ES buffer 1409A buffers the audio stream generated by the audio encoder 1410, and supplies the audio stream to the multiplexer (MUX) 1412. The audio ES buffer 1409B buffers the audio stream supplied from the demultiplexer (DMUX) 1413, and supplies the audio stream to the audio decoder 1411.

The audio encoder 1410, for example, digitally converts the audio signal input from the connectivity 1321 or the like, and encodes the audio signal in a predetermined system such as an MPEG audio system or an audio code number 3 (AC3) system. The audio encoder 1410 sequentially writes the audio stream that is an encoded audio signal in the audio ES buffer 1409A. The audio decoder 1411 decodes the audio stream supplied from the audio ES buffer 1409B, converts the audio stream into an analog signal, and supplies the analog signal to the connectivity 1321 and the like as a reproduced audio signal.

The multiplexer (MUX) 1412 multiplexes the video stream and the audio stream. A multiplexing method (that is, a format of a bit stream generated by the multiplexing) is arbitrary. Further, in the multiplexing, the multiplexer (MUX) 1412 can add predetermined header information and the like to the bit stream. That is, the multiplexer (MUX) 1412 can convert the format of the stream by the multiplexing. For example, the multiplexer (MUX) 1412 multiplexes and converts the video stream and the audio stream into a transport stream that is a bit stream in a format for transfer. Further, for example, the multiplexer (MUX) 1412 multiplexes and converts the video stream and the audio stream into data (file data) in a file format for recording.

The demultiplexer (DMUX) 1413 demultiplexes the bit stream that is the multiplexed video stream and audio stream, by a method corresponding to the multiplexing by the multiplexer (MUX) 1412. That is, the demultiplexer (DMUX) 1413 extracts the video stream and the audio stream from the bit stream read from the stream buffer 1414 (separates the bit stream into the video stream and the audio stream). That is, the demultiplexer (DMUX) 1413 can convert the format of the stream by the demultiplexing (inverse transform to the conversion by the multiplexer (MUX) 1412). For example, the demultiplexer (DMUX) 1413 acquires the transport stream supplied from the connectivity 1321, the broadband modem 1333, or the like through the stream buffer 1414, and can convert the transport stream into the video stream and the audio stream by demultiplexing the transport stream. Further, for example, the demultiplexer (DMUX) 1413 acquires the file data read from various recording media by, for example, the connectivity 1321 through the stream buffer 1414, and can convert the file data into the video stream and the audio stream by demultiplexing the file data.

The stream buffer 1414 buffers the bit stream. For example, the stream buffer 1414 buffers the transport stream supplied from the multiplexer (MUX) 1412, and supplies the transport stream to the connectivity 1321, the broadband modem 1333, and the like at predetermined timing or based on a request from an outside or the like.

Further, for example, the stream buffer 1414 buffers the file data supplied from the multiplexer (MUX) 1412, supplies the file data to the connectivity 1321, and the like at predetermined timing or based on a request from an outside or the like, and records the file data in various recording media.

Further, the stream buffer 1414 buffers the transport stream acquired through the connectivity 1321, the broadband modem 1333, or the like, and supplies the transport stream to the demultiplexer (DMUX) 1413 at predetermined timing or based on a request from an outside or the like.

Further, the stream buffer 1414 buffers the file data read from the various recording media in the connectivity 1321 or the like, and supplies the file data to the demultiplexer (DMUX) 1413 at predetermined timing or based on a request from an outside or the like.

Next, an example of an operation of the video processor 1332 having such a configuration will be described. For example, a video signal input from the connectivity 1321 or the like to the video processor 1332 is converted into digital image data in a predetermined system such as a 4:2:2 Y/Cb/Cr system in the video input processing unit 1401, and is sequentially written to the frame memory 1405. The digital image data is read by the first image enlargement/reduction unit 1402 or the second image enlargement/reduction unit 1403, format conversion of the 4:2:0 Y/Cb/Cr system into a predetermined system and enlargement/reduction processing are performed, and the data is written to the frame memory 1405 again. The image data is encoded by the encode/decode engine 1407, and is written to the video ES buffer 1408A as a video stream.

Further, an audio signal input from the connectivity 1321 or the like to the video processor 1332 is encoded by the audio encoder 1410, and is written to the audio ES buffer 1409A as an audio stream.

The video stream in the video ES buffer 1408A and the audio stream in the audio ES buffer 1409A are read and multiplexed by the multiplexer (MUX) 1412, and are converted into a transport stream, file data, or the like. The transport stream generated by the multiplexer (MUX) 1412 is buffered in the stream buffer 1414, and is then output to an external network through the connectivity 1321, the broadband modem 1333, and the like. Further, the file data generated by the multiplexer (MUX) 1412 is buffered in the stream buffer 1414, is output to the connectivity 1321, and the like, and is recorded in various recording media.

Further, the transport stream input to the video processor 1332 from an external network through the connectivity 1321, the broadband modem 1333, and the like is buffered in the stream buffer 1414, and is then demultiplexed by the demultiplexer (DMUX) 1413. Further, for example, the file data read from the various recording media in the connectivity 1321 and the like and is input to the video processor 1332 is buffered in the stream buffer 1414, and is then demultiplexed by the demultiplexer (DMUX) 1413. That is, the transport stream or the file data input to the video processor 1332 is separated into the video stream and the audio stream by the demultiplexer (DMUX) 1413.

The audio stream is supplied to the audio decoder 1411 through the audio ES buffer 1409B and is decoded, so that the audio signal is reproduced. Further, the video stream is written to the video ES buffer 1408B, is then sequentially read and decoded by the encode/decode engine 1407, and is written to the frame memory 1405. The decoded image data is subjected to enlargement/reduction processing by the second image enlargement/reduction unit 1403, ad is written to the frame memory 1405. Then, the decoded image data is read by the video output processing unit 1404, is format-converted into a predetermined system such as a 4:2:2 Y/Cb/Cr system, and is further converted into an analog signal, and the video signal is reproduced and output.

When the present technology is applied to the video processor 1332 configured as described above, the present technology according to the embodiments may just be applied to the encode/decode engine 1407. That is, for example, the encode/decode engine 1407 may just have the functions of the image encoding device 100 and the image decoding device 200 according to the embodiments. In doing so, the video processor 1332 can have similar effects to the above-described effects by reference to FIGS. 1 to 52.

Note that, in the encode/decode engine 1407, the present technology (that is, the functions of the image encoding device and the image decoding device according to the embodiments) may be realized by hardware such as a logic circuit, may be realized by software such as an incorporated program, or may be realized by both the software and the hardware.

<Another Configuration Example of Video Processor>

Figure 63:
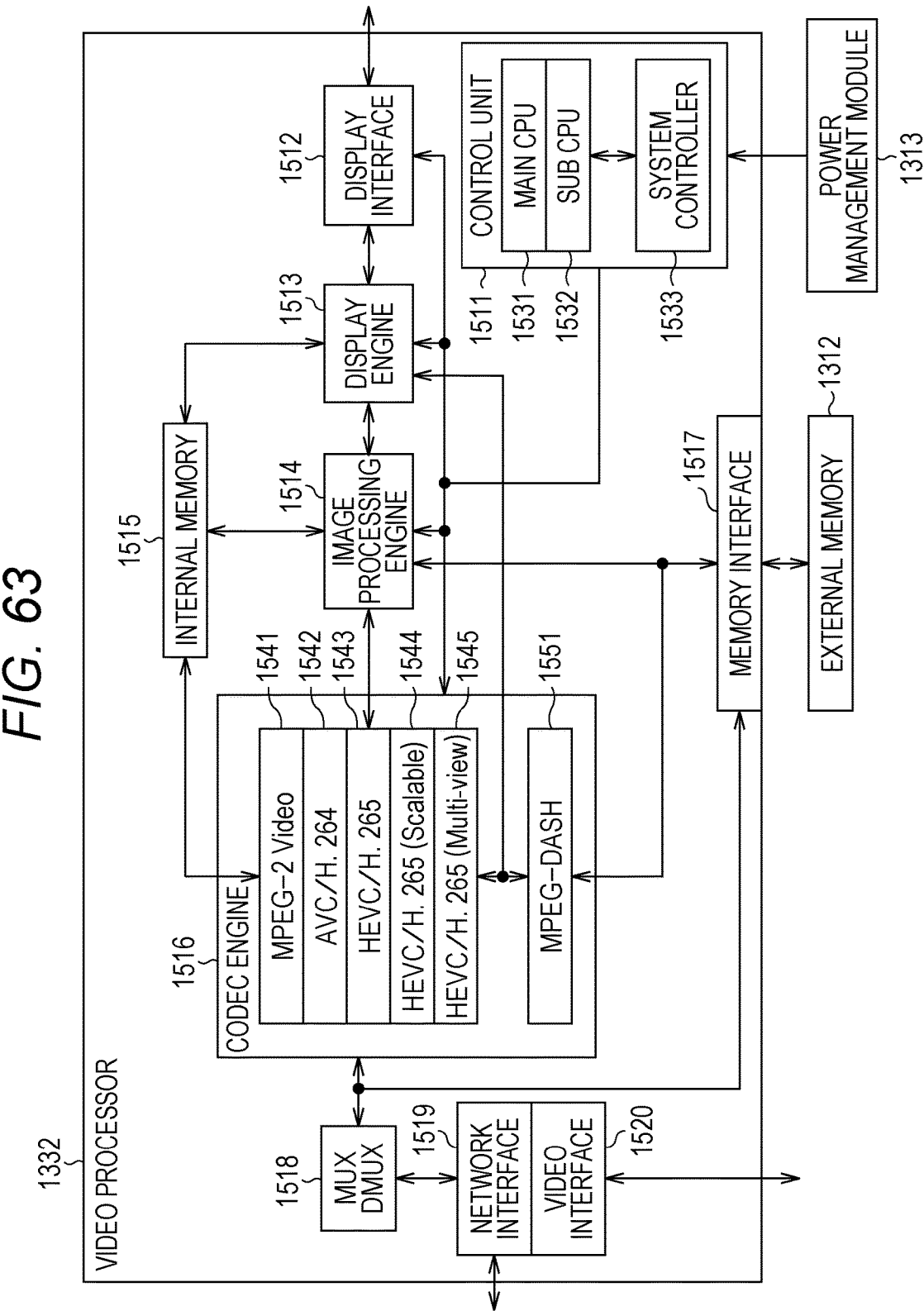
FIG. 63 is a block diagram illustrating another example of a schematic configuration of a video processor.

FIG. 63 illustrates another example of a schematic configuration of the video processor 1332 to which the present technology is applied. In the example of FIG. 63, the video processor 1332 has a function to encode/decode video data in a predetermined system.

To be specific, as illustrated in FIG. 63, the video processor 1332 includes a control unit 1511, a display interface 1512, a display engine 1513, an image processing engine 1514, and an internal memory 1515. Further, the video processor 1332 includes a codec engine 1516, a memory interface 1517, a multiplexer/demultiplexer (MUX DMUX) 1518, a network interface 1519, and a video interface 1520.

The control unit 1511 controls operations of the processing units in the video processor 1332 such as the display interface 1512, the display engine 1513, and the image processing engine 1514, and the codec engine 1516.

As illustrated in FIG. 63, the control unit 1511 includes a main CPU 1531, a sub CPU 1532, and a system controller 1533. The main CPU 1531 executes a program and the like for controlling the operations of the processing units in the video processor 1332. The main CPU 1531 generates a control signal according to the program and the like, and supplies the control signal to the processing units (that is, controls the operations of the processing units). The sub CPU 1532 serves an auxiliary role of the main CPU 1531. For example, the sub CPU 1532 executes a child process or a sub routine of the program and the like executed by the main CPU 1531. The system controller 1533 controls the operations of the main CPU 1531 and the sub CPU 1532 such as specifying the program executed by the main CPU 1531 and the sub CPU 1532.

The display interface 1512 outputs image data to the connectivity 1321 and the like under control of the control unit 1511. For example, the display interface 1512 converts the image data of digital data into an analog signal, and outputs the analog signal to a monitor device of the connectivity 1321 and the like as a reproduced video signal, or as the image data of digital data as it is.

The display engine 1513 performs various types of conversion processing such as format conversion, size conversion, color region conversion for the image data to be matched with hardware specifications of the monitor device on which an image of the image data is displayed, and the like, under control of the control unit 1511.

The image processing engine 1514 applies predetermined image processing such as filter processing for improvement of image quality, for the image data, under control of the control unit 1511.

The internal memory 1515 is a memory provided inside the video processor 1332, and commonly used by the display engine 1513, the image processing engine 1514, and the codec engine 1516. The internal memory 1515 is used to transfer data performed among the display engine 1513, the image processing engine 1514, and the codec engine 1516. For example, the internal memory 1515 stores data supplied from the display engine 1513, the image processing engine 1514, or the codec engine 1516, and supplies the data to the display engine 1513, the image processing engine 1514, or the codec engine 1516, as needed (for example, in response to a request). The internal memory 1515 may be realized by any storage device. However, since the internal memory 1515 is typically used to store low-capacity data such as image data or parameters in units of block, the internal memory 1515 is desirably realized by a semiconductor memory having a low capacity but a high response speed (compared with the external memory 1312, for example), like a static random access memory (SRAM).

The codec engine 1516 performs processing related to encoding or decoding of the image data. The system of encoding/decoding supported by the codec engine 1516 is arbitrary, and one or a plurality of the systems may be employed. For example, the codec engine 1516 may have a codec function of a plurality of encoding/decoding systems, and perform encoding of the image data or decoding of the encoded data by the system selected therefrom.

In the example illustrated in FIG. 63, the codec engine 1516 includes, for example, MPEG-2 Video 1541, AVC/H.264 1542, HEVC/H.265 1543, HEVC/H.265 (Scalable) 1544, HEVC/H.265 (Multi-view) 1545, and MPEG-DASH 1551 as function blocks of the processing related to codec.

The MPEG-2 Video 1541 is a function block that encodes and decodes the image data in the MPEG-2 system. The AVC/H. 264 1542 is a function block that encodes and decodes the image data in the AVC system. The HEVC/H.265 1543 is a function block that encodes and decodes the image data in the HEVC system. The HEVC/H.265 (Scalable) 1544 is a function block that scalably encodes and scalably decodes the image data in the HEVC system. The HEVC/H.265 (Multi-view) 1545 is a function block that multi-view encodes or multi-view decodes the image data in the HEVC system.

The MPEG-DASH 1551 is a function block that transmits/receives the image data in the MPEG-dynamic adaptive streaming over HTTP (MPEG-DASH) system. The MPEG-DASH is a technology for performing streaming of video using the hypertext transfer protocol (HTTP), and is characterized to select an appropriate one from among a plurality of encoded data having mutually different resolutions and prepared in advance in units of segment, and transfer the selected one. The MPEG-DASH 1551 controls generation of a stream and transfer of the stream complying with the standard, and uses the above-described MPEG-2 Video 1541 to HEVC/H. 265 (Multi-view) 1545 for the encoding/decoding of the image data.

The memory interface 1517 is an interface for the external memory 1312. Data supplied from the image processing engine 1514 and the codec engine 1516 is supplied to the external memory 1312 through the memory interface 1517. Further, data read from the external memory 1312 is supplied to the video processor 1332 (the image processing engine 1514 or the codec engine 1516) through the memory interface 1517.

The multiplexer/demultiplexer (MUX DMUX) 1518 multiplexes and demultiplexes various data related to an image such as a bit stream of encoded data, image data, and a video signal. The method of multiplexing/demultiplexing is arbitrary. For example, in multiplexing, the multiplexer/demultiplexer (MUX DMUX) 1518 not only integrates a plurality of data to one, but also can add predetermined header information and the like to the data. Further, in demultiplexing, the multiplexer/demultiplexer (MUX DMUX) 1518 not only divides one data into a plurality of data, but also can add predetermined header information and the like to each divided data. That is, the multiplexer/demultiplexer (MUX DMUX) 1518 can convert the format of the data by the multiplexing/demultiplexing. For example, the multiplexer/demultiplexer (MUX DMUX) 1518 can convert the format of the data into a transport stream that is a bit stream of a format for transfer or data (file data) in a file format for recording by multiplexing the bit stream. Apparently, inverse transform is possible by demultiplexing.

The network interface 1519 is an interface intended for the broadband modem 1333, the connectivity 1321, and the like. The video interface 1520 is an interface intended for the connectivity 1321, the camera 1322, and the like.

Next, an example of an operation of the video processor 1332 will be described. For example, when having received the transform stream from the external network through the connectivity 1321, the broadband modem 1333, and the like, the transport stream is supplied to the multiplexer/demultiplexer (MUX DMUX) 1518 through the network interface 1519 and is demultiplexed, and is decoded by the codec engine 1516. The image data obtained by the decoding by the codec engine 1516 is subjected to predetermined image processing by the image processing engine 1514, is subjected to predetermined conversion by the display engine 1513, and is supplied to the connectivity 1321 and the like through the display interface 1512, and an image thereof is displayed on a monitor. Further, for example, the image data obtained by the decoding by the codec engine 1516 is re-encoded by the codec engine 1516, is multiplexed by the multiplexer/demultiplexer (MUX DMUX) 1518 and converted into file data, is output to the connectivity 1321 and the like through the video interface 1520, and is recorded in various recording media.

Further, for example, the file data of the encoded data that is encoded image data read from a recording medium (not illustrated) by the connectivity 1321 and the like is supplied to the multiplexer/demultiplexer (MUX DMUX) 1518 through the video interface 1520 and is demultiplexed, and is decoded by the codec engine 1516. The image data obtained by the decoding by the codec engine 1516 is subjected to predetermined image processing by the image processing engine 1514, is subjected to predetermined conversion by the display engine 1513, and is supplied to the connectivity 1321 and the like through the display interface 1512, and an image thereof is displayed on the monitor. Further, for example, the image data obtained by the decoding of the codec engine 1516 is re-encoded by the codec engine 1516, is multiplexed by the multiplexer/demultiplexer (MUX DMUX) 1518 and converted into a transport stream, is supplied to the connectivity 1321, the broadband modem 1333, and the like through the network interface 1519, and is transferred to another device (not illustrated).

Note that transfer of the image data and other data among the processing units in the video processor 1332 is performed using, for example, the internal memory 1515 and the external memory 1312. Further, the power management module 1313, for example, controls power supply to the control unit 1511.

When the present technology is applied to the video processor 1332 configured as described above, the present technology according to the embodiments may just be applied to the codec engine 1516. That is, for example, the codec engine 1516 may just include function blocks that realize the image encoding device 100 and the image decoding device 200 according to the above-described embodiments. In doing so, the video processor 1332 can obtain similar effects to the above-described effects by reference to FIGS. 1 to 52.

The present technology (that is, the functions of the image encoding device and the image decoding device according to the embodiments) may be realized by hardware such as a logic circuit, may be realized by software such as an incorporated program, or may be realized by both the hardware and the software, in the codec engine 1516.

Two examples of the configuration of the video processor 1332 have been described. However, the configuration of the video processor 1332 is arbitrary, and configurations other than the above two examples may be employed. Further, the video processor 1332 may be configured as one semiconductor chip, or may be configured as a plurality of semiconductor chips. For example, the video processor 1332 may be a three-dimensional laminated LSI in which a plurality of semiconductors is laminated. Further, the video processor 1332 may be realized by a plurality of LSIs.

<Application Example to Devices>

The video set 1300 can be incorporated in various devices that process the image data. For example, the video set 1300 can be incorporated in the television device 900 (FIG. 57), the mobile phone device 920 (FIG. 58), the recording/reproducing device 940 (FIG. 59), the imaging device 960 (FIG. 60), and the like. By incorporation of the video set 1300, the device can obtain similar effects to the above-described effects by reference to FIGS. 1 to 52.

A part of the configurations of the video set 1300 can be implemented as a configuration to which the present technology is applied as long as the configuration includes the video processor 1332. For example, only the video processor 1332 can be implemented as a video processor to which the present technology is applied. Further, for example, the processor illustrated by the dotted line 1341, the video module 1311, and the like can be implemented as a processor or a module to which the present technology is applied. Further, for example, the video module 1311, the external memory 1312, the power management module 1313, and the front end module 1314 are combined, and can be implemented as a video unit 1361 to which the present technology is applied. In either configuration, similar effects to the above-described effects by reference to FIGS. 1 to 52 can be obtained.

That is, any configuration can be incorporated in various devices that process the image data as long as the configuration includes the video processor 1332, similarly to the case of the video set 1300. For example, the video processor 1332, the processor illustrated by the dotted line 1341, the video module 1311, and the video unit 1361 can be incorporated in the television device 900 (FIG. 57), the mobile phone device 920 (FIG. 58), the recording/reproducing device 940 (FIG. 59), the imaging device 960 (FIG. 60), and the like. Further, by incorporation of any of the configurations to which the present technology is applied, the device can obtain similar effects to the above-described effects by reference to FIGS. 1 to 52, similarly to the case of the video set 1300.

Further, in the present specification, an example in which various types of information are multiplexed into an encoded stream, and are transmitted from the encoding side to the decoding side has been described. However, the technique to transmit the information is not limited to the example. For example, the information may be transmitted or recorded as separate data associated with an encoded bit stream without being multiplexed into the encoded bit stream. Here, the term "associate" means enabling an image included in a bit stream (may be a part of the image such as a slice or a block) and information corresponding to the image to be linked at the time of decoding. That is, the information may be transmitted on a separate transmission line from that for the image (or the bit stream). Further, the information may be recorded in a separate recording medium (or a separate recording area in the same recording medium) from that for the image (or the bit stream). Further, the information and the image (or the bit stream) may be associated with each other in arbitrary units such as in a plurality of frames, one frame, or a part in a frame.

Note that the present technology can employ following configurations.

(1)

An image processing apparatus including:

a packing processing unit configured to perform packing processing of rearranging pixel data of RAW data that is image data before demosaicing processing is performed according to the degree of correlation; and an encoding unit configured to encode the RAW data subjected to the packing processing by the packing processing unit.

(2)

The image processing apparatus according to any one of (1), and (3) to (9), wherein the packing processing unit includes a separating unit that separates the pixel data of the RAW data on a data by data basis, the data having high correlation, an rearrangement unit that rearranges pixel data groups separated on a data by data basis, the data having high correlation, by the separating unit, and a generation unit that generates packing information related to the packing processing.

(3)

The image processing apparatus according to any one of (1), (2), and (4) to (9), wherein the separating unit separates the pixel data on a pixel by pixel basis, the pixel being allocated the same type of filter.

(4)

The image processing apparatus according to any one of (1) to (3), and (5) to (9), wherein the separating unit separates the pixel data on a pixel by pixel basis, the pixel being allocated a color filter of the same color.

(5)

The image processing apparatus according to any one of (1) to (4), and (6) to (9), wherein the rearrangement unit rearranges the pixel data groups as components of a predetermined color space, and the encoding unit encodes the components together or dependently of each other.

(6)

The image processing apparatus according to any one of (1) to (5), and (7) to (9), wherein the encoding unit encodes the components on a partial region by partial region basis of an image of the RAW data.

(7)

The image processing apparatus according to any one of (1) to (6), (8), and (9), wherein the rearrangement unit rearranges the pixel data groups as mutually different partial regions of one or a plurality of images.

(8)

The image processing apparatus according to any one of (1) to (7), and (9), wherein the rearrangement unit rearranges the pixel data groups as data of mutually different hierarchies of hierarchized image data.

(9)

The image processing apparatus according to any one of (1) to (8), wherein the rearrangement unit rearranges the image data subjected to the demosaicing processing to a part of hierarchies.

(10)

An image processing method including:

performing packing processing of rearranging pixel data of RAW data that is image data before demosaicing processing is performed according to the degree of correlation; and encoding the RAW data subjected to the packing processing.

(11)

An image processing apparatus including:

a decoding unit configured to decode encoded data that is encoded RAW data that is image data before demosaicing processing is performed; and an unpacking processing unit configured to perform unpacking processing of returning pixel data to an arrangement before packing processing is performed, for the RAW data subjected to the packing processing of rearranging the pixel data according to the degree of correlation, the RAW data being obtained by decoding by the decoding unit.

(12)

The image processing apparatus according to any one of (11), and (13) to (19), wherein the unpacking processing unit includes a parsing unit that parses packing information related to the packing processing, a separating unit that separates the pixel data of the RAW data subjected to the packing processing, based on the packing information parsed by the parsing unit, and a rearrangement unit that rearranges the pixel data separated on a data by data basis, the data having high correlation, by the separating unit, to be returned to an arrangement before the packing processing is performed, based on the packing information parsed by the parsing unit.

(13)

The image processing apparatus according to any one of (11), (12), and (14) to (19), wherein the separating unit separates the pixel data rearranged on a pixel by pixel basis, the pixel being allocated the same type of filter by the packing processing, and the rearrangement unit rearranges the pixel data according to an array of the filter.

(14)

The image processing apparatus according to any one of (11) to (13), and (15) to (19), wherein the separating unit separates the pixel data rearranged on a pixel by pixel basis, the pixel being allocated a color filter of the same color by the packing processing, and the rearrangement unit rearranges the pixel data according to an array of the color filter.

(15)

The image processing apparatus according to any one of (11) to (14), and (16) to (19), wherein the separating unit separates the pixel data rearranged into components of a predetermined color space on a data by data basis, the data having high correlation.

(16)

The image processing apparatus according to any one of (11) to (15), and (17) to (19), wherein the decoding unit decodes the encoded data that is encoded components on a partial region by partial region basis of an image of the RAW data, on the partial region by partial region basis.

(17)

The image processing apparatus according to any one of (11) to (16), (18), and (19), wherein the separating unit separates the pixel data rearranged in mutually different partial regions of one or a plurality of images on a data by data basis, the data having high correlation.

(18)

The image processing apparatus according to any one of (11) to (17), and (19), wherein the separating unit separates the pixel data rearranged in mutually different hierarchies of hierarchized image data on a data by data basis, the data having high correlation.

(19)

The image processing apparatus according to any one of (11) to (18), wherein the separating unit separates the pixel data rearranged in other hierarchies except a part of hierarchies, the image data subjected to the demosaicing processing being arranged in the part.

(20)

An image processing method including:

decoding encoded data that is encoded RAW data that is image data before demosaicing processing is performed; and performing unpacking processing of returning the pixel data to an arrangement before packing processing is performed, for the RAW data subjected to the packing processing of rearranging the pixel data according to the degree of correlation, the RAW data being obtained by decoding.

REFERENCE SIGNS LIST

100 Image encoding device
101 Camera sensor
102 Packing unit
103 Image encoding unit
104 Transmission unit
105 RAW data encoding unit 111 Separating unit
112 Rearrangement unit
113 Packing information generation unit
121 Setting unit
122 Encoding unit
131 Base layer image encoding unit
132 Enhancement layer image encoding unit
133 Multiplexer
134 Control unit
200 Image decoding device
201 Receiving unit
202 Image decoding unit
203 Unpacking unit
204 Development processing unit
211 Decoding unit
212 Packing information extraction unit
221 Demultiplexer
222 Base layer image decoding unit
223 Enhancement layer image decoding unit
224 Control unit
271 Packing information parsing unit
272 Separating unit
273 Rearrangement unit

The invention claimed is:

1. An image processing apparatus, comprising:
a central processing unit (CPU) configured to:
   separate pixel data of RAW data in a plurality of pixel data groups on a pixel by pixel basis, wherein the pixel data in each pixel data group of the plurality of pixel data groups is allocated a same type of filter;
   rearrange the plurality of pixel data groups in a plurality of images based on a degree of correlation of the pixel data, wherein
      the plurality of images includes a plurality of pixels allocated with different types of filters, and
      the RAW data is image data of the plurality of images before application of a demosaicing process on the RAW data; and
   encode moving images in which the plurality of images is arranged in mutually different frames,
      wherein the moving images are encoded based on motion prediction between the mutually different frames corresponding to the different types of filters.

2. An image processing method, comprising:
separating pixel data of RAW data in a plurality of pixel data groups on a pixel by pixel basis, wherein the pixel data in each pixel data group of the plurality of pixel data groups is allocated a same type of filter;
rearranging the plurality of pixel data groups in a plurality of images based on a degree of correlation of the pixel data, wherein
   the plurality of images includes a plurality of pixels allocated with different types of filters, and
   the RAW data is image data of the plurality of images before application of a demosaicing process on the RAW data; and
encoding moving images in which the plurality of images is arranged in mutually different frames,
   wherein the moving images are encoded based on motion prediction between the mutually different frames corresponding to the different types of filters.

3. An image processing apparatus, comprising:
a central processing unit (CPU) configured to:
   separate pixel data of RAW data in a plurality of pixel data groups on a pixel by pixel basis, wherein the pixel data in each pixel data group of the plurality of pixel data groups is allocated a same type of filter, wherein
      the plurality of pixel data groups is rearranged in a plurality of images based on a degree of correlation of the pixel data, and
      the plurality of images includes a plurality of pixels allocated with different types of filters; and
   decode encoded moving images in which the plurality of images is arranged in mutually different frames, wherein
      the encoded moving images are based on motion prediction between the mutually different frames corresponding to the different types of filters, and
      the RAW data is image data of the plurality of images before application of a demosaicing process on the RAW data.

4. An image processing method, comprising:
separating pixel data of RAW data in a plurality of pixel data groups on a pixel by pixel basis, wherein the pixel data in each pixel data group of the plurality of pixel data groups is allocated a same type of filter, wherein
   the plurality of pixel data groups is rearranged in a plurality of images based on a degree of correlation of the pixel data, and
   the plurality of images includes a plurality of pixels allocated with different types of filters; and
decoding encoded moving images in which the plurality of images is arranged in mutually different frames, wherein
   the encoded moving images are based on motion prediction between the mutually different frames corresponding to the different types of filters, and
   the RAW data is image data of the plurality of images before an application of a demosaicing process on the RAW data.

5. The image processing apparatus according to claim 1, wherein the CPU is further configured to encode a hierarchical image in which the plurality of images is arranged in mutually different layers, and wherein the hierarchical image is encoded based on inter-layer prediction between the mutually different layers corresponding to the different types of filters.

6. The image processing apparatus according to claim 5, wherein the CPU is further configured to set the hierarchical image in which a demosaiced image is arranged in a layer lower than the mutually different layers.

7. The image processing apparatus according to claim 1, wherein the CPU is further configured to encode a hierarchical image in which the plurality of images is arranged in mutually different views, and wherein the hierarchical image is encoded based on inter-view prediction between the mutually different views corresponding to the different types of filters.

8. The image processing apparatus according to claim 1, wherein the CPU is further configured to encode the moving images based on omission of an in-loop filter process.

9. The image processing apparatus according to claim 8, wherein the in-loop filter process is an adaptive filter process.

10. The image processing apparatus according to claim 1, wherein the plurality of pixels is allocated with different color filters.

11. The image processing apparatus according to claim 1, wherein the CPU is further configured to encode the moving images for each coding unit that has a hierarchical structure.

12. The image processing apparatus according to claim 3, wherein the CPU is further configured to decode an encoded hierarchical image in which the plurality of images is arranged in mutually different layers, and wherein the encoded hierarchical image is based on inter-layer prediction between the mutually different layers corresponding to the different types of filters.

13. The image processing apparatus according to claim 12, wherein a demosaiced image is arranged in a layer lower than the mutually different layers.

14. The image processing apparatus according to claim 3, wherein the CPU is further configured to decode an encoded hierarchical image in which the plurality of images is arranged in mutually different views, and wherein the encoded hierarchical image is based on inter-view prediction between the mutually different views corresponding to the different types of filters.

15. The image processing apparatus according to claim 3, wherein the CPU is further configured to decode the encoded moving images based on omission of an in-loop filter process.

16. The image processing apparatus according to claim 15, wherein the in-loop filter process is an adaptive filter process.

17. The image processing apparatus according to claim 3, wherein the plurality of pixels is allocated with different color filters.

18. The image processing apparatus according to claim 3, wherein the plurality of images is encoded for each coding unit that has a hierarchical structure.

19. An image processing apparatus, comprising:
a central processing unit (CPU) configured to:
separate pixel data of RAW data in a plurality of pixel data groups on a pixel by pixel basis, wherein the pixel data in each pixel data group of the plurality of pixel data groups is allocated a same type of filter;
rearrange the plurality of pixel data groups in a plurality of images based on a degree of correlation of the pixel data, wherein
the plurality of images includes a plurality of pixels allocated with different types of filters, and
the RAW data is image data of the plurality of images before application of a demosaicing process on the RAW data; and
encode a hierarchical image in which the plurality of images is arranged in mutually different layers,
wherein the hierarchical image is encoded based on inter-layer prediction between the mutually different layers corresponding to the different types of filters.

* * * * *